(12) United States Patent
Oka et al.

(10) Patent No.: US 7,496,756 B2
(45) Date of Patent: Feb. 24, 2009

(54) CONTENT USAGE-RIGHT MANAGEMENT SYSTEM AND MANAGEMENT METHOD

(75) Inventors: Makoto Oka, Tokyo (JP); Yoshihito Ishibashi, Tokyo (JP); Hiroshi Abe, Tokyo (JP); Noboru Shimada, Tokyo (JP); Masahiko Enari, Kanagawa (JP); Kenji Yoshino, Tokyo (JP)

(73) Assignee: Sony Corporation (JP)

( * ) Notice: Subject to any disclaimer, the term of this patent is extended or adjusted under 35 U.S.C. 154(b) by 888 days.

(21) Appl. No.: 10/415,852

(22) PCT Filed: Aug. 15, 2002

(86) PCT No.: PCT/JP02/08291

§ 371 (c)(1),
(2), (4) Date: Sep. 8, 2003

(87) PCT Pub. No.: WO03/027924

PCT Pub. Date: Apr. 3, 2003

(65) Prior Publication Data

US 2004/0039911 A1   Feb. 26, 2004

(30) Foreign Application Priority Data

Sep. 11, 2001   (JP) ............................. 2001-274854

(51) Int. Cl.
  *H04L 9/00*   (2006.01)
(52) U.S. Cl. ........................................ 713/175; 726/31
(58) Field of Classification Search ................... 726/31; 713/175

See application file for complete search history.

(56) References Cited

U.S. PATENT DOCUMENTS

| 5,416,842 | A | 5/1995 | Aziz |
| 5,740,248 | A | 4/1998 | Fieres et al. |
| 7,110,984 | B1 * | 9/2006 | Spagna et al. ................. 705/57 |
| 2002/0108049 | A1 * | 8/2002 | Xu et al. ...................... 713/193 |

FOREIGN PATENT DOCUMENTS

| EP | 878 796 A | 11/1998 |
| EP | 1 047 030 A | 4/2000 |
| EP | 1047030 | * 12/2000 |
| EP | 1 128 598 A | 8/2001 |
| JP | 11-41229 A | 2/1999 |
| JP | 2001-211162 A | 8/2001 |
| JP | 2001-230768 A | 8/2001 |
| WO | WO-00/62216 A | 10/2000 |

* cited by examiner

*Primary Examiner*—Gilberto Barron, Jr.
*Assistant Examiner*—Devin Almeida
(74) *Attorney, Agent, or Firm*—Lerner, David, Littenberg, Krumholz & Mentlik, LLP

(57) ABSTRACT

A system in which content usage conditions can be upgraded without the need for a service provider to control content-usage rights of a user. In the system in which encrypted content is distributed and is allowed to be utilized only by authorized users, the service provider receives a content usage-right certificate from the user, and on the condition that it is determined that data is not tampered with by verifying a digital signature of an issuing entity of the content usage-right certificate, the service provider obtains user information and content purchase information of the user from the content usage-right certificate, and performs upgrade processing by, for example, changing the usage conditions. It is thus possible to change the content usage conditions without the need for the service provider to possess usage control data.

29 Claims, 55 Drawing Sheets

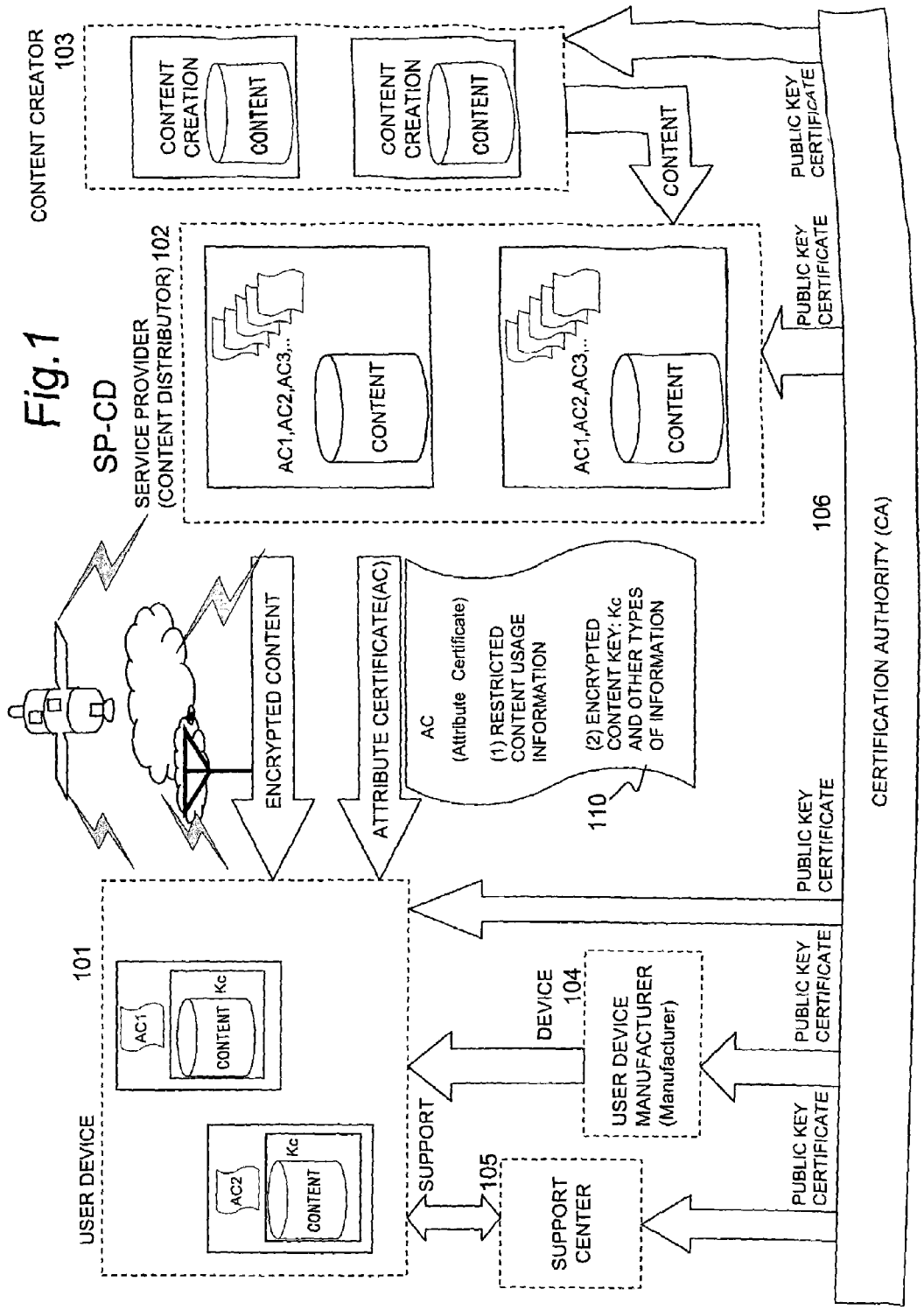

| VERSION | ITEM | DESCRIPTION |
|---|---|---|
| V-1 | VERSION | VERSION OF CERTIFICATE FORMAT |
| | NUMBER | CERTIFICATE NUMBER ASSIGNED BY CERTIFICATE ISSUER |
| | SIGNATURE | SIGNATURE ALGORITHM OF CERTIFICATE |
| | ISSUER | CERTIFICATE ISSUER NAME (DISTINGUISHED NAME FORMAT) |
| | VALIDITY<br>NOT BEFORE<br>NOT AFTER | VALIDITY PERIOD OF CERTIFICATE<br>START TIME AND DATE<br>END TIME AND DATE |
| | SUBJECT | CERTIFICATE OWNER NAME |
| | SUBJECT PUBLIC KEY INFOMATION<br>ALGORITHM<br>SUBJECT PUBLIC KEY | PUBLIC KEY INFORMATION OF CERTIFICATE OWNER<br>KEY ALGORITHM<br>KEY |

| V-3 | AUTHORITY KEY IDENTIFIER<br>KEY IDENTIFIER<br>AUTHORITY CERT ISSUER<br>AUTHORITY CERT SERIAL NUMBER | KEY IDENTIFIER OF CERTIFICATE ISSUER USED FOR SIGNATURE VERIFICATION<br>KEY IDENTIFIER<br>AUTHORITY CERTIFICATE ISSUER NAME (GENERAL NAME FORMAT)<br>AUTHORITY CERTIFICATE SERIAL NUMBER |
|---|---|---|
| | SUBJECT KEY IDENTIFIER<br>KEY IDENTIFIER | IDENTIFY TARGET KEY FROM A PLURALITY OF KEYS |
| | KEY USAGE PURPOSE<br>(0) DIGITAL SIGNATURE<br>(1) NON REPUDIATION<br>(2) KEY ENCIPHERMENT<br>(3) DATA ENCIPHERMENT<br>(4) KEY AGREEMENT<br>(5) KEY CERT SIGN<br>(6) cRL SIGN | DESIGNATION OF KEY USAGE PURPOSE<br>(0) DIGITAL SIGNATURE<br>(1) NON REPUDIATION<br>(2) KEY ENCRYPTION<br>(3) MESSAGE ENCRYPTION<br>(4) COMMON KEY DELIVERY<br>(5) AUTHENTICATION SIGNATURE CHECKING<br>(6) SIGNATURE CHECKING OF REVOCATION LIST |
| | PRIVATE KEY USAGE PERIOD<br>NOT BEFORE<br>NOT AFTER | VALIDITY PERIOD OF PRIVATE KEY CORRESPONDING TO PUBLIC KEY IN CERTIFICATE |
| | CERTIFICATE POLICIES<br>POLICY IDENTIFIER<br>POLICY QUALIFIER | CERTIFICATE POLICY ACKNOWLEDGED BY CERTIFICATE ISSUER<br>POLICY ID (COMPLIANT TO ISO/IEC9834-1) AUTHENTICATION STANDARD |
| | POLICY MAPPING<br>ISSUER DOMAIN POLICY<br>SUBJECT DOMAIN POLICY | POLICY-RELATED RESTRICTIONS IN AUTHENTICATION PATH (REQUIRED ONLY FOR CA CERTIFICATE) |

Fig. 4

| | | |
|---|---|---|
| V-3 | SUBJECT ALT NAME | ALTERNATIVE NAME OF CERTIFICATE OWNER (GN FORMAT) |
| | ISSUER ALT NAME | ALTERNATIVE NAME OF CERTIFICATE ISSUER (GN FORMAT) |
| | SUBJECT DIRECTORY ATTRIBUTE | ATTRIBUTE OF DIRECTORY REQUIRED FOR CERTIFICATE OWNER |
| | BASIC CONSTRAINT<br>CA<br>CERTIFICATE OWNER | PUBLIC KEY TO BE CERTIFIED IS FOR SIGNATURE OF CERTIFICATION AUTHORITY OR FOR CERTIFICATE OWNER |
| | NAME CONSTRAINT PERMITTED SUBTREE<br>BASE<br>MINIMUM<br>MAXIMUM<br>EXCLUDED SUBTREE | RESTRICTION OF NAMES OF CERTIFICATES ISSUED BY ISSUER |
| | POLICY CONSTRAINT<br>REQUIRE EXPLICIT POLICY<br>INHIBIT POLICY MAPPING | POLICY-RELATED RESTRICTION IN AUTHENTICATION PATH |
| | cRL DISTRIBUTION POINT | WHEN CERTIFICATE OWNER USES CERTIFICATE, REFERENCE POINT OF REVOCATION LIST FOR CHECKING WHETHER CERTIFICATE IS REVOKED IS DESCRIBED |
| | SIGNATURE ALGORITHM | ALGORITHM USED FOR ADDING SIGNATURE TO CERTIFICATE |
| | SIGNATURE VALUE | SIGNATURE OF CERTIFICATE ISSUER USING PRIVATE KEY |

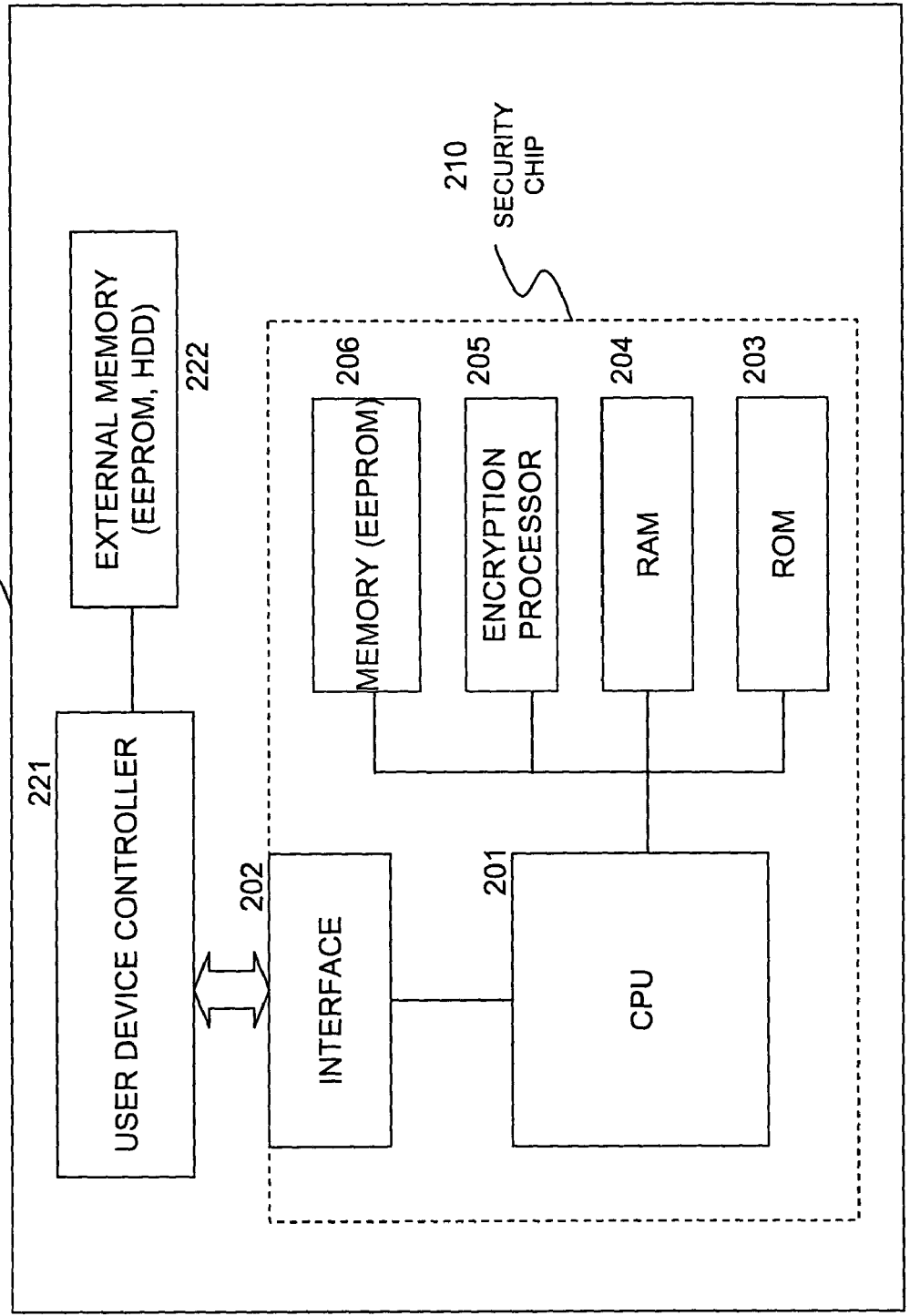

| DATA TYPE | DATA CONTENT |
|---|---|
| PUBLIC KEY CERTIFICATE | • ROOT CERTIFICATION AUTHORITY PUBLIC KEY CERTIFICATE<br>• SERVICE PROVIDER PUBLIC KEY CERTIFICATE<br>• SUPPORT CENTER PUBLIC KEY CERTIFICATE |
| ATTRIBUTE CERTIFICATE | • APPLICATION (CONTENT) USAGE MANAGEMENT ATTRIBUTE CERTIFICATE<br>• SP MEMORY AREA MANAGEMENT ATTRIBUTE CERTIFICATE |
| KEY DATA | • PAIR OF PUBLIC KEY AND PRIVATE KEY<br>• STORAGE KEY<br>(DEVICE STORAGE KEY: GLOBAL COMMON KEY)<br>(SERVICE PROVIDER STORAGE KEY)<br>• RANDOM-NUMBER GENERATING KEY,<br>• MUTUAL AUTHENTICATION KEY |
| ID INFORMATION | • DEVICE ID<br>• SERVICE PROVIDER ID<br>• USER ID<br>• APPLICATION ID |
| OTHERS | • AUTHENTICATION INFORMATION<br>• RANDOM NUMBER SEED<br>• CONTENT USAGE NUMBER INFORMATION |

Fig. 7

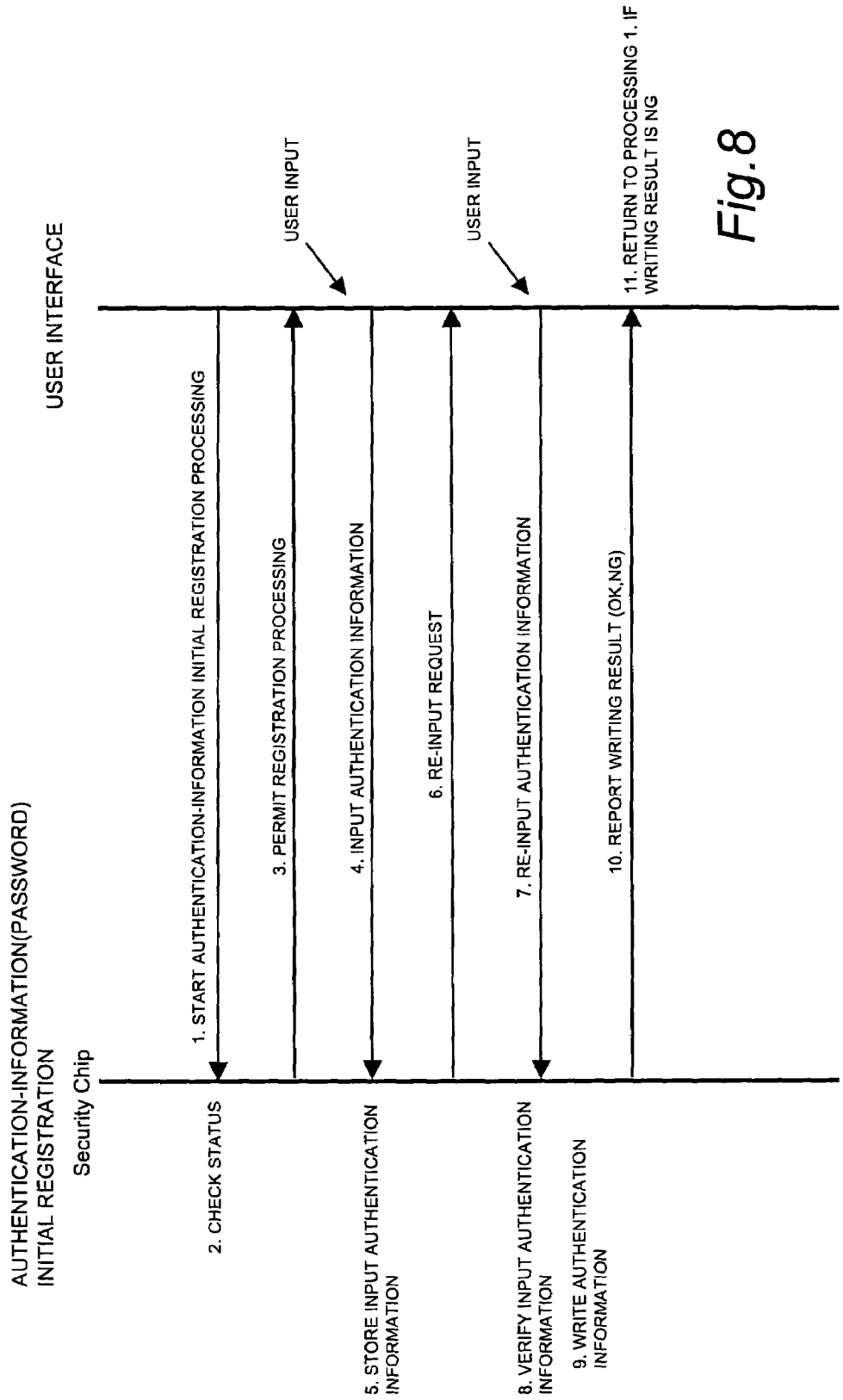

Fig.21
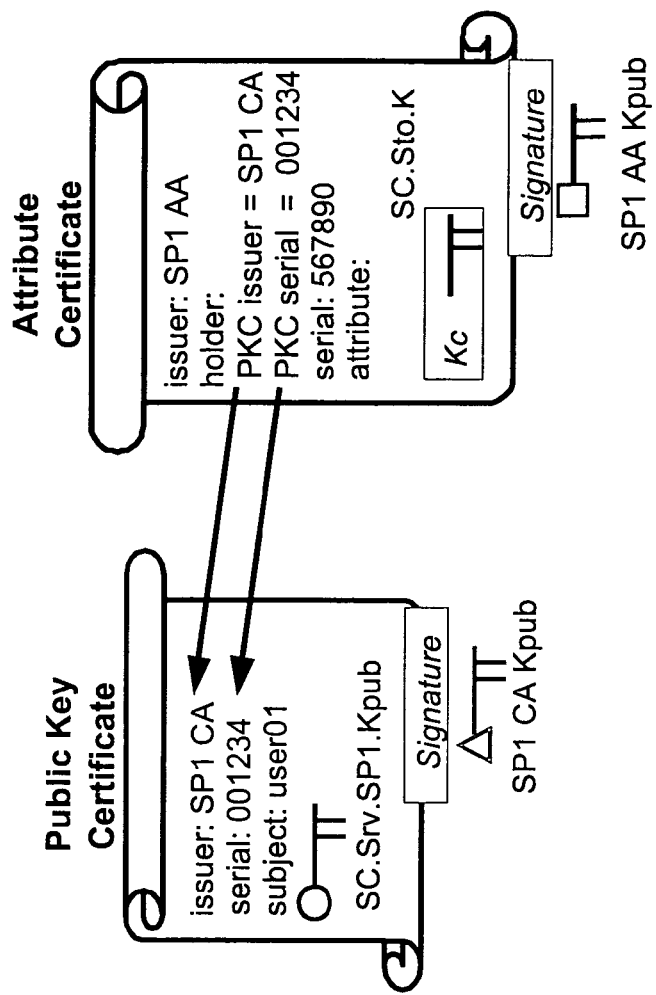
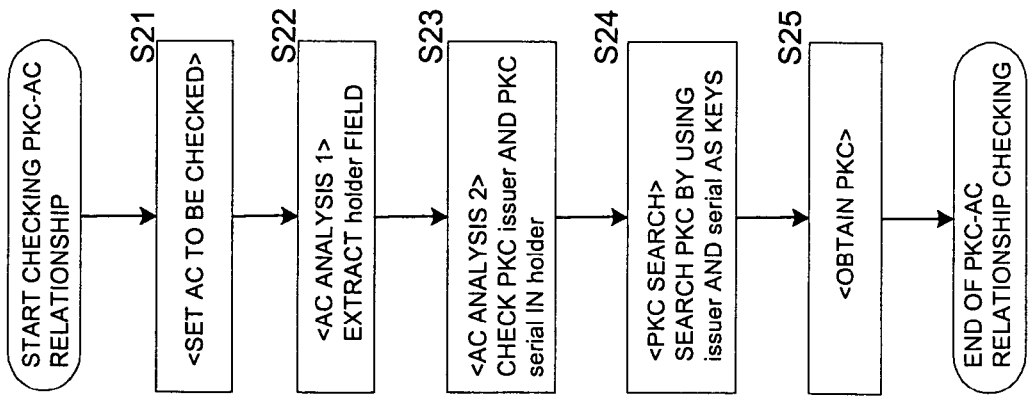

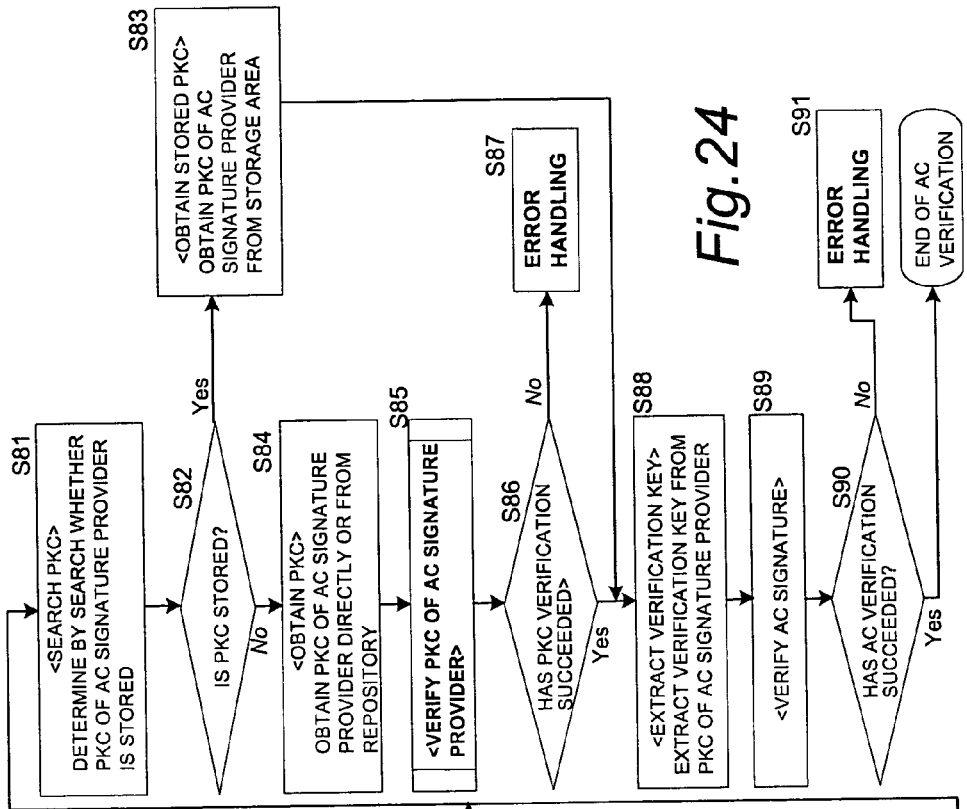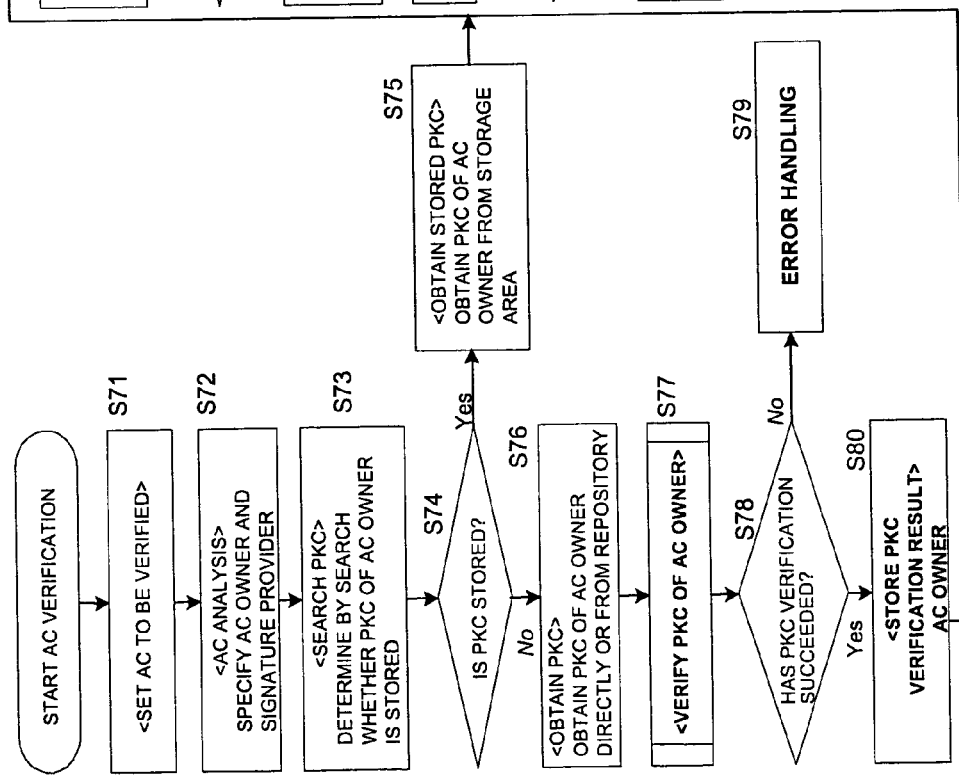
Fig.24

CONTENT USAGE-RIGHT MANAGEMENT SYSTEM AND MANAGEMENT METHOD

TECHNICAL FIELD

The present invention relates to a content usage-right management system, a content usage-right management method, an information processing apparatus, and a computer program. More particularly, the invention relates to a content usage-right management system, a content usage-right management method, an information processing apparatus, and a computer program, used in a system for transmitting encrypted content, in which the illegal usage of content is prevented by delivering a content key using a content usage-right certificate, for example, an attribute certificate, including content usage-right information, and in which the usage of new content is allowed by issuing a content usage-right certificate corresponding to new usage conditions or new content based on the content usage-right certificate.

BACKGROUND ART

Services for delivering various types of software data (hereinafter referred to as "content"), such as music data, image data, and game programs, by communication via the Internet or satellites, or via various cable or wireless communication networks, become increasingly widespread. Distribution of content via storage media, such as DVDs, CDs, and memory cards, becomes also extensively widespread. Such distributed content is played back and used in TVs, PCs (Personal Computers), dedicated playback devices, or game machines, owned by users.

The content distributed via communication networks is received by, for example, set-top boxes provided with a communication function, is converted into data that can be played back in TVs or playback devices, and is then played back. Alternatively, the content is received by TVs, playback devices, game machines, or information devices, such as PCs, provided with a communication interface, and is played back.

Generally, in many types of software content, such as game programs, music data, and image data, the distribution rights are possessed by the creators and sellers of the content. In distributing the content, therefore, measures are taken against illegal copying by providing certain usage restrictions, i.e., by allowing use of the software only to authorized users, while considering security.

One technique for imposing usage restrictions on users is to encrypt the distributed content. For example, when distributing content that requires copyright protection via satellite communication or Internet communication, or when distributing content stored in media, such as DVDs, the content is encrypted, and is then distributed or stored, and a decryption key that can be used for decrypting the content is distributed only to authorized users. The authorized users decrypt the encrypted content by using the distributed decryption key so as to play back the content.

Encrypted data can be decrypted into the original data (plaintext) by performing decryption processing using a decryption key. Data encryption/decryption methods using an encryption key for data encryption processing and using a decryption key for decryption processing are well known.

There are various types of data encryption/decryption methods using an encryption key and a decryption key. An example of such methods is a so-called "common key cryptosystem". In the common key cryptosystem, a common key is used as an encryption key for data encryption processing and as a decryption key for data decryption processing. The common key used for encryption processing and decryption processing is provided to authorized users, thereby excluding access to the data by unauthorized users without the key. A typical technique of this system is DES (Data Encryption Standard).

The encryption key and the decryption key used in the above-described encryption and decryption processing can be determined by applying a unidirectional function, such as a hash function, based on, for example, a password. The unidirectional function is a function whose input is very difficult to predict from the output. For example, a unidirectional function is applied to a password determined by a user as an input, and an encryption key and a decryption key are generated based on the output. It is, in practice, impossible to predict the password, which is the original data, from the encryption key and the decryption key obtained as described above.

A method in which the encryption processing using an encryption key and the decryption processing using a decryption key are performed with different keys is referred to as a "public key cryptosystem". A public key cryptosystem is a system using a public key that can be employed by unspecified users, and a document for a specific person is encrypted by using a public key created by this specific person. The document encrypted by the public key can be decrypted only by using a private key corresponding to the public key used for the encryption processing. The private key is possessed only by the person who created the public key, and thus, the document encrypted by this public key can be decrypted only by the person who possesses the private key. Typical techniques used in the public key cryptosystem are an elliptic curve cryptosystem and the RSA (Rivest-Shamir-Adleman) scheme. By using such cryptosystems, it is possible to implement a system in which encrypted content can be decrypted only by authorized users.

The popular configuration of the above-described content usage management system is a configuration in which encrypted content is provided to the users via a network or by storing the content in recording media, such as DVDs or CDs, and a content key for decrypting the encrypted content is provided only to authorized users. A configuration has been suggested in which a content key itself is encrypted for preventing the illegal use thereof and is provided to the authorized users, and the encrypted key is decrypted by using a decryption key possessed only by the authorized users so as to utilize the content key.

Generally, a determination as to whether a user is an authorized user is made by performing authentication processing between a content provider, that is, a content sender, and a user device before distributing content or a content key. In typical authentication processing, the integrities of communication parties are verified, and also, a session key, which is effective only in the authentication communication, is generated. Then, only when authentication is established, is data, for example, content or a content key, encrypted by using the generated session key, and then, communication is performed.

However, in the configuration in which the content or a content key is distributed after checking the users based on such authentication processing, it is necessary for a content key sender to control content usage-right information of each user. That is, for determining whether the user has an authorized content-usage right, the content usage-right information of all the users must be stored in a database to distribute the content or a content key based on the right information.

There is no problem to perform such processing, that is, to check the content-usage rights of the users, if the number of users utilizing the content is limited. With a large number of users, however, the processing load becomes heavy, and the efficiency in distributing the content or a content key is accordingly reduced. Moreover, some users may desire to change conditions, such as period restrictions or usage-number restrictions, which are set as the content usage conditions, after purchasing the content.

DISCLOSURE OF INVENTION

In view of the above-described problems, it is an object of the present invention to provide a content usage-right management system, a content usage-right management method, an information processing apparatus, and a computer program in which, without requiring control of content-usage rights of each user by a service provider, the content can be utilized only by authorized users, and various usage restrictions, such as period restrictions and usage-number restrictions, corresponding to the users, can be changed, or new content can be purchased based on information on the purchased content.

A first aspect of the present invention is a content usage-right management system comprising:
 a user device which utilizes content; and
 a service provider which distributes a content usage-right certificate in which content-usage condition information is stored to the user device.

The user device is configured to utilize the content according to the content-usage condition information stored in the content usage-right certificate received from the service provider, and to make a request to change the content-usage condition information stored in the content usage-right certificate by sending the content usage-right certificate to the service provider.

The service provider is configured to generate, upon receiving the content usage-right certificate involving the request to change the content-usage condition information from the user device, an upgraded content usage-right certificate by changing the content-usage condition information recorded in the received content usage-right certificate, and sends the upgraded content usage-right certificate to the user device.

In an embodiment of the content usage-right management system of the present invention, the content usage-right certificate may store therein an encrypted content key encrypted with a content key: Kc used for decrypting encrypted content. The user device may be configured to obtain the content key by decrypting the encrypted content key on the condition that the content is to be utilized according to the content-usage condition information stored in the content usage-right certificate received from the service provider.

In an embodiment of the content usage-right management system of the present invention, the content usage-right certificate may store therein an encrypted content key encrypted with a content key: Kc used for decrypting encrypted content. The user device may be configured to determine whether the content is to be utilized according to the content-usage condition information stored in the content usage-right certificate received from the service provider, and on the condition that the content is to be utilized according to the content usage conditions, the user device decrypts the encrypted content key stored in the content usage-right certificate based on a key stored in the user device.

In an embodiment of the content usage-right management system of the present invention, the content usage-right certificate may store therein an encrypted content key encrypted with a content key: Kc used for decrypting encrypted content.

The service provider may be configured to receive the content usage-right certificate sent from the user device, and to determine whether the content is to be utilized according to the content-usage condition information stored in the received content usage-right certificate, and on the condition that the content is to be utilized according to the content usage conditions, the service provider decrypts the encrypted content key stored in the content usage-right certificate based on a unique key of the service provider.

In an embodiment of the content usage-right management system of the present invention, the content-usage condition information stored in the content usage-right certificate may be one of three modes: content usage-period restricted information, content usage-number restricted information, and content full-purchase without imposing any usage restriction. The request to change the content-usage condition information from the user device may include at least one of a change in a content usage-period restriction, a change in a content usage-number restriction, and a change among the three modes: a usage period restriction, a usage number restriction, and content full-purchase. The service provider may be configured to generate, upon receiving the content usage-right certificate involving the request to change the content-usage condition information from the user device, an upgraded content usage-right certificate by performing at least one of a change in the content usage-period restriction, a change in the content usage-number restriction, or a change among the three modes: the usage-period restriction, the usage-number restriction, and the content full-purchase for changing the content-usage condition information recorded in the received content usage-right certificate, and sends the upgraded content usage-right certificate to the user device.

In an embodiment of the content usage-right management system, the content-usage conditions stored in the content usage-right certificate may include usage condition information in which on-line usage that requires a determination of usage rights in the service provider or off-line usage that does not require a determination of usage rights in the service provider is set. The service provider may be configured to generate, upon receiving the content usage-right certificate involving the request to change the content-usage condition information from the user device, an upgraded content usage-right certificate by changing the usage-condition information between on-line usage and off-line usage for changing the content-usage condition information recorded in the received content usage-right certificate, and sends the upgraded content usage-right certificate to the user device.

In an embodiment of the content usage-right management system of the present invention, a digital signature of an entity that has issued the content usage-right certificate may be attached to the content usage-right certificate. The service provider may be configured to generate an upgraded content usage-right certificate upon receiving the content usage-right certificate when it is determined that data is not tampered with by verifying the digital signature.

In an embodiment of the content usage-right management system of the present invention, the content usage-right certificate may store therein link information concerning a public key certificate corresponding to the content usage-right certificate. The service provider may be configured to generate an upgraded content usage-right certificate upon receiving the content usage-right certificate on the condition that the integrity of the content usage-right certificate is determined by verifying the public key certificate obtained by the link information.

In an embodiment of the content usage-right management system of the present invention, the content usage-right certificate may be an attribute certificate issued by an attribute certificate authority, and an encrypted content key encrypted with a content key used for decrypting content may be stored in an attribute information field of the attribute certificate.

In an embodiment of the content usage-right management system of the present invention, the content usage-right certificate may be an attribute certificate issued by an attribute certificate authority, and the content usage conditions may be stored in an attribute information field of the attribute certificate.

A second aspect of the present invention is a content usage-right management system comprising:
 a user device which utilizes content; and
 a service provider which distributes a content usage-right certificate in which purchased content information is stored to the user device.

The user device is configured to send the content usage-right certificate to the service provider.

The service provider is configured to generate, based on the content information stored in the content usage-right certificate received from the user device, a content usage-right certificate corresponding to an item of content belonging to an album which consists of a set of items of content, which belong to the same group of content as the content information stored in the received content usage-right certificate, as an upgraded content usage-right certificate, and sends the upgraded content usage-right certificate to the user device.

In an embodiment of the content usage-right management system of the present invention, a digital signature of an entity that has issued the content usage-right certificate may be attached to the content usage-right certificate, and the service provider may be configured to generate an upgraded content usage-right certificate upon receiving the content usage-right certificate when it is determined that data is not tampered with by verifying the digital signature.

In an embodiment of the content usage-right management system of the present invention, the content usage-right certificate may store therein link information concerning a public key certificate corresponding to the content usage-right certificate, and the service provider may be configured to generate an upgraded content usage-right certificate upon receiving the content usage-right certificate on the condition that the integrity of the content usage-right certificate is determined by verifying the public key certificate obtained by the link information.

A third aspect of the present invention is a content usage-right management method used in a system which comprises a user device which utilizes content, and a service provider which distributes a content usage-right certificate in which content-usage condition information is stored to the user device.

The user device is configured to make a request to change the content-usage condition information stored in the content usage-right certificate by sending the content usage-right certificate to the service provider.

The service provider is configured to generate, upon receiving the content usage-right certificate involving the request to change the content-usage condition information from the user device, an upgraded content usage-right certificate by changing the content-usage condition information recorded in the received content usage-right certificate, and sends the upgraded content usage-right certificate to the user device.

In an embodiment of the content usage-right management method of the present invention, the content usage-right certificate may store therein an encrypted content key encrypted with a content key: Kc used for decrypting encrypted content, and the user device may be configured to obtain the content key by decrypting the encrypted content key on the condition that the content is to be utilized according to the content-usage condition information stored in the content usage-right certificate received from the service provider.

In an embodiment of the content usage-right management method of the present invention, the content usage-right certificate may store therein an encrypted content key encrypted with a content key: Kc used for decrypting encrypted content, and the user device may be configured to determine whether the content is to be utilized according to the content-usage condition information stored in the content usage-right certificate received from the service provider, and on the condition that the content is to be utilized according to the content usage conditions, the user device decrypts the encrypted content key stored in the content usage-right certificate based on a key stored in the user device.

In an embodiment of the content usage-right management method of the present invention, the content usage-right certificate may store therein an encrypted content key encrypted with a content key: Kc used for decrypting encrypted content, and the service provider may receive the content usage-right certificate sent from the user device, and determines whether the content is to be utilized according to the content-usage condition information stored in the received content usage-right certificate, and on the condition that the content is to be utilized according to the content usage conditions, the service provider decrypts the encrypted content key stored in the content usage-right certificate based on a unique key of the service provider.

In an embodiment of the content usage-right management method of the present invention, the content-usage condition information stored in the content usage-right certificate may be one of three modes: content usage-period restricted information, content usage-number restricted information, and content full-purchase without imposing any usage restriction. The request to change the content-usage condition information from the user device may include at least one of a change in a content usage-period restriction, a change in a content usage-number restriction, and a change among the three modes: a usage period restriction, a usage number restriction, and content full-purchase. The service provider may generate, upon receiving the content usage-right certificate involving the request to change the content-usage condition information from the user device, an upgraded content usage-right certificate by performing at least one of a change in the content usage-period restriction, a change in the content usage-number restriction, or a change among the three modes: the usage-period restriction, the usage-number restriction, and the content full-purchase for changing the content-usage condition information recorded in the received content usage-right certificate, and sends the upgraded content usage-right certificate to the user device.

In an embodiment of the content usage-right management method of the present invention, the content-usage conditions stored in the content usage-right certificate may include usage condition information in which on-line usage that requires a determination of usage rights in the service provider or off-line usage that does not require a determination of usage rights in the service provider is set. The service provider may generate, upon receiving the content usage-right certificate involving the request to change the content-usage condition information from the user device, an upgraded content usage-right certificate by changing the usage-condition information between on-line usage and off-line usage for changing the content-usage condition information recorded in the received content usage-right certificate, and sends the upgraded content usage-right certificate to the user device.

In an embodiment of the content usage-right management method of the present invention, a digital signature of an entity that has issued the content usage-right certificate may be attached to the content usage-right certificate, and the service provider may generate an upgraded content usage-right certificate upon receiving the content usage-right certificate when it is determined that data is not tampered with by verifying the digital signature.

In an embodiment of the content usage-right management method of the present invention, the content usage-right certificate may store therein link information concerning a public key certificate corresponding to the content usage-right certificate, and the service provider may generate an upgraded content usage-right certificate upon receiving the content usage-right certificate on the condition that the integrity of the content usage-right certificate is determined by verifying the public key certificate obtained by the link information.

A fourth aspect of the present invention is a content usage-right management method used in a system which comprises a user device which utilizes content, and a service provider which distributes a content usage-right certificate in which purchased content information is stored to the user device.

The user device sends the content usage-right certificate to the service provider.

The service provider generates, based on the content information stored in the content usage-right certificate received from the user device, a content usage-right certificate corresponding to an item of content belonging to an album which consists of a set of items of content, which belong to the same group of content as the content information stored in the received content usage-right certificate, as an upgraded content usage-right certificate, and sends the upgraded content usage-right certificate to the user device.

In an embodiment of the content usage-right management method of the present invention, a digital signature of an entity that has issued the content usage-right certificate may be attached to the content usage-right certificate. The service provider generates an upgraded content usage-right certificate upon receiving the content usage-right certificate when it is determined that data is not tampered with by verifying the digital signature.

In an embodiment of the content usage-right management method of the present invention, the content usage-right certificate may store therein link information concerning a public key certificate corresponding to the content usage-right certificate, and the service provider may generate an upgraded content usage-right certificate upon receiving the content usage-right certificate on the condition that the integrity of the content usage-right certificate is determined by verifying the public key certificate obtained by the link information.

A fifth aspect of the present invention is an information processing apparatus used in a system which comprises a user device which utilizes content, and a service provider which distributes a content usage-right certificate in which purchased content information is stored to the user device, the information processing apparatus issuing the content usage-right certificate.

The information processing apparatus is configured to receive a request to change content-usage conditions of the issued content-usage condition information from the user device, verifies the received content usage-right certificate, and generates an upgraded content usage-right certificate by changing the content-usage condition information recorded in the received content usage-right certificate on the condition that the integrity of the content usage-right certificate is determined by verifying the received content usage-right certificate, and sends the upgraded content usage-right certificate to the user device.

In an embodiment of the information processing apparatus of the present invention, the information processing apparatus may be configured to generate, upon receiving the content usage-right certificate involving the request to change the content-usage condition information from the user device, an upgraded content usage-right certificate by performing at least one of a change in a content usage-period restriction, a change in a content usage-number restriction, or a change among three modes: the usage-period restriction, the usage-number restriction, and the content full-purchase for changing the content-usage condition information recorded in the received content usage-right certificate, and sends the upgraded content usage-right certificate to the user device.

In an embodiment of the information processing apparatus of the present invention, the content-usage conditions stored in the content usage-right certificate may include usage condition information in which on-line usage that requires a determination of usage rights in the service provider or off-line usage that does not require a determination of usage rights in the service provider is set. The information processing apparatus may be configured to generate, upon receiving the content usage-right certificate involving the request to change the content-usage condition information from the user device, an upgraded content usage-right certificate by changing the usage-condition information between on-line usage and off-line usage for changing the content-usage condition information recorded in the received content usage-right certificate, and sends the upgraded content usage-right certificate to the user device.

In an embodiment of the information processing apparatus of the present invention, a digital signature of an entity that has issued the content usage-right certificate may be attached to the content usage-right certificate. The information processing apparatus may be configured to generate an upgraded content usage-right certificate upon receiving the content usage-right certificate when it is determined that data is not tampered with by verifying the digital signature.

In an embodiment of the information processing apparatus of the present invention, the content usage-right certificate may store therein link information concerning a public key certificate corresponding to the content usage-right certificate. The information processing apparatus may be configured to generate an upgraded content usage-right certificate upon receiving the content usage-right certificate on the condition that the integrity of the content usage-right certificate is determined by verifying the public key certificate obtained by the link information.

A sixth aspect of the present invention is a computer program allowing, in a system which comprises a user device which utilizes content, and a service provider which distributes a content usage-right certificate in which purchased content information is stored to the user device, processing for issuing a content usage-right certificate to be executed on a computer system. The computer program comprises:

a step of receiving a request to change content-usage conditions of the issued content-usage condition information;

a step of verifying the received content usage-right certificate; and a step of generating an upgraded content usage-right certificate by changing the content-usage condition information recorded in the received content usage-right certificate on the condition that the integrity of the content usage-right certificate is determined by verifying the received content usage-right certificate, and sending the upgraded content usage-right certificate to the user device.

The computer program of the present invention is a computer program which can be provided in a computer-readable recording medium or communication medium, for example, a recording medium, such as a CD, an FD, or an MO, or a communication medium, such as a network, to a computer system that can execute various program codes. Such a program is provided in a computer readable format, thereby implementing the processing in accordance with the program on a computer system.

Further objects, features and advantages of the present invention will become apparent from the following detailed description of the preferred embodiments with reference to the attached drawings. In this specification, the system is a logical group of a plurality of devices. It is not essential that the devices be disposed in the same housing.

BRIEF DESCRIPTION OF THE DRAWINGS

FIG. 1 illustrates an overview of the configuration of a content-usage management system of the present invention.

FIG. 2 illustrates a format of a public key certificate which can be used in the content-usage management system of the present invention.

FIG. 3 illustrates the format of a public key certificate which can be used in the content-usage management system of the present invention.

FIG. 4 illustrates the format of a public key certificate which can be used in the content-usage management system of the present invention.

FIG. 6 is a diagram illustrating the configuration of a security chip of a user device.

FIG. 7 illustrates main data to be processed in the user device.

FIG. 8 is a sequence of authentication information (password) initial registration processing.

FIG. 21 illustrates a relationship between a public key certificate (PKC) and an attribute certificate (AC).

FIG. 24 is a flowchart (example 2) of attribute certificate (AC) verification processing.

BEST MODE FOR CARRYING OUT THE INVENTION

[Overall System]

Figure 5:
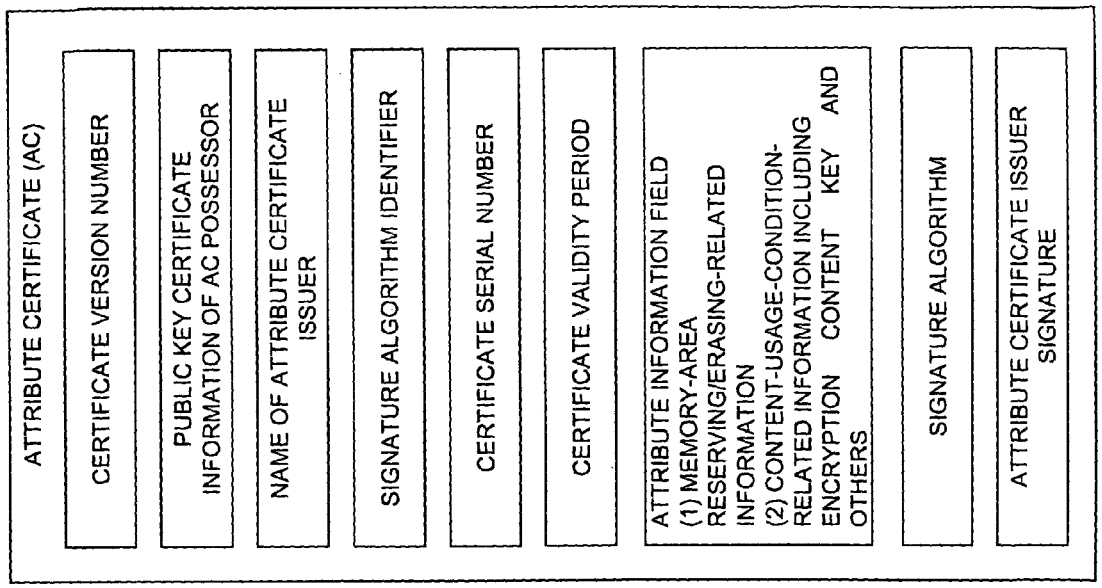
FIG. 5 illustrates a format of a right information certificate which can be used in the content-usage management system of the present invention.

FIG. 1 illustrates individual entities in a content-usage management system of the present invention, and schematically illustrates processing performed by the individual entities.

A user device 101 is a terminal of each user utilizing content, and more specifically, a PC, a game terminal, a playback device or a recording/playback device for DVDs or CDs. Such a terminal is provided with a tamper-resistant security chip having control means for controlling the encryption processing and content usage processing, which is described below. Many types of secure processing performed by the user device 101, such as data transfer, with a service provider (SP-CD) 102, which serves as a content distribution entity (content distributor), or another entity are controlled and executed within the security chip.

The service provider (content distributor) (SP-CD) 102 is a service provider that provides the content to the user device 101 having the security chip. A content creator 103 provides the content, i.e., the services, to the service provider (content distributor) (SP-CD) 102. A user device manufacturer 104 is an entity that manufactures the user device 101.

A support center 105 is a center that offers support for various types of processing performed in the user device 101. For example, the support center 105 performs various types of support processing, such as password recovery processing in case where the user forgets a password used as authentication information, or restoring processing by using content backup data created by the user device. A certification authority (CA) 106 issues a public key certificate (PKC) to each entity.

Any number of each of the entities, such as the user device 101, the service provider (content distributor) (SPCD) 102, the content creator 103, the user device manufacturer 104, the support center 105, and the certification authority (AC) 106, can be provided. In particular, although only one certification authority (CA) 106 is shown in FIG. 1, a plurality of certification authorities for issuing public key certificates required according to the processing in the individual entities may be provided.

The user device 101 receives the encrypted content from the service provider (content distributor) 102 via satellite communication, Internet communication, or a cable or wireless data communication network, and utilizes the content. The key for decrypting the encrypted content: content key Kc is encrypted and is stored in a content usage-right certificate, for example, an attribute certificate (AC) 110, as a right-information certificate indicating content usage rights. For decrypting and utilizing the content, it is necessary for the user terminal 101 provided with the security chip to receive the attribute certificate (AC) 110 from the service provider (content distributor) 102 and to extract the key from the attribute certificate and decrypt it.

The content usage-right certificate, for example, the attribute certificate (AC) 110, as the right-information certificate indicating the content usage rights records, not only the encrypted content key: Kc, but also the content usage-restriction information, such as a restricted number of usages and a usage period of the content. The user device 101 is able to utilize the content according to the content usage restrictions recorded in the attribute certificate (AC) 110, which serves as the content usage-right certificate.

A description of the embodiment is hereinafter given, assuming that the attribute certificate (AC) 110 stores the content usage information and the encrypted content key. However, a certificate in which the content usage information and the encrypted content key are stored is not restricted to the attribute certificate (AC) in compliance with the rules, and may be configured in a certain data format. That is, it is possible to utilize a content usage-right certificate in any data format as long as data certifying the content usage rights is stored and signature data of an issuing entity for verifying whether data is not tampered is added.

There are two modes in which the content or the attribute certificate (AC) is distributed from the service provider to the user device: one mode in which the distribution is made in response to a request from a user to the service provider; and the other mode is a so-called push mode (push model) in which the distribution is unconditionally made from the service provider to any user who has made, for example, a subscriber contract, regardless of whether there is a request from the user. Either mode can be utilized.

Among the entities shown in FIG. 1, the entities other than the certification authority 106, i.e., the user device 101, the service provider (content distributor) (SP-CD) 102, the content creator 103, the user device manufacturer 104, and the support center 105, are able to utilize and distribute the content according to predetermined rules, and thus perform the processing according to the predetermined rules. As an entity for setting and managing the rules, a system holder (SH) (not shown) is provided. The entities 101 through 105 shown in FIG. 1 perform the processing according to a content usage infrastructure and rules set by the system holder (SH).

For example, the user device manufacturer 104 stores a device identifier (ID) and various encryption keys, which are used for the content distribution, in a tamper-resistant security chip within a user device to be manufactured. In transferring the content, an attribute certificate, or other data among the user device 101, the service provider (content distributor) 102, the content creator (CC) 103, and the support center 105, mutual authentication processing or data encryption processing are performed based on the rules set by the system holder (SH).

The content is utilized in the user device 101 in compliance with the usage restrictions recorded in the attribute certificate. For example, when utilizing the content in which usage-number restrictions are set, a counter for counting the content usable number is updated under the control of the controller of the security chip within the device. The system holder (SH) is an entity for constructing and managing a platform in which the rules concerning the processing performed in each entity are determined.

[Public Key Certificate, Attribute Certificate]

An overview of the public key certificate and the attribute certificate used in the configuration in FIG. 1 is described below.

(Public key certificate (PKC))

The public key certificate is discussed below with reference to FIGS. 2, 3, and 4. The public key certificate is a certificate issued by a certification authority (CA), and the user or each entity submits the ID and the public key to the certification authority, and the certification authority adds information, such as the ID, of the certification authority and the validity period, and also adds a signature of the certification authority. The public key certificate is then created.

An example of the format of the public key certificate is shown in FIGS. 2 through 4. This example is a format compliant with ITU-T X.509.

The version is a version of the certificate format.

The serial number is a serial number of the public key certificate set by the public key certificate issuing authority (CA).

The signature is a signature algorithm of the certificate. The signature algorithm includes an elliptic curve cryptosystem and the RSA. When the elliptic curve cryptosystem is applied, the parameter and the key length are recorded, and when the RSA is applied, the key length is recorded.

The issuer is a field in which the name of the issuer of the public key certificate, that is, the name of the public key certificate issuing authority (IA), is recorded in a distinguished name.

In the validity, the start time and date and the end time and date of the validity period of the certificate are recorded.

In the subject public key information (subject Public Key Info), the key algorithm as the public key information of the certificate owner and the key are stored.

The certification authority key identifier (authority Key Identifier-key Identifier, authority CertIssuer, authority Cert Serial Number) is the information for identifying the key of the certificate issuer used for signature verification, and stores the key identifier, the name of the authority certificate issuer, and the authority certificate serial number.

The subject key identifier stores the identifiers of the individual keys when a plurality of keys are certified in the public key certificate.

The key usage is a field in which the purpose for the usage of the key is designated: (0) for digital signature; (1) for non repudiation; (2) for key encryption; (3) for message encryption; (4) for common key delivery; (5) for authentication signature checking; and (6) for signature checking of a revocation list.

In the private key usage period, the validity period of the private key corresponding to the public key stored in the certificate is recorded.

In the certification authority policies (certificate policies), the certificate issuing policies of the public key certificate issuer, for example, the policy ID and the authentication standards in compliance with ISO/IEC9384-1 are recorded.

The policy mapping is a field in which information concerning the policy-related restrictions in the authentication path is stored, and is required only in the certificate of the certification authority (CA).

The subject alternative name (subject Alt Name) is a field in which an alternative name of the certificate owner is recorded.

The issuer alternative name (issuer Alt Name) is a field in which an alternative name of the certificate issuer is recorded.

The subject directory attribute is a field in which the attribute of the directory required for the certificate owner is recorded.

The basic constraint is a field for determining whether the public key to be certified is for the signature of the certification authority (CA) or for the certificate owner.

The name constraints permitted subtree is a field in which the information concerning the permitted names of the certificate issued by the issuer is stored.

The policy constraint is a field in which the policy-related restriction information in the authentication path is stored.

The CRL reference point (Certificate Revocation List Distribution Points) is a field in which the reference point of a revocation list for checking whether the certificate is revoked when the certificate owner utilizes the certificate is indicated.

The signature algorithm is a field in which the algorithm used for adding a signature to the certificate is stored.

The signature value is a field in which the signature of the public key certificate issuer is recorded. The digital signature is obtained by generating a hash value by applying a hash function to the overall certificate and by generating data by using a private key of the issuer for the hash value. The addition of a signature or the generation of a hash value is insufficient for preventing the tampering. However, the signature data can be determined to be correct or incorrect, which is thus substantially equivalent to the fact that data tampering can be prevented.

The certification authority issues the public key certificate shown in FIGS. 2 through 4, and also updates the expired public key certificate, and creates, manages, and distributes a revocation list for revoking the illegal users (which is collectively referred to as "revocation"). The certification authority also generates a public key and a private key if necessary.

When utilizing this public key certificate, the user checks the digital signature of the public key certificate by using the public key of the certification authority owned by the user, and after the digital signature is successfully verified, the user extracts the public key from the public key certificate to utilize it. Accordingly, it is necessary for all the users utilizing the public key certificate to possess the common public key of the certification authority.

(Attribute Certificate (AC))

The attribute certificate is discussed below with reference to FIG. 5. There are largely two types of attribute certificates. One type is a certificate containing the attribute information of the owner concerning the rights, such as the content-usage rights. The other type is the attribute certificate (AC) for reserving or erasing an area for a service provider (SP), that is, the attribute certificate (AC) containing area-reserving/erasing permission information used for reserving or erasing an information storage area for the service provider (SP) in or from the memory within the user device.

The format of the attribute certificate is defined by ITU-T X.509, and the profile is defined in IETF PKIX WG. Unlike the public key certificate, the attribute certificate does not contain the public key of the owner. However, since the signature of the attribute certificate authority is added, a determination as to whether data is not tampered with can be made by checking this signature, as in the public key certificate.

In the configuration of the present invention, the service provider (content distributor) (SP-CD) 102 may also serve as the attribute certificate authority for issuing and managing the attribute certificate (AC). The present invention may be configured in a different manner. The attribute certificate must always be used while being related to the public key certificate. More specifically, the integrity of the owner is checked by the public key certificate, and the attribute certificate only indicates the rights given to the owner. When verifying the attribute certificate, the related public key certificate is also checked after verifying the signature of the attribute certificate.

In this case, it is preferable in principle that a linkage of the certificates is traced to sequentially verify the public key certificates up to the highest public key certificate. In a hierarchical structure formed of a plurality of certification authorities (CAs), the public key certificate of a lower certification authority is certified by the signature of a higher certification authority that has issued the public key certificate to the lower certification authority. That is, a linkage configuration in which a higher public key certificate issuing authority (CA-High) issues a public key certificate to a lower public key certificate issuing authority (CA-Low) is provided. The verification of the public key certificates in a linkage manner means that a linkage of the certificates is traced from the lower authority to the higher authority to obtain linkage information up to the highest public key certificate, thereby verifying the signatures of the public key certificates up to the highest authority (root CA).

The revocation processing may be omitted by setting the validity period of the attribute information to be short. In this case, the certificate revocation procedure and the reference procedure of the revocation information can be omitted, and thus, the system can be advantageously simplified. However, some measures other than the revocation list should be taken against the illegal use of the certificates. In the authentication system of the present invention, not only the content-usage rights, but also the content key for decrypting the content are embedded in the attribute certificate. Accordingly, the user device having authorized content-usage rights is able to utilize the content by receiving the authorized attribute certificate.

The configuration of the attribute certificate shown in FIG. 5 is as follows.

The certificate version number is a version of the certificate format.

The public key certificate information of the AC possessor is information concerning the public key certificate (PKC) corresponding to the issuer of the attribute certificate (AC). The public key certificate information includes the name of the PKC issuer, the PKC serial number, and the unique identifier of the PKC issuer, and serves as link data for linking the corresponding public key certificate.

The name of the attribute certificate issuer is a field in which the issuer of the attribute information, i.e., the name of the attribute certificate authority (AA) is recorded in a distinguished name.

The signature algorithm identifier is a field in which the signature algorithm identifier of the attribute certificate is recorded.

In the validity period of the certificate, the start time and date and the end time and date of the validity period of the certificate are recorded.

In the attribute information field, one of (1) memory-area reserving/erasing information and (2) content-usage-condition-related information is stored according to the usage mode of the attribute certificate. The content-usage-condition-related information contains the encrypted content key.

(1) The memory-area reserving/erasing information is recorded in the attribute certificate, which is issued for registering and setting or erasing a management area for each service provider in or from the memory of the security chip within the user device. The recorded information includes, for example:

service provider identifier (ID);
service provider name;
processing: memory-area reserving or memory-area erasing; and
area size: the size of the memory area.

The service provider sends the attribute certificate in which the above-described items are stored in the attribute information fields to the user device. After verifying the attribute certificate, the user device reserves a memory area or erases the reserved memory area in or from the security chip of the user device according to the recording of the attribute information fields of the received attribute certificate.

(2) The content-usage-condition-related information is information stored in the attribute information fields of the attribute certificate, which is issued in correspondence with the content provided by the service provider. The content-usage-condition-related information includes various usage conditions, such as a restricted number of content usages and a usage period, and also includes encrypted data of a content key, which is used for encrypting the content. The recorded information includes, for example:

service provider identifier (ID);
service provider name;
application identifier (ID): ID information of the content;
conditions: information indicating whether the content is to be used on-line or off-line, and information indicating whether the content is to be fully purchased (full-purchase), to be used with a restricted period, to be used on-line with a restricted number of usages, or to be used off-line with a restricted number of usages;
validity period: information indicating the validity period if the period of the content usage is restricted;
restricted number of usages: possible usage number if the number of usages is restricted;
payment conditions: payment conditions for the content; and
content key: encrypted content key stored together with encryption algorithm information.

As indicated in the above-described condition field, the usage of the content has (1) an on-line usage mode and (2) an off-line usage mode. The usage of the content also includes the modes: (a) the content is purchased and is then freely used; (b) the validity period of the content is set with period restrictions; and (c) the number of content usages is set with usage-number restrictions. A mode in which the period restrictions and the usage-number restrictions are combined is also available. In the user device, the content is utilized according to the mode recorded in the attribute certificate. Specific examples of these modes are described below.

An encrypted key obtained by encrypting the content key: Kc, which is used as a decryption key for the encrypted content, is also stored. The types of keys, which are directly or indirectly used for encrypting the content key: Kc, are as follows:

(a) service-provider (SP) storage public key: SC.Stopub .SP.K corresponding to a SP storage private key stored in each service-provider management area of the security chip in the user device (public key system);
(b) SP storage key stored in each service-provider management area of the security chip in the user device (common key system);
(c) private key possessed by the service provider: SP.Sto.K; and
(d) global common key: Kg generated as a common key possessed by the system holder (SH) and the user device.

Details of the processing using such keys are given below.

The signature algorithm is recorded in the attribute certificate, and a signature is added by the attribute certificate authority (AA), which is the attribute certificate issuer. The digital signature is obtained by generating a hash value by applying a hash function to the overall attribute certificate and by generating data by using the private key of the attribute certificate issuer (AA) for the hash value.

[Security Chip Configuration]

The configuration of a security chip formed in a user device, which serves as an information processing apparatus utilizing the content, is described below with reference to FIG. 6. The user device is formed of a PC, a game terminal, a playback device or a recording/playback device for DVDs or DCs provided with a CPU as data processing means and a communication function, and a tamper-resistant security chip is implemented in the user device. An example of the user device itself is discussed at the end of the specification. The user device provided with a security chip is manufactured by the user device manufacturer 104 shown in FIG. 1.

As shown in FIG. 6, a user device 200 has a built-in security chip 210, which is configured to transfer and receive data to and from a user device controller 221. The security chip 210 includes a CPU (Central Processing Unit) 201 having a program execution function and a computation function, and also includes a communication interface 202 having a data communication interface, a ROM (Read Only Memory) 203 storing various programs executed by the CPU 201, such as an encryption processing program, and a master key: Km stored when the device is manufactured, a RAM (Random Access Memory) 204 serving as a load area for the execution program and a work area for the program processing, an encryption processor 205 performing encryption processing, such as authentication processing with external devices, digital-signature generating and checking processing, and encrypting and decrypting of the stored data, and a memory 206 formed of, for example, an EEPROM (Electrically Erasable Programmable ROM), in which the above-described service provider information and device unique information containing various key data are stored. Details of such stored information are given below.

The user device 200 includes an external memory 222 consisting of, for example, an EEPROM or a hard disk, as an area storing the encrypted content. The external memory 222 can also be used as a storage area for public key certificates and attribute certificates, and can also be used as a storage area for a content-usage-number management file, which is discussed below.

When the user device having the built-in security chip performs data transfer by being connected with an external entity, for example, a service provider, mutual authentication is performed between the security chip 210 and the external entity, and the transfer data is encrypted if necessary. Details of such processing are given below.

Examples of data to be processed in the security chip of the user device are shown in FIG. 7. Many items of such data are stored in the memory 206, which is formed of an EEPROM (Electrically Erasable Programmable ROM), such as a flash memory, as one type of non-volatile memory. However, data, which is stored when being manufactured and is not rewritable, for example, a master key: Km, is stored in the ROM (Read Only Memory) 203. The public key certificate and the attribute certificate may be stored in the memory of the security chip or in an external memory.

Each data item is described below.

Public key certificate (PKC): the public key certificate is a certificate for certifying to a third party that an authorized public key is used. The certificate contains a public key to be distributed, and is provided with a digital signature by a reliable certification authority. The user device stores the public key certificate of the highest certification authority (root CA) of the above-described hierarchical structure, the public key certificate of the service provider registered in the user device, that is, the public key certificate of the service provider whose memory area is reserved in the user device, and the public key certificate of the support center which offers support, for example, password recovery processing.

Attribute certificate (AC): in contrast to the public key certificate indicating the "integrity" of the certificate user (owner), the attribute certificate indicates the rights of the certificate user. By providing the attribute certificate, the user is able to utilize an application or reserve an area based on the rights indicated in the attribute certificate. The types and the functions of attribute certificates are as follows.

(a) Application-usage-management attribute certificate (AC): an application means, in a broad sense, so-called content, and the types of applications include games, music, movies, financing information. Application usage rights are indicated in the application-usage-management attribute certificate (AC), and by providing and verifying, or locally verifying the attribute certificate (AC) to the service provider (SP), the use of the application is permitted within the usage rights indicated in the attribute certificate (AC). The rights concerning the application usages indicate whether the application can be used on-line or off-line, and also include restricted usage period information or usage number information for on-line content. For off-line content, a description whether the content is restricted with a restricted usage number, or whether the content is fully purchased is also given.

(b) Service-provider (SP) memory-area-management (reserving) attribute certificate (APC): when registering a service provider (SP) in the user device, it is necessary to reserve an SP-information storage area in the user device. The area-reserving permission information is stored in the attribute certificate (AC), and the user device reserves an SP area in the user device according to the information stored in the attribute certificate (AC).

(c) Service-provider (SP) memory-area-management (erasing) attribute certificate (AC): this is an attribute certificate (AC) in which information indicating that the deletion of an SP area reserved in the user device is permitted is stored. The user device deletes the SP area in the user device according to the information stored in the attribute certificate (AC).

Key data: as key data, a pair of a public key and a private key set for the device, a storage key used as an encryption key for storing data, such as the content, a random-number generating key, and a mutual authentication key are stored.

The storage key is used for at least one of encryption processing and decryption processing of a content key to be stored in the device. The storage keys include a device storage key and a service provider storage key. The service provider storage key is a key stored in each service provider management area for the corresponding service provider registered in the device, and is used for the content key provided by the corresponding service provider. The device storage key includes a global common key, which is shared only by the system holder and the device, and is used for distributing the encrypted content key while preventing the service provider from performing decryption processing. Details of the processing using such keys are given below.

ID information: ID information includes a device ID as an identifier of the user device itself, a service provider ID as an identifier of the service provider (SP) registered in the user device, and a user ID provided to the user to utilize the user device. Different user IDs can be provided for external entities, such as service providers. An application ID is an ID as ID information corresponding to the services or the content provided by the service provider (SP).

Others: in the user device, authentication information (for example, a password) for obtaining a permission for utilizing the information of the service provider (SP) registered in the user device is stored. By inputting the password, the information of the service provider (SP) registered in the user device can be obtained, and after obtaining the information, the usage of an application or content provided by the service provider can be permitted. If the user forgets authentication information (password), the authentication information (password) can be initialized (reset) by using a master password.

Seed information for generating random numbers is also stored. Random numbers are generated according to, for example, ANSI X9.17, during authentication processing or encryption processing.

The content usage number information or a hash value calculated based on the content usage number information is stored. Such information is required for strictly conforming to the use of the content within the restricted usage number indicated in the attribute certificate corresponding to the application or the content. As the ID information of the attribute certificate corresponding to the content, the application ID, the attribute-certificate serial number, and the restricted content usage number are stored. The addition of a signature or the generation of a hash value is insufficient for preventing the tampering. However, the signature data can be determined to be correct or incorrect, which is thus substantially equivalent to the fact that data tampering can be prevented.

[Memory Configuration in User Device]

In the memory 206 formed of an EEPROM (Electrically Erasable Programmable ROM), such as a flash memory, as one type of non-volatile memory, at least part of the above-described various items of data is stored, and such data is stored in the following three areas, which are divided and managed by the memory 206:

(1) device management area;
(2) system management area; and
(3) service provider management area.

Data Stored in these Areas are as follows.

(1) Device management area

In the device management area, information unique to the device without being dependent on the system is stored. This area is reserved first when the device is manufactured, and occupies the first few blocks of the non-volatile memory. In the device management area, at least the following data items are reserved and managed:

device ID;
random-number generating seed;
random-number generating encryption key;
mutual authentication key; and
device storage key.

The mutual authentication key is a key used for authenticating with an external entity to which the data within the security chip is output. The entities include user devices, such as game terminals, playback devices and recording/playback devices for DVDs or CDs provided with a security chip. Mutual authentication processing is performed using the mutual authentication key when data transfer is performed between the security chip and the user device provided with the security chip, or data communication is performed between the security chip and an external service provider via the user device. When mutual authentication is successfully performed, data is encrypted with a session key created during mutual authentication, and is transferred between the security chip and an external device.

The device storage key is a key for encrypting data in the security chip to be stored in an external device so as to prevent the data from being read or tampered with. The device storage key may be a public key or a common key. The random-number generating seed is data used as an initial seed when determining pseudo random numbers by calculation. The pseudo random numbers are calculated by using the random-number generating encryption key so as to generate random numbers.

The common-key device storage key includes a global common key shared only by the system holder and the device, and the global common key is used for distributing the encrypted content key while preventing the service provider from decrypting the content. Details of the global common key are given below.

(2) System management area

As in the device management area, the system management area is reserved in the memory area. The system management area stores and manages the following data items:

root certification authority (CA) public key certificate;
device public key certificate; and
device private key.

The root certification authority (CA) public key certificate is a certificate, which serves as the root for all the authentications in the security chip. By performing the above-described linkage verification by tracing the signatures of the other certificates, the root certification authority (CA) public key certificate is finally reached. The device public key certificate is a public key certificate used when performing mutual authentication with the service provider. When a device private key is externally created and imported, a device pubic key certificate is simultaneously generated. When a device private key and a device public key are generated in the device, the device public key is read from the device after generating the device private key and the device public key, and a device public key certificate is issued and is imported.

The device private key is a key for adding a signature to data and for authenticating the data. The private key is created with the public key as a pair. The private key is externally generated in advance and is securely imported into the device. Alternatively, the private key is generated in the device and is strictly protected from leaking to the outside.

(3) Service provider management area

The service provider (SP) management area is formed of a service provider (SP) management table and service provider (SP) management information. The service provider (SP) management table is a table indicating the address of each item of service provider (SP) information in the service provider (SP) management area and including the storage position information of each item of service provider (SP) information in the memory in correspondence with the identifier of the corresponding service provider.

The user device conducts membership registration for each service provider (SP) so that an area for each service provider (SP) is reserved in the service provider (SP) management area of the memory of the device. The area reserving/erasing processing is executed based on a description of the attribute certificate. The service provider (SP) management area stores the following items of information:

service provider (SP) private key;
service provider (SP) storage private key (public key system);
service provider (SP) storage key (common key system);
hash value of external management information;
content-usage-number control data;
authentication information; and
user information.

The service provider (SP) private key is a private key, which forms a pair with a public key, this pair being generated for each registered service provider (SP) and used for performing mutual authentication processing with the registered service provider (SP) or for transferring encrypted data. The service provider (SP) private key is a key required for performing mutual authentication between the registered service provider (SP) and the security chip.

The service provider (SP) storage private key (public key system) is a key for decrypting the encrypted content key when the content provided by the service provider can be used off-line, i.e., when the content does not have to be connected to the service provider every time it is utilized. The encrypted content key is obtained as follows. The encrypted content key is encrypted by the service provider by using the service provider (SP) storage public key corresponding to the service provider (SP) storage private key, and is stored in the attribute certificate (AC), and is then sent to the user device. The encrypted content key is decrypted with the service provider (SP) storage private key in the security chip of the user device, and then, the content key can be obtained.

The service provider (SP) storage key (common key system) is a key for decrypting the encrypted content key when the content provided by the service provider can be used off-line, i.e., when the content does not have to be connected to the service provider every time it is utilized. The service provider (SP) storage key is used for both encryption processing and decryption processing. Only one of the service provider (SP) storage private key (public key system) and the service provider (SP) storage key (common key system) may be stored and used.

The hash value of the external management information is used in the following manner. When the amount of data that is too large to be managed in the security chip is output to a specific area of an external memory, and the hash value of that area is managed in the security chip so as to prevent the tampering of the data. For example, if the number of usages of the content is restricted, the remaining number is managed by using the hash value. For the content with a restricted number of usages, there is no problem in reading the remaining-number information. However, the tampering of such information must be prevented. The addition of a signature or the generation of a hash value is insufficient for preventing the tampering. However, the signature data can be determined to be correct or incorrect, which is thus substantially equivalent to the fact that data tampering can be prevented.

Content usage number management data

There is a case in which the number of usages of an application (content) is locally controlled by the security chip. In this case, within the security chip, the application ID, the attribute certificate (AC) serial, and the number of usages are stored and managed. Details of the control processing for the content-usage-number control data are given below.

Authentication information

The authentication information is information for protecting the management information managed in the service provider (SP) management area. When connecting to the service provider (SP), the user is required to perform mutual authentication with the service provider (SP). The information required for mutual authentication is stored in the service provider (SP) management area. The authentication information is used for obtaining the information from this management area. Specifically, the authentication information is, for example, a password. If the user forgets the authentication information (password), a permission to use the management information of the service provider (SP) management area cannot be obtained. In this case, by inputting a master password, the authentication information itself can be reset or changed. Details of such processing are given below.

User information

The user information is information unique to the user, such as a user ID assigned by the service provider (SP).

[Password Management]

Details of the processing when the user device 101 shown in FIG. 1 receives the content provided by the service provider (content distributor) 102 and utilizes the content under the usage restrictions indicated in the attribute certificate, and details of various types of processing required for utilizing the content are described below. A description is first given of authentication information (password) for controlling access to the service provider management area of the memory area in the user device in which the information of the service provider which provides the content is stored.

(1) Authentication information (password) registration processing

In order to purchase content from various service providers controlled by the system holder or to perform processing for utilizing the purchased content, it is necessary for the user who has purchased the user device to set a service provider management area in the memory area of the user device and to store the management information of each service provider in the service provider management area. The service provider for which a management area has been set in the memory area of the user device is hereinafter referred to as a "registered service provider". The above-described attribute certificate is used for setting a service provider management area, and a service provider management area is set in the memory area of the user device based on the attribute certificate received by the user device from the service provider.

In order to access the registered service provider provided with a service provider management area and to purchase or utilize the content, it is necessary to first obtain the information in the service provider management area of the user device. In the service provider management area, the information required for performing mutual authentication processing between the user device and the service provider is stored, and the information must be first obtained to perform mutual authentication with the service provider.

For making access to the service provider management area, the user has to input authentication information (password), which is set for each registered service provider, via input means of the user device. In the subsequent description, "each service provider" is synonymous with "each registered service and each user". The security chip verifies the input password against the registered password, and only when they coincide with each other, the information in the service provider management area in the memory of the security chip can be obtained, and access to mutual authentication processing with the service provider can be performed.

The authentication information (password) is set for each service provider registered in the user device. The user himself/herself conducts initial registration of the password. Password initial registration processing is described below with reference to FIG. 8. In the sequence diagram of FIG. 8, the left side indicates the processing of the security chip, and the right side indicates the processing of the user interface of the user device provided with the security chip.

First, (1) the user inputs a request to start authentication-information (password) initial registration processing by designating the service provider for which a password is to be registered. (2) The security chip performs status checking by determining whether the service provider designated by the user is not a registered service provider for which a management area has been set in the memory of the security chip and a password has been set. After confirming that the service provider is not a registered service provider, (3) the security chip permits the authentication-information (password) initial registration processing.

(4) The user then inputs a password via the input means, such as a keyboard, from the user interface. (5) The controller of the security chip temporarily stores the input authentication information (password) in the memory, and (6) instructs the user to re-input the same password. (7) After re-inputting the password by the user, (8) the controller of the security chip verifies the re-input authentication information (password) against the authentication information (password) temporarily stored in the memory, and when verification is successfully performed, (9) the controller of the security chip writes the authentication information (password), and (10) reports a writing result to the user. If the writing result is OK, the registration processing is completed. (11) If the writing result is NG, the process returns to processing (1).

(2) Authentication information (password) changing processing

Figure 9:
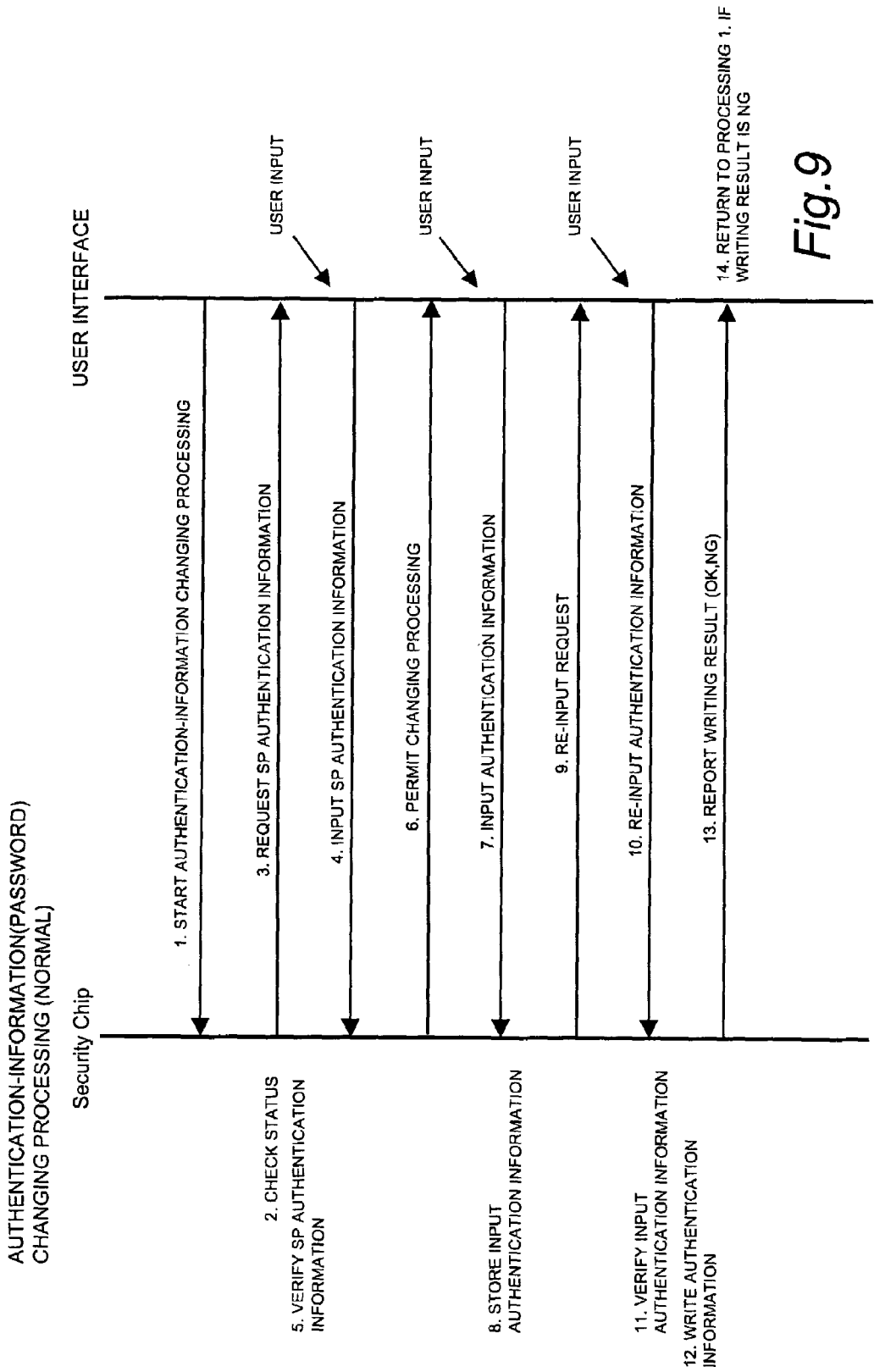
FIG. 9 is a sequence of authentication information (password) changing processing.
Figure 10:
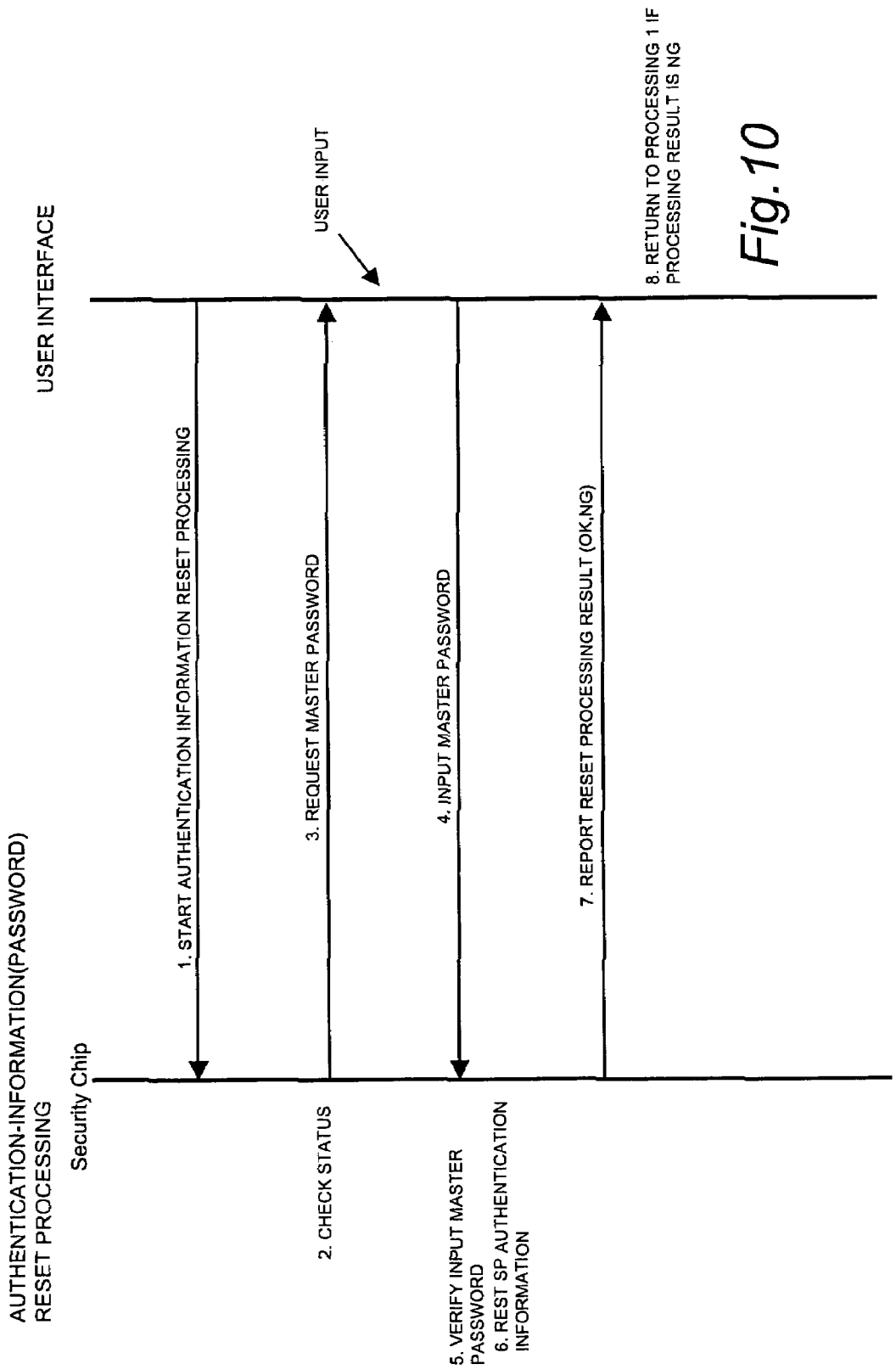
FIG. 10 is a sequence of authentication information (password) changing processing.

The sequence diagram for the password changing processing is shown in FIGS. 9 and 10. There are two processing modes for password changing: changing processing using a registered password (normal); and changing processing using a master password (urgent).

The normal password changing processing, namely, the changing processing using a registered password, is discussed based on the sequence diagram of FIG. 9. The left side indicates the processing of the security chip, and the right side indicates the processing of the user interface of the user device provided with the security chip.

First, (1) the user inputs a request to start authentication information (password) changing processing by designating the service provider for which the password is to be changed. (2) The security chip performs status checking by determining whether the service provider designated by the user is not a registered service provider (SP) for which a management area has been set in the memory of the security chip and the password has been set. After confirming that the service provider is not a registered service provider, (3) the security chip requests the user to input the registered authentication information (password).

(4) The user inputs the registered password via the input means, such as a keyboard, from the user interface. (5) After checking the input, the controller of the security chip verifies the input password against the registered authentication information (password) written into the service provider management area.

After verification is successfully performed, (6) the security chip reports a changing processing permission to the user. (7) The user inputs new authentication information (password) via the input means, such as a keyboard, from the user interface. (8) The controller of the security chip temporarily stores the input authentication information (password) in the memory, and (9) requests the user to re-input the same password. (10) After re-inputting the password by the user, (11) the controller of the security chip verifies the re-input authentication information (password) against the authentication information (password) temporarily stored in the memory, and when verification is successfully performed, (12) the controller of the security chip writes the authentication information (password), and (13) reports a writing result to the user. If the writing result is OK, the processing is completed. (14) If the writing result is NG, the process returns to processing (1).

(3) Authentication information (password) reset processing using master password The authentication information (password) reset processing using a master password executed in, for example, urgent password changing processing, is discussed below with reference to the sequence diagram of FIG. 10. The left side indicates the processing of the security chip, and the right side indicates the processing of the user interface in a terminal provided with the user device having the security chip.

First, (1) the user inputs a request to start authentication information (password) reset processing by designating the service provider for which the password is to be changed. (2) The security chip performs status checking by determining whether the service provider designated by the user is not a registered service provider (SP) for which a management area has been set in the memory of the security chip and the password has been set. After confirming that the service provider is not a registered service provider, (3) the security chip requests the user to input the master password. (4) The user inputs the master password via the input means, such as a keyboard, from the user interface. (5) The controller of the security chip verifies the input master password so as to determine whether the correct master password has been input, and if it is determined that the correct master password has been input, (6) the security chip initializes the registered authentication information (password) written into the service provider management area, that is, resets the registered authentication information (password).

After reset processing, (7) the controller of the security chip reports a processing result to the user. If the processing result is OK, the user performs the above-described authentication information (password) registration processing. This processing is similar to that described with reference to FIG. 8, and an explanation thereof is thus omitted. (8) If the processing result is NG, the process returns to processing (1).

As discussed with reference to the processing sequence of FIG. 10, the master password is used for initializing, i.e., resetting, the registered authentication information (password) of each registered service provider. The authentication-information initializing (reset) processing using the master password is valid for the authentication information of all the service providers registered in the security chip.

Figure 11:
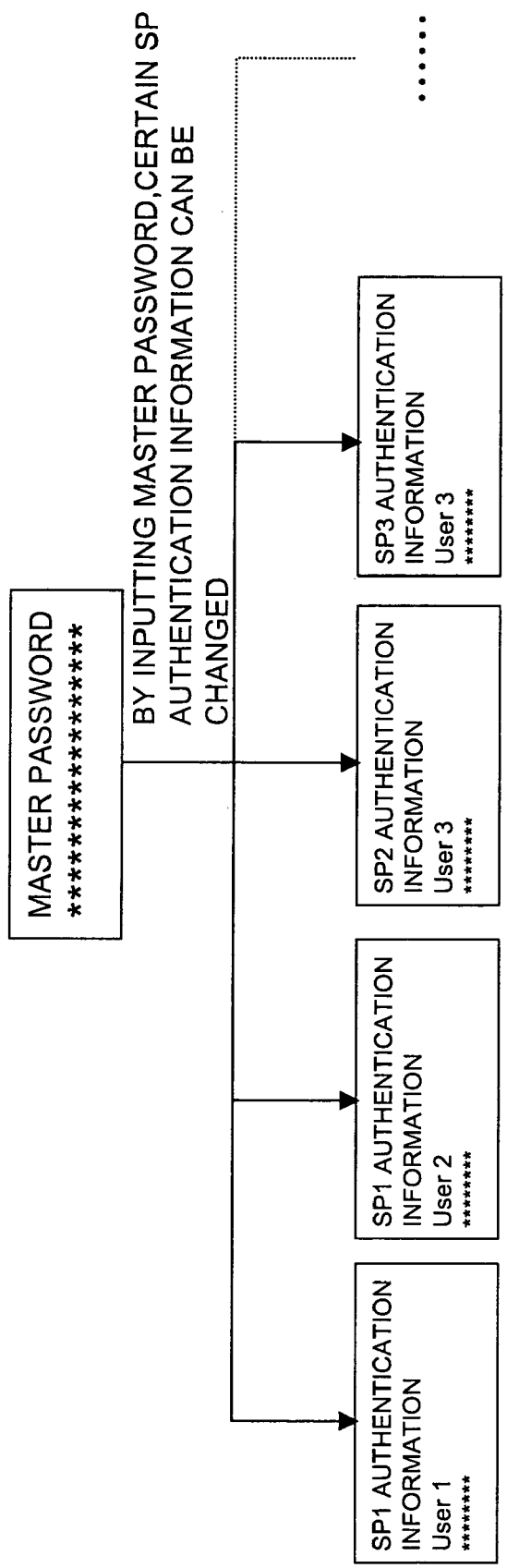
FIG. 11 illustrates a relationship between authentication information (password) and a master password.

FIG. 11 is a diagram illustrating the relationship between the master password and authentication information (password) of each registered service provider. As shown in FIG. 11, the master password is present as the highest password for the authentication information for each service provider, and by inputting the master password, the authentication information (password) for each registered service provider can be initialized (reset), and new authentication information can be re-registered as authentication information for each registered service provider.

Figure 12:
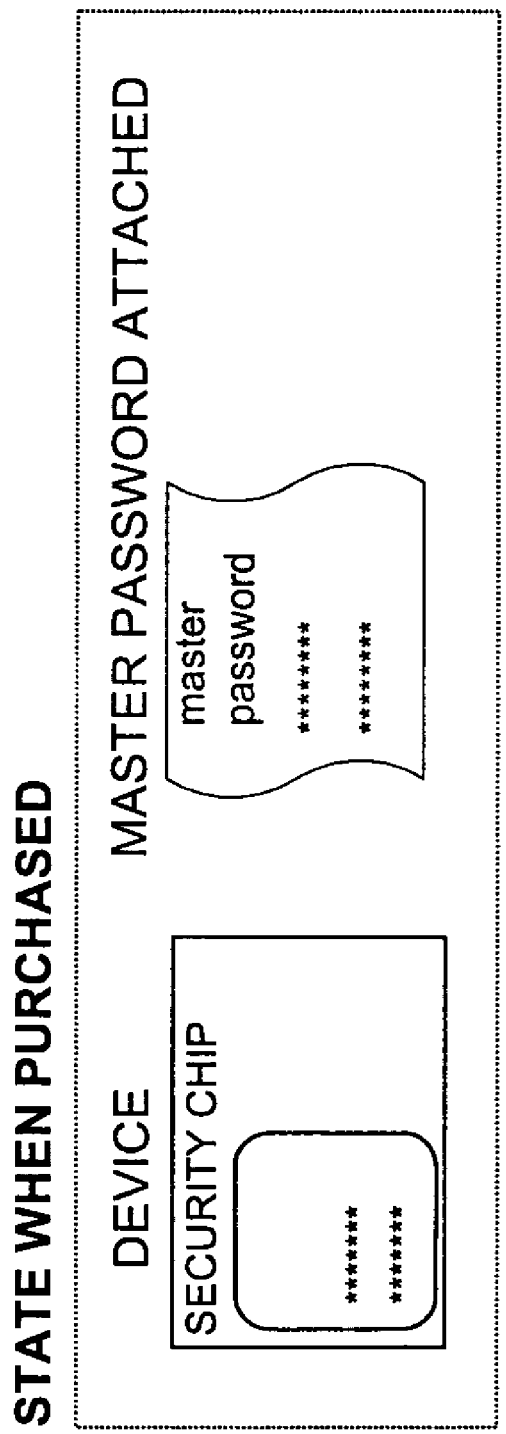
FIG. 12 illustrates mater-password distribution processing.

As shown in FIG. 12, the master password can be distributed by, for example, attaching a printed sheet to the user device when the user device is purchased. The master password is written in a factory when the device is manufactured, and cannot be read from the device by the user. The master password is generated based on the device ID, which is an identifier unique to the device, and the master key. The master key is a key set for each information processing apparatus or a group of information processing apparatuses.

Figure 13:
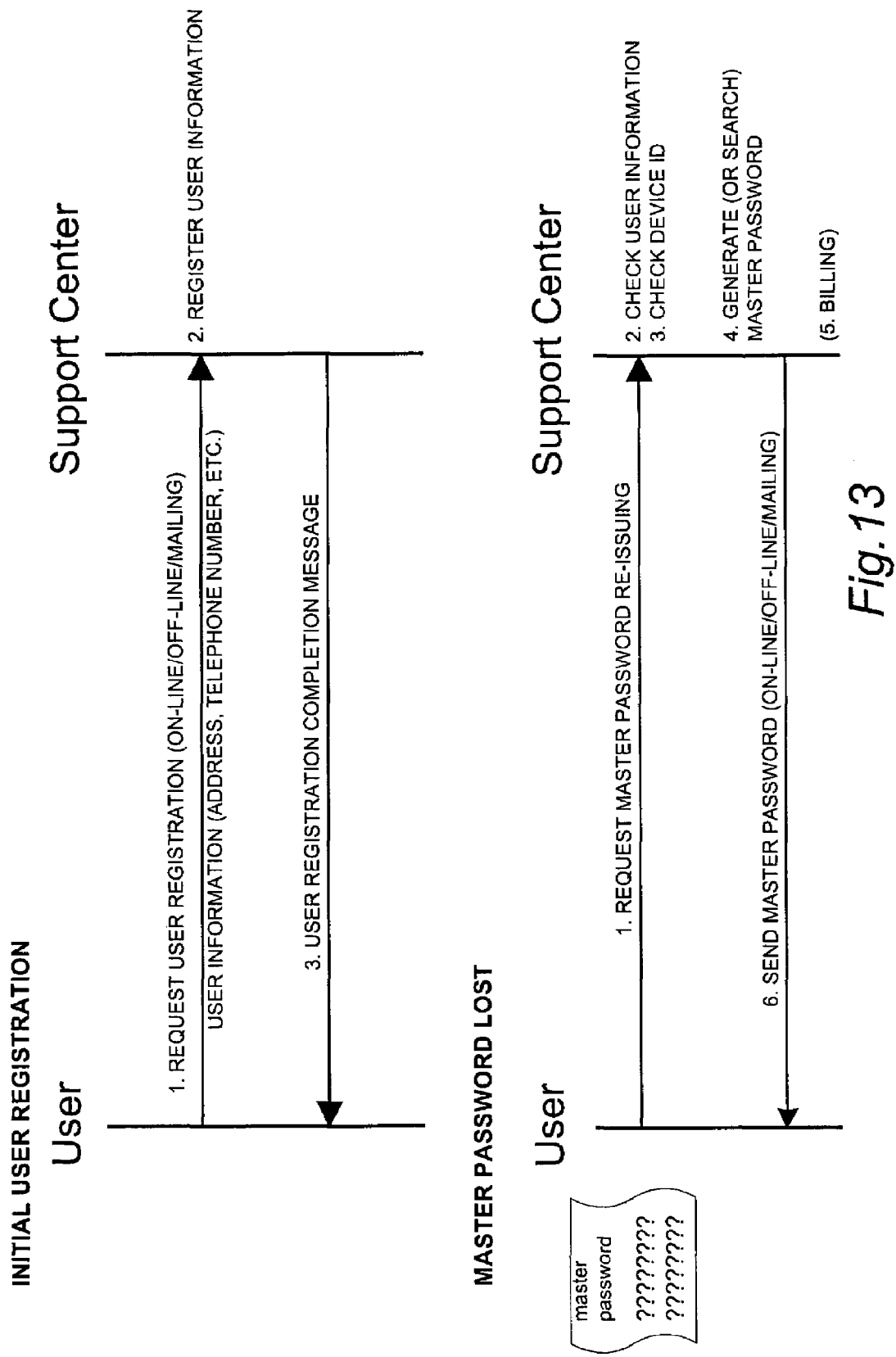
FIG. 13 is a sequence of master-password re-issuing processing.

If the user forgets the master password, the master password can be re-issued on the condition that registration is conducted in the support center. FIG. 13 is a sequence diagram illustrating the user registration processing and the master password re-issuing processing between the user and the support center.

The upper section of FIG. 13 is a diagram illustrating a user registration processing sequence conducted between the user and the support center. The user is able to conduct user registration by sending a registration sheet attached to the purchased device by mail or by being connected to the support center via a terminal in which the device has been set. User registration is conducted by registering data, such as the user address, telephone number, and device ID, in the support center. When user registration is completed in the support center, a user registration completion message is sent by mail or transmitted from the support center to the user.

The lower section of FIG. 13 indicates a master-password re-issuing processing sequence conducted between the user and the support center in case where the user forgets the master password. The user sends a master-password re-issuing request to the support center together with user information data provided with the device ID. Upon receiving the request, the support center determines whether the user information and the user ID coincide with the registered data, and if they coincide with each other, the support center searches for the master password based on the user device ID, or generates a master password using the master key. The support center has a master-password storage database in which the device IDs set for the user devices, which serves as information processing apparatuses, as the device identifiers are related to the master passwords. Alternatively, the support center has a master-key storage database in which the device IDs are related to keys unique to the individual devices or a common master key for a group of devices. If the support center has a master-password storage database, it searches the database for the master password based on the device ID. If the support center has a master-key storage database, it generates a master password by encrypting the device ID with the master key, and sends the generated master password to the user device.

Figure 14:
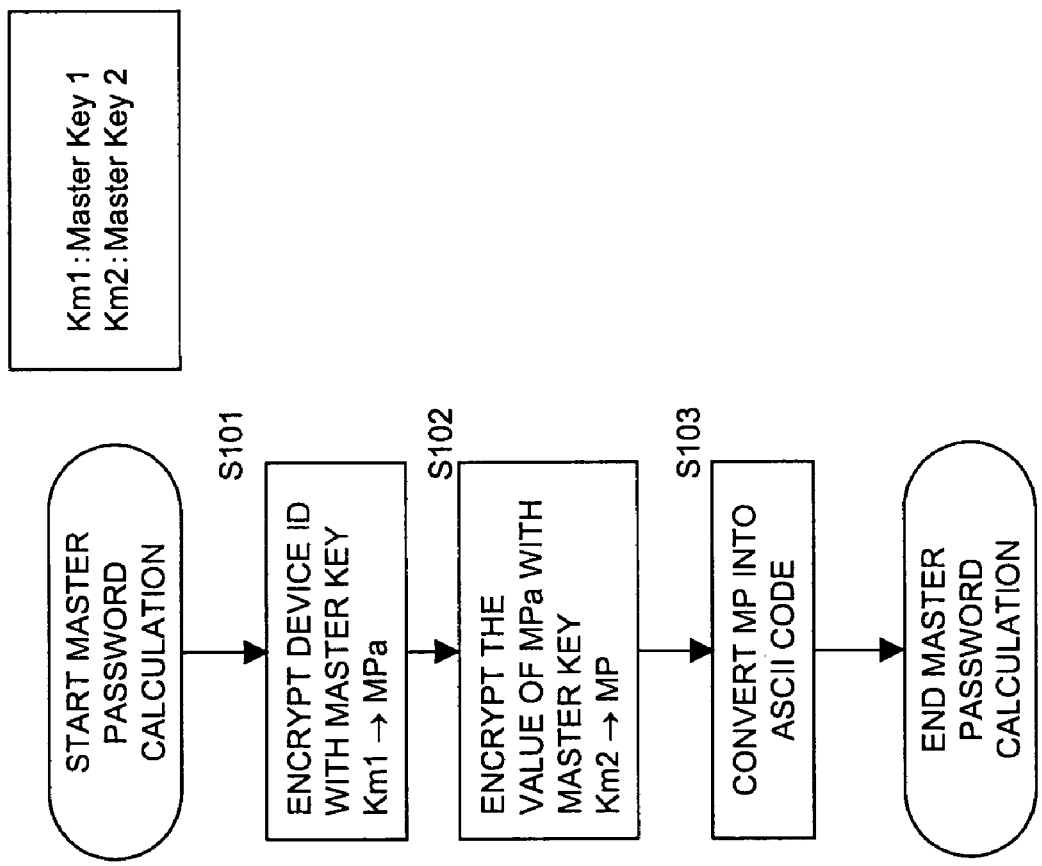
FIG. 14 is a flowchart illustrating master-password calculation processing.

A master-password generating processing flow by using the master key based on the user device ID is shown in FIG. 14. The flow of FIG. 14 is discussed below. In step S101, the device ID is encrypted by using master key Km1. In step S102, the resulting value is set to MPa, and the result MPa is encrypted with master key Km2 to obtain password MP. In step S103, password MP is converted into ASCII code. Encryption processing is performed by using an encryption algorithm, such as DES, triple DES. Master keys Km1 and Km2 are common keys set for a plurality of devices, and the support center selects master keys to be used from a plurality of keys stored in the support center based on the user device ID.

Returning to the sequence diagram of FIG. 13, after generating the master password in the support center, the support center transmits or sends by mail the master password to the user or the user device on-line or off-line.

According to the above-described sequence, the user is able to re-issue the master password by using the support center. The user device and the support center perform mutual authentication processing as pre-processing for transmitting and receiving data, and it is preferable that private data to be transmitted and received, for example, user ID and master password, be encrypted with a session key created during mutual authentication, and that signature creation and verification be performed for preventing the tampering of the data. Details of the mutual authentication, signature creation, and verification are discussed below in the section of content distribution processing.

Alternatively, the user may perform the master password re-issuing processing off-line by using the support center. In this case, the user fills information for proving the integrity of the user in a postcard and sends it.

[Content Distribution Processing]

After registering a service-provider management area in the memory of the security chip in the user device and registering the information required for authentication with the service provider, such as the password, content can be purchased by communicating with the service provider using such information. Details of the content purchase processing are described below.

Figure 15:
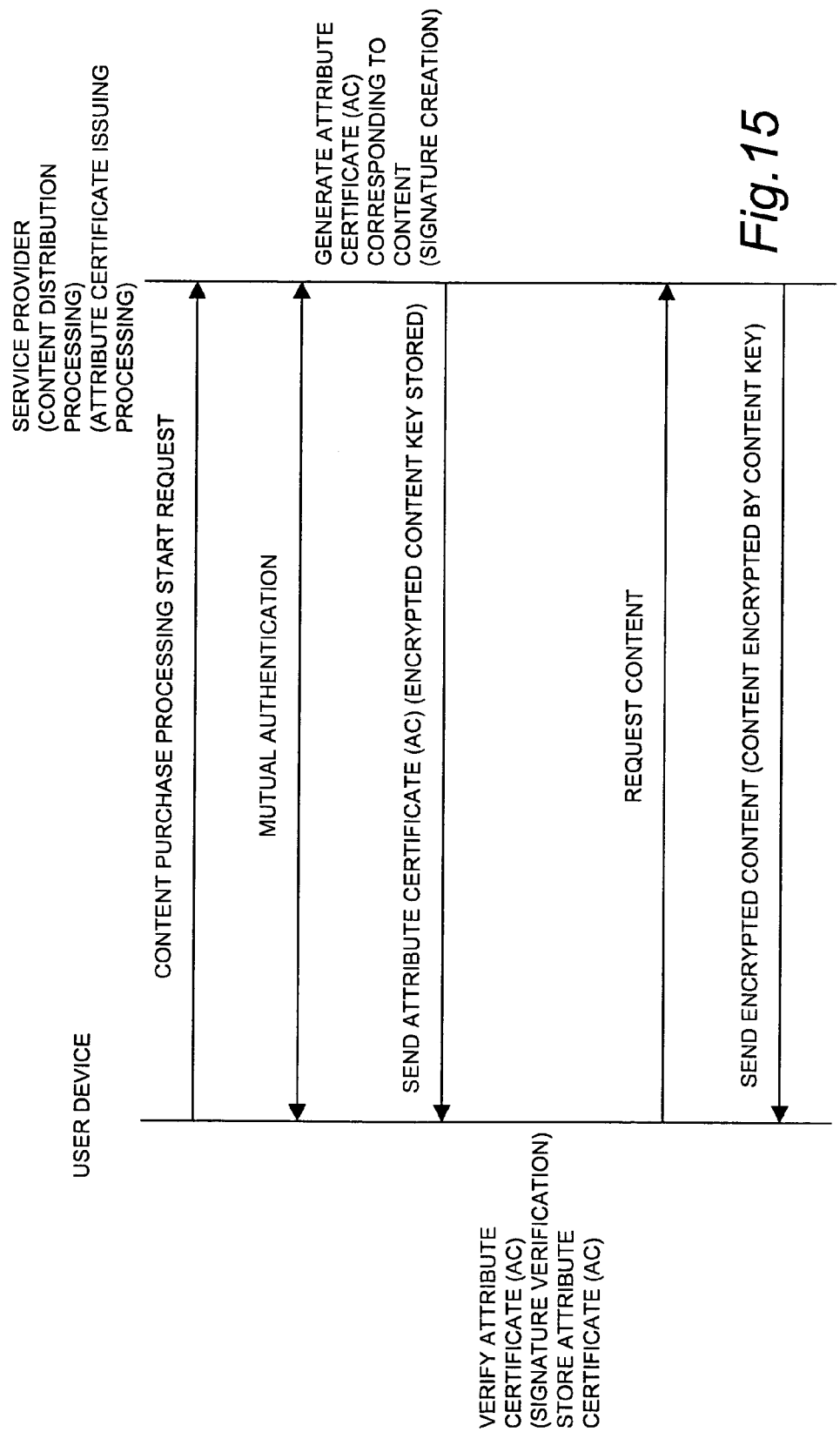
FIG. 15 is a sequence of attribute certificate (AC) issuing and content receiving processing.

A sequence diagram illustrating an overview of the content purchase processing is shown in FIG. 15. The left side indicates the processing of the user device provided with the security chip, and the right side indicates the processing of the service provider.

The user device first outputs a content purchase request to the service provider. When the service provider receives the content purchase request, mutual authentication is conducted between the user device and the service provider. After mutual authentication is successfully performed and the integrities of the service provider and the user device are proved, the service provider generates an attribute certificate (AC) corresponding to the content to be purchased, and sends it to the user device. The attribute certificate stores an encrypted content key: Kc for decrypting the content, and also records the content usage conditions, such as the number of usages and the validity period. A signature of the attribute certificate authority (AA), which is the attribute certificate issuer, is added to the stored data so as to prevent the tampering of the data.

Upon receiving the attribute certificate, the user verifies the signature of the attribute certificate, and stores the attribute certificate in the memory if it is determined that the data is not tampered with. The user device then requests the service provider to send the content, and the service provider sends the content encrypted with the content key: Kc stored in the attribute certificate which has been previously sent to the user. The user device extracts the encrypted content key from the attribute certificate and decrypts it. The user device then decrypts the encrypted content by using the extracted content key so as to obtain and utilize the content. There is also a mode (on-line decryption) in which the content key stored in the attribute certificate is decrypted in the service provider, and a specific example of such a mode is described below.

An overview of the content distribution flow has been described above with reference to FIG. 15. Details of each processing are as follows. In the processing sequence in FIG. 15, the attribute certificate corresponding to the content is sent before distributing the encrypted content. However, it does not matter whether the encrypted content or the attribute certificate is distributed first. Alternatively, the encrypted content and the attribute certificate may be simultaneously distributed. Moreover, it is possible to perform off-line distribution by storing each of the encrypted content and the attribute certificate in a recording medium, such as a disk.

There are two modes in which the content or the attribute certificate (AC) is distributed from the service provider to the user device: one mode in which the distribution is made in response to a request from a user to the service provider; and the other mode is a so-called push mode (push model) in which the distribution is unconditionally made from the service provider to any user who has made, for example, a subscriber contract, regardless of whether there is a request from the user. Either mode can be utilized. In the push model, the service provider generates attribute certificates (AC) for target users in advance, and distributes them.

(1) Mutual authentication processing

Mutual authentication processing is first conducted between the user device, which is a content purchase request entity, and the service provider, which is a content provider. Between the two means for transmitting and receiving data, it is first checked with each other whether the two means are authorized data communicators, and then, required data transfer is performed. The processing for checking whether the two means are authorized data communicators is the mutual authentication processing. One preferable data transfer method is to generate a session key during mutual authentication processing and to encrypt the data by using the generated session key as a common key. As the mutual authentication method, either a public key cryptosystem or a common key cryptosystem can be used.

A handshake protocol (TLS1.0), which is one public key cryptosystem, is described below with reference to the sequence diagram of FIG. 16.

Figure 16:
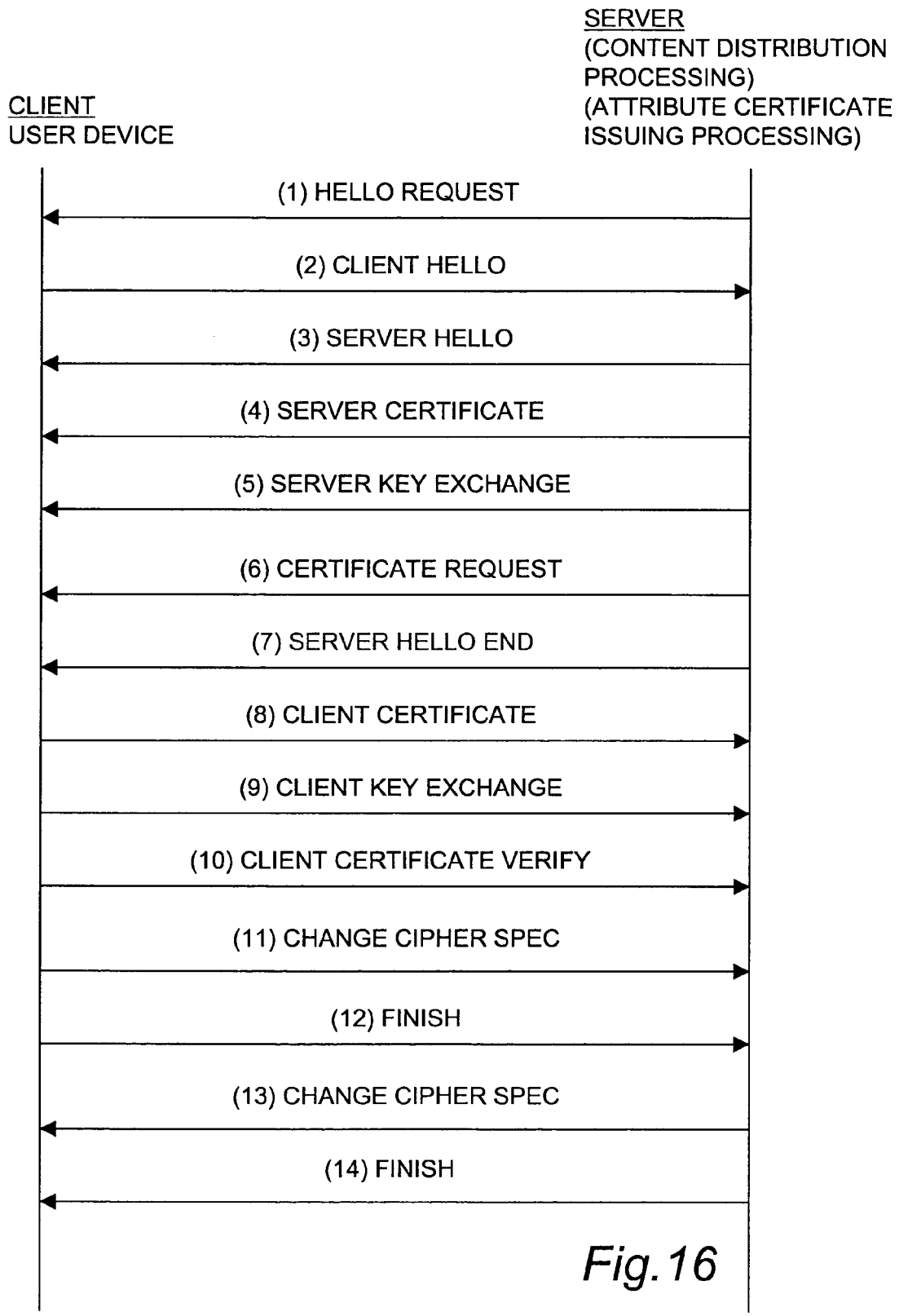
FIG. 16 is a sequence of TLS1.0 handshake protocol as an example of mutual authentication processing.

In FIG. 16, the left side indicates the processing of the user device (client), and the right side indicates the processing of the service provider (server). First, (1) the service provider (server) sends a negotiation start request for determining encryption standards to the user device (client) as a hello request. (2) Upon receiving the hello request, the user device (client) sends possible candidates of encryption algorithms, session ID, and protocol version to the service provider (server) as a client hello. (3) The service provider (server) sends the determined encryption algorithms, session ID, and protocol version to the user device (client) as a server hello. (4) The service provider (server) sends a set of public key certificates (X.509v3) up to the root CA owned by the service provider to the user device (client) (server certificate). If verification is not conducted up to the highest public key certificate by tracing a certificate linkage, the service provider does not have to send a set of public key certificates (X. 509v3) up to the root CA. (5) The service provider (server) sends information of an RSA public key or a Diffie & Hellman public key to the user device (client) (server key exchange). This information is public key information that is temporarily used when the certificates cannot be utilized.

(6) Then, the service provider (server) requests the user device (client) to send a certificate owned by the user device (client) as a certificate request. (7) The service provider (server) then sends a message indicating that the negotiation processing is completed (server hello end).

(8) Upon receiving the message indicating the server hello end, the user device (client) sends a set of public key certificates (X. 509v3) up to the root CA owned by the user device to the service provider (server) (client certificate). If linkage verification for the public key certificates is not conducted, the user device (client) does not have to send a set of public key certificates. (9) The user device (client) encrypts a 48-byte random number with the public key of the service provider (server), and sends it to the service provider (server). Based on this value, the service provider (server) and the user device (client) generate a master secret including data for generating message authentication code (MAC) used for verifying data to be transmitted and received.

(10) The user device (client) encrypts a digest of the above-described messages with the private key of the client to prove the integrity of the client certificate, and sends the encrypted digest to the service provider (server) (client certificate). (11) The user device (client) then reports that the use of the previously determined encryption algorithm and key is to be started (change cipher spec), and (12) sends an authentication end message. Meanwhile, (13) the service provider (server) also reports that the use of the previously determined encryption algorithm and key is to be started (change cipher spec), and (14) sends an authentication end message.

According to the encryption algorithm determined in the above-described processing, data transfer is performed between the user device (client) and the service provider (server).

Verification to determine whether the data is tampered with is performed by adding message authentication code (MAC), which is calculated from the master secret generated according to the agreement between the user device (client) and the service provider (server) during the above-described authentication processing, to data to be sent from each entity.

Figure 17:
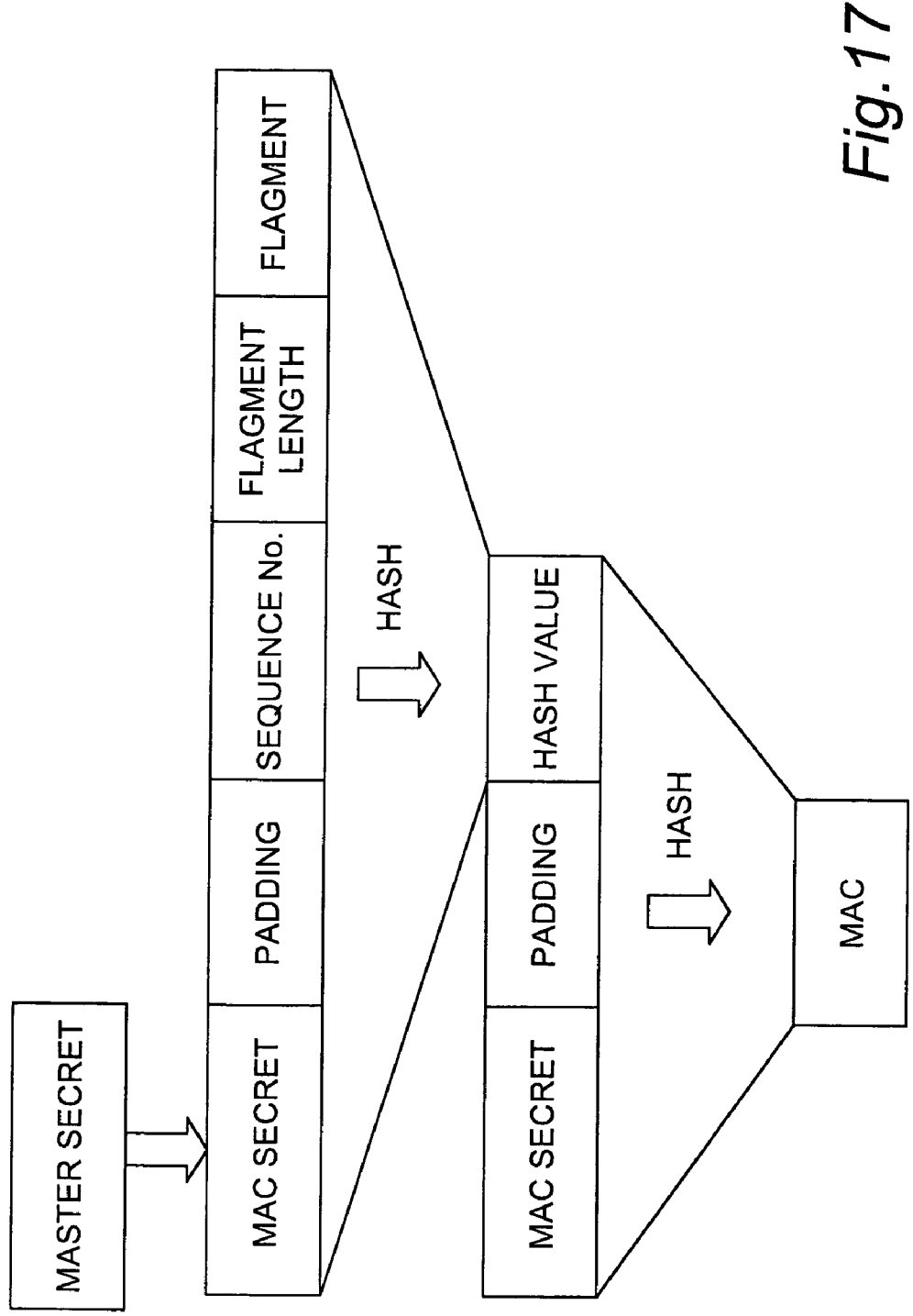
FIG. 17 illustrates the generation of a MAC used for data-tampering verification.

The generation of message authentication code (MAC) is shown in FIG. 17. The data sender adds a MAC secret generated based on the master secret, which is generated during authentication processing, to data to be sent, calculates a hash value from the entire data, and also calculates a hash based on the MAC secret, padding, and hash value so as to generate message authentication code (MAC). The generated MAC is added to the data to be sent, and if the receiver finds that the MAC generated based on the received data coincides with the received MAC, it can be determined that the data is not tampered with. If the two values of MAC are not equal to each other, it is determined that the data is tampered with.

(2) Generating and sending content usage-right information certificate (attribute certificate)

In response to a content request from the user device, the service provider encrypts the content key: Kc used for decrypting the requested content and stores the content key: Kc, and generates a content usage-right information certificate in which the content usage information is stored, for example, an attribute certificate (AC), and sends the certificate to the user.

The entity that generates a content usage-right information certificate, for example, an attribute certificate (AC), may be the service provider itself or an external entity that manages the content. If an external entity generates an attribute certificate (AC), it generates the attribute certificate (AC) in response to a request from the service provider.

The content key: Kc used for decrypting the corresponding encrypted content is encrypted and is stored in the attribute certificate. The keys used for encrypting the content key Kc may be:

(a) the service provider (SP) storage public key: SC.Sto-pub.SP.K corresponding to the SP storage private key stored in each service provider management area of the security chip of the user device;

(b) the private key (common key): SP.Sto.K possessed by the service provider; and (c) the global common key: Kg generated as a common key shared by the system holder (SH) and the user device.

Other keys may be used. For example, a public key possessed by the service provider may also be used for encrypting the content key Kc. In this case, the service provider receives the attribute certificate (AC) from the user device, and decrypts the content key Kc with the private key possessed by the service provider.

No matter which key is used, either of the following two modes for distributing the content or the attribute certificate (AC) from the service provider to the user device can be employed. One mode in which the distribution is made in response to a request from a user to the service provider, and the other mode is a so-called push mode (push model) in which the distribution is unconditionally made from the service provider to any user who has made, for example, a subscriber contract, regardless of whether there is a request from the user. In the push model, the service provider generates attribute certificates (AC) for target users in advance, and distributes them. Details of the processing employed in the above-described modes (a) through (c) are as follows.

(a) Mode in which the service provider (SP) storage public key: SC.Stopub.SP.K corresponding to the SP storage private key is used As discussed in the description of the memory area of the security chip of the user device, for each service provider registered in the user device, the SP storage private key SC.Stopri.SP.K is stored in the corresponding service provider management area formed in the memory. The security chip of the user device extracts, from the attribute certificate corresponding to the content provided by the service provider, the content key: Kc, i.e., [SC.Stopub.SP.K(Kc)], encrypted with the service provider (SP) storage public key SC.Stopub.SP.K corresponding to the SP storage private key, and decrypts the content key Kc with the SP storage private key: SC.Stopri.SP.K, thereby obtaining the content key: Kc. [A(B)] indicates data B encrypted with A. In this embodiment, the user device is able to decrypt the content in the user device to use it without having to connect to the service provider. That is, off-line decryption can be made.

In the above-described example, a public key cryptosystem is employed, and the content key is encrypted by using the SP storage public key: SC.Stopub.SP.K, and the content key is decrypted by using the SP storage private key: SC.Stopri.SP.K. A common key cryptosystem may be employed, in which case, the SP storage key (common key): SC.Sto.SP.K is used both for encrypting and decrypting the content key. In this case, the SP storage key (common key): SC.Sto.SP.K is stored in the service provider management area of the corresponding service provider of the memory of the security chip.

(b) Mode in which the private key (common key): SP.Sto.K Possessed By the Service Provider is Used The service provider encrypts the content key: Kc to be stored in an attribute certificate, which is set for the content to be provided to the user device, by using the private key: SP.Sto.K possessed by the service provider. Even though the user device receives the attribute certificate, it is unable to decrypt the encrypted content key [SP.Sto.K(Kc)] stored in the attribute certificate because of a lack of the private key: SP.Sto.K possessed by the service provider.

Accordingly, the following processing is required for utilizing (decrypting) the content. The user device first sends the attribute certificate to the service provider to request the service provider to decrypt the content key. The service provider then decrypts the content key: Kc by the private key: SP.Sto.K possessed by the service provider. The user device obtains the content key: Kc decrypted by the service provider, and decrypts the encrypted content with the content key: Kc. Unlike the above-described mode (a), the user device is required to connect to the service provider when utilizing the content, i.e., when decrypting the content. That is, on-line processing is necessary.

(c) Mode in which the global common key: Kg generated as a common key to be shared by the system holder (SH) and the user device is used In the mode utilizing the global common key, the content can be prevented from being distributed or utilized in a service provider which distributes the content without a permission of the system holder, and the content is distributed under the management by the system holder (SH). A content creator key possessed by a content creator that provides the content to the service provider, a content distributor key possessed by the service provider that distributes the content, the global common key: Kg generated as a common key to be shared by the system holder (SH) and the user device are combined and encrypted to generate key data. The encrypted key data is stored in the attribute certificate, and is distributed to the user device, which is the end entity as the content user. With this configuration, it is possible to prevent the service provider itself from extracting the content key and to allow only the user device to extract the content key: Kc.

Details of the above-described modes are as follows. An attribute-certificate issuing sequence, which is common for all the modes (a) through (c), is described below with reference to FIG. 18.

Figure 18:
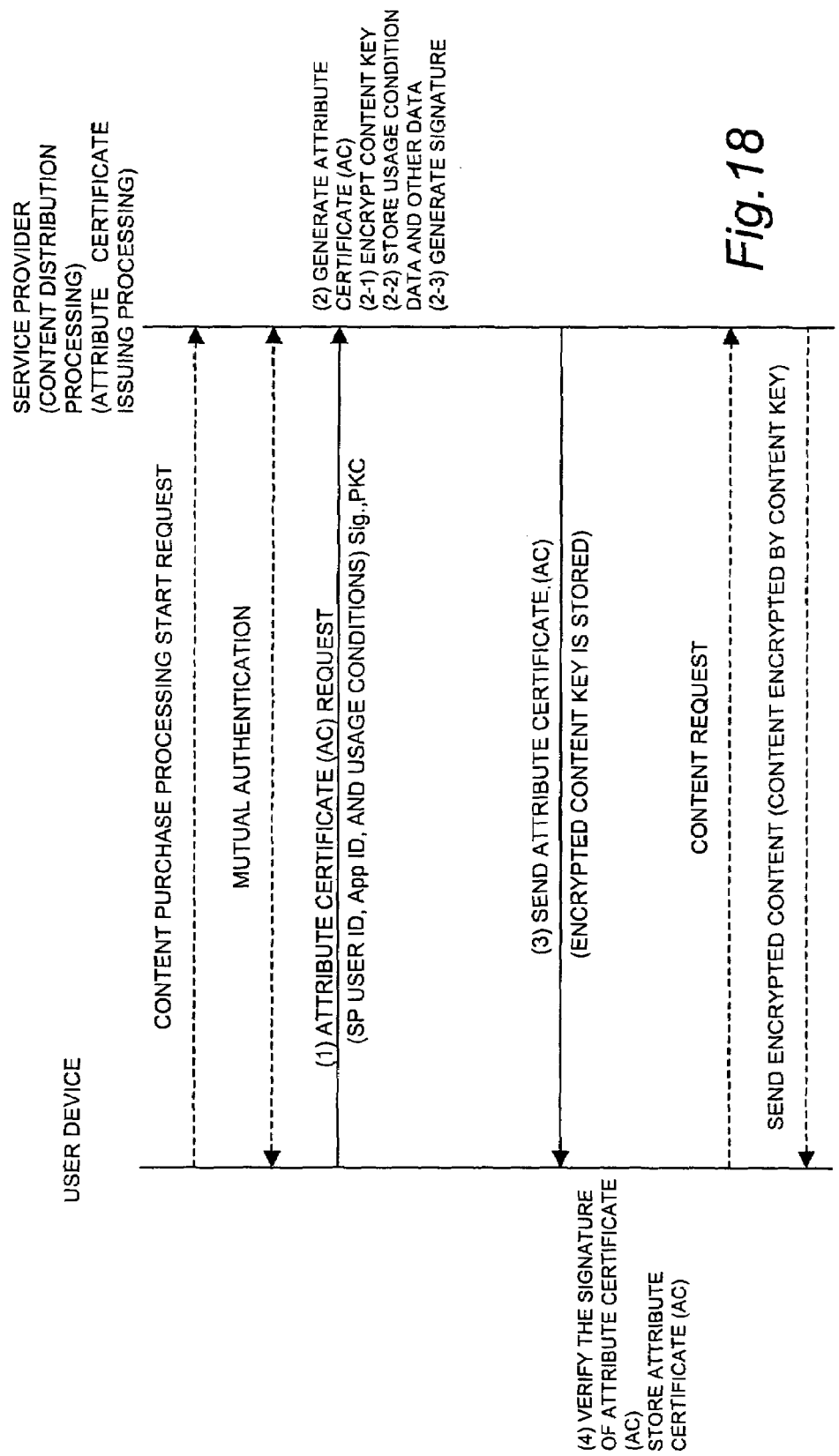
FIG. 18 is a sequence of attribute certificate (AC) issuing processing.

The processing sequence of FIG. 18 indicates details of the attribute-certificate generation/sending processing, which is part of the content purchase processing sequence shown in FIG. 15. It is now assumed that the user device has a built-in security chip, and a service provider management area has been generated in the memory of the security chip, and service provider management information is stored in the service provider management area.

The processing shown in FIG. 18 is discussed below. After successfully performing mutual authentication between the user device and the service provider, (1) the user device provided with the security chip requests the service provider to generate an attribute certificate (AC). Before sending the attribute certificate (AC), a signature is attached to the user ID, the application ID, which serves as the content designation identifier, and the usage condition data selected by the user, which are registered in the service provider management area, with the private key of the user (service provider private key). The public key certificate (PKC) of the user is attached to the above-described data, and then, the attribute certificate (AC) is sent. The usage condition data is data designating the conditions, such as a content usage number and a usage period, and if such conditions are selectable by the user, the usage condition data is contained in the attribute certificate (AC) as the user designation data.

The signature is added for making it possible to verify whether the data is not tampered with, and the above-described MAC value may be used, and alternatively, a digital signature using a public key cryptosystem may be employed.

Figure 19:
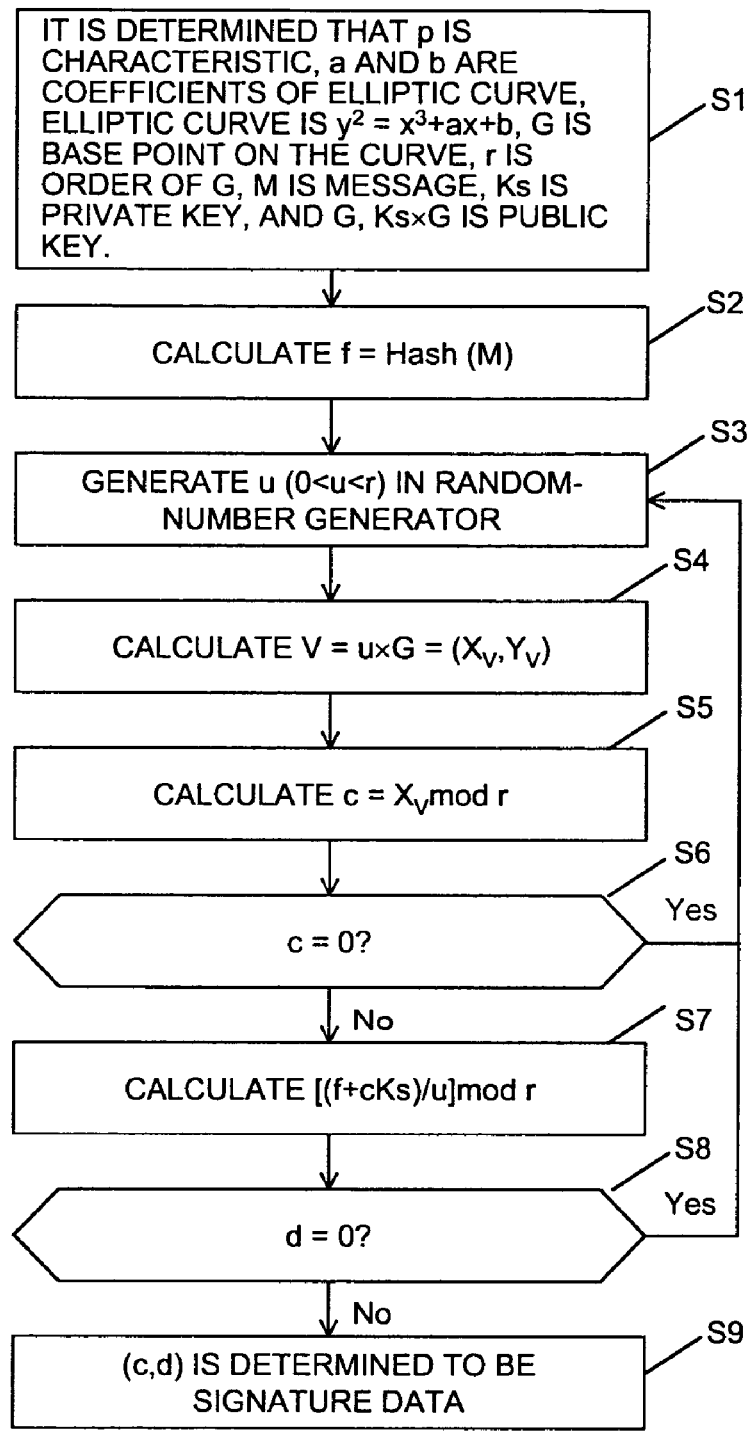
FIG. 19 is a flowchart illustrating an ECDSA-signature generation procedure as an example of signature generation processing.

A digital-signature generating method using a public key cryptosystem is described below with reference to FIG. 19. The processing shown in FIG. 19 is a digital-signature-data generating processing flow using EC-DSA ((Elliptic Curve Digital Signature Algorithm), IEEE P1363/D3). In this method, the elliptic curve cryptosystem (hereinafter referred to as "ECC") is employed as the public key cryptosystem. In the data processing apparatus of the present invention, another public key cryptosystem similar to the ECC, for example, RSA encryption (Rivest, Shamir, Adleman) (ANSI X9.31) can be used.

The individual steps in FIG. 19 are as follows. In step S1, it is determined that p is a characteristic, a and b are coefficients of an elliptic curve (elliptic curve: $y^2=x^3+ax+b$, $4a^3+27b^2 \neq 0$ (mod p)), G is a base point on the elliptic curve, r is the order of G, and Ks is a private key ($0<Ks<r$). In step S2, the hash value of message M is calculated and is set to $f=Hash(M)$.

A technique for determining the hash value by using a hash function is discussed below. The hash function is a function for inputting a message, compressing the message into a predetermined length of data, and outputting it as a hash value. In the hash function, it is difficult to predict the input from the hash value (output), and when one bit of the data input into the hash function changes, many bits of the hash value change. It is also difficult to find different input data having the same hash value. As the hash function, MD4, MD5, SHA-1 may be used. Alternatively, DES-CBC may be used, in which case, MAC (check value: corresponding to ICV), which is the final output value, is the hash value.

Subsequently, in step S3, a random number u (0<u<r) is generated, and in step S4, coordinates V ($X_V, Y_V$) obtained by multiplying the base point by u are calculated. The addition and the multiplication by two on the elliptic curve are defined as follows.

It is now assumed that P=(Xa, Ya), Q=(Xb, Yb), and R=(Xc, Yc)=P+Q.

When P≠Q (addition), $Xc = \lambda^2 - Xa - Xb$ $Yc = \lambda \times (Xa - Xc) - Ya$ $\lambda = (Yb - Ya)/(Xb - Xa)$.

When P=Q (multiplication by two), $Xc = \lambda^2 - 2Xa$ $Yc = \lambda \times (Xa - Xc) - Ya$ $\lambda = (3(Xa)^2 + a)/(2Ya)$.

By using these factors, the value obtained by multiplying the point G by u is calculated (the simplest calculation method although the speed is slow is as follows: G, 2×G, 4×G, ... are calculated, u is expanded into a binary format, $2^i \times G$ (value obtained by two to the power of i (i is the bit position counted from the LSB of u) is applied to the bit positions having the value of 1, and the resulting values are added.

In step S5, $c = X_V$ mod r is calculated, and it is determined in step S6 whether c is 0. If c is not 0, d=[(f+cKs)/u]mod r is calculated in step S7. Then, it is determined in step S8 whether d is 0. If d is not 0, c and d are output as digital signature data in step S9. If it is assumed that r has a length of 160 bits, the digital signature data has 320 bits.

If it is found in step S6 that c is 0, the process returns to step S3, and a new random number is re-generated. Similarly, if it is found in step S8 that d is 0, the process returns to step S3, and a random number is regenerated.

Figure 20:
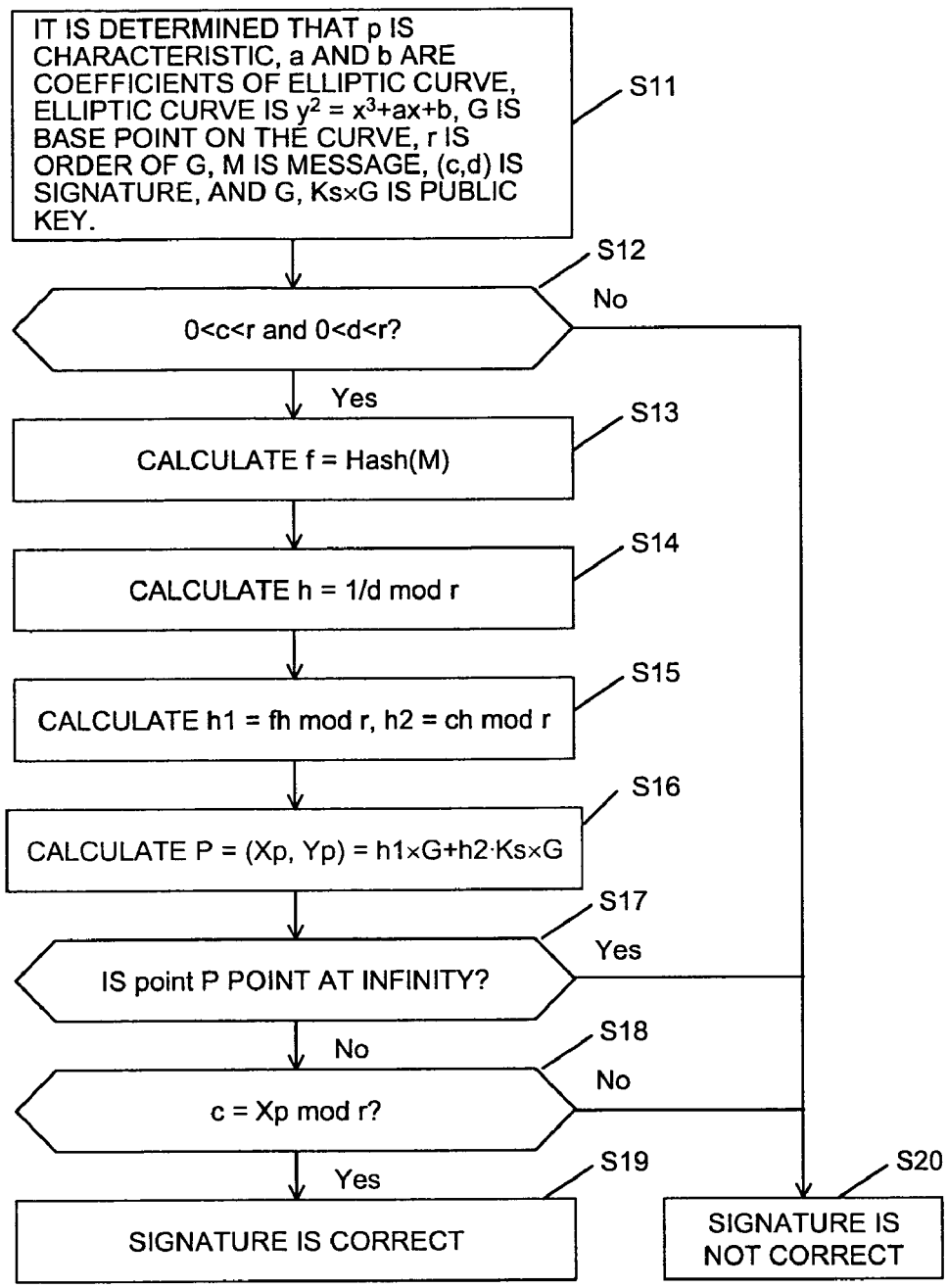
FIG. 20 is a flowchart illustrating an ECDSA-signature verification procedure as an example of signature verification processing.

A technique for verifying a digital signature using a public key cryptosystem is described below with reference to FIG. 20. In step S11, it is determined that M is a message, p is a characteristic, a and b are coefficients of an elliptic curve (elliptic curve: $y^2 = x^3 + ax + b$, $4a^3 + 27b^2 \neq 0$(mode p)), G is a base point on the elliptic curve, r is the order of G, Ks is a private key (0<ks<r), and G and Ks×G are a public key (0<Ks<r). It is determined in step S12 whether digital signature data c and d satisfy 0<c<r and 0<d<r, respectively. If they are satisfied, in step S13, the hash value of the message M is calculated, and is set to f=Hash(M). Then, in step S14, h=1/d mod r is calculated, and in step S15, h1=fh mod r, h2=ch mod r are calculated.

In step S16, point P=(Xp, Yp)=h1×G+h2·Ks×G is calculated by using h1 and h2 which have already been calculated. Since the digital signature verifier knows the base point G and Ks×G, it is possible to calculate the scalar product of the point on the elliptic curve, as in a manner similar to step S4 of FIG. 19. It is then determined in step S17 whether the point P is a point at infinity. If it is not a point at infinity, the process proceeds to step S18 (in reality, a determination as to whether the point P is a point at infinity can be made in step S16, that is, when P=(X, Y) and Q=(X, −Y) are added, λ cannot be calculated, and it is thus proved that P+Q is at infinity). In step S18, Xp mod r is calculated, and is compared with the digital signature data c. If the two values are the same, the process proceeds to step S19 in which it is determined that the digital signature is correct.

When the digital signature is found to be correct, it can be proved that the data has not been tampered with, and that the digital signature has been generated by an entity which has the private key corresponding to the public key.

If the digital signature data c or d does not satisfy 0<c<r or 0<d<r in step S12, the process proceeds to step S20. If the point P is found to be a point at infinity in step S17, the process also proceeds to step S20. If Xp mod r is not equal to the digital signature data c in step S18, the process also proceeds to step S20.

When it is determined in step S20 that the digital signature is not correct, it can be proved that the data has been tampered with, or the digital signature has not been generated by an entity which has the private key corresponding to the public key. The addition of a signature or the generation of a hash value is insufficient for preventing the tampering. However, the signature data can be determined to be correct or incorrect, which is thus substantially equivalent to the fact that data tampering can be prevented.

After receiving an attribute certificate (AC) request and checking that the requested data has not been tampered with by the above-described signature checking processing, the service provider encrypts the content key: Kc corresponding to the content specified by the application ID. The key used for encrypting the content key: Kc is any one of the above-described (a) SP storage private key: SC.Stopri.SP.K stored in the service provider management area of the security chip of the user device, (b) private key: SP.Sto.K possessed by the service provider, and (c) global common key: Kg as a common key to be shared by the system holder (SH) and the user device.

The service provider also stores the content usage condition data and other data as required so as to generate the attribute certificate shown in FIG. 5. A digital signature using the private key of the service provider is attached to the generated attribute certificate. Digital-signature generation processing is executed according to a flow similar to the processing flow of FIG. 19. The attribute certificate generated by the service provider is sent to the user device, and signature verification processing is performed according to a sequence similar to the processing flow of FIG. 20 in the user device.

If necessary, the user device may preferably obtain the public key certificate linked to the attribute certificate (AC) according to the public key certificate information of the AC possessor in the attribute certificate (AC) so as to verify the public key certificate. For example, if the reliability of the attribute certificate (AC) issuer is uncertain, it can be determined whether the attribute certificate (AC) issuer has an authorized public key certificate of the certification authority by verifying the public key certificate of the attribute certificate (AC) issuer. If the public key certificates form a hierarchical structure as described above, linkage verification may preferably be performed by tracing the path up to the public key certificate issued by the root certification authority (CA). There are cases where this linkage verification must be performed.

Details of processing for checking a relationship between an attribute certificate (AC) and a public key certificate (PKC) and details of verification processing of each certificate are given below with reference to the drawings. The flow of FIG. 21 indicates the verification processing of the public key certificate (PKC) related to the attribute certificate (AC) when the attribute certificate (AC) is verified.

When an attribute certificate (AC) to be checked is set (S21), the public key certificate information (holder) field of the AC possessor of the attribute certificate is extracted (S22), and the public key certificate issuer information (PKC issuer) and the public key certificate serial number (PKC serial) stored in the extracted public key certificate information (holder) are checked (S23). Then, the public key certificate (PKC) is searched based on the public key certificate issuer information (PKC issuer) and the public key certificate serial number (PKC serial) (S24) so as to obtain the public key certificate (PKC) related to the attribute certificate (AC) (S25).

As shown in FIG. 21, the attribute certificate (AC) and the public key certificate (PKC) are related to each other by the public key certificate issuer information (PKC issuer) and the public key certificate serial number (PKC serial) in the public key certificate information (holder) stored in the attribute certificate.

Figure 22:
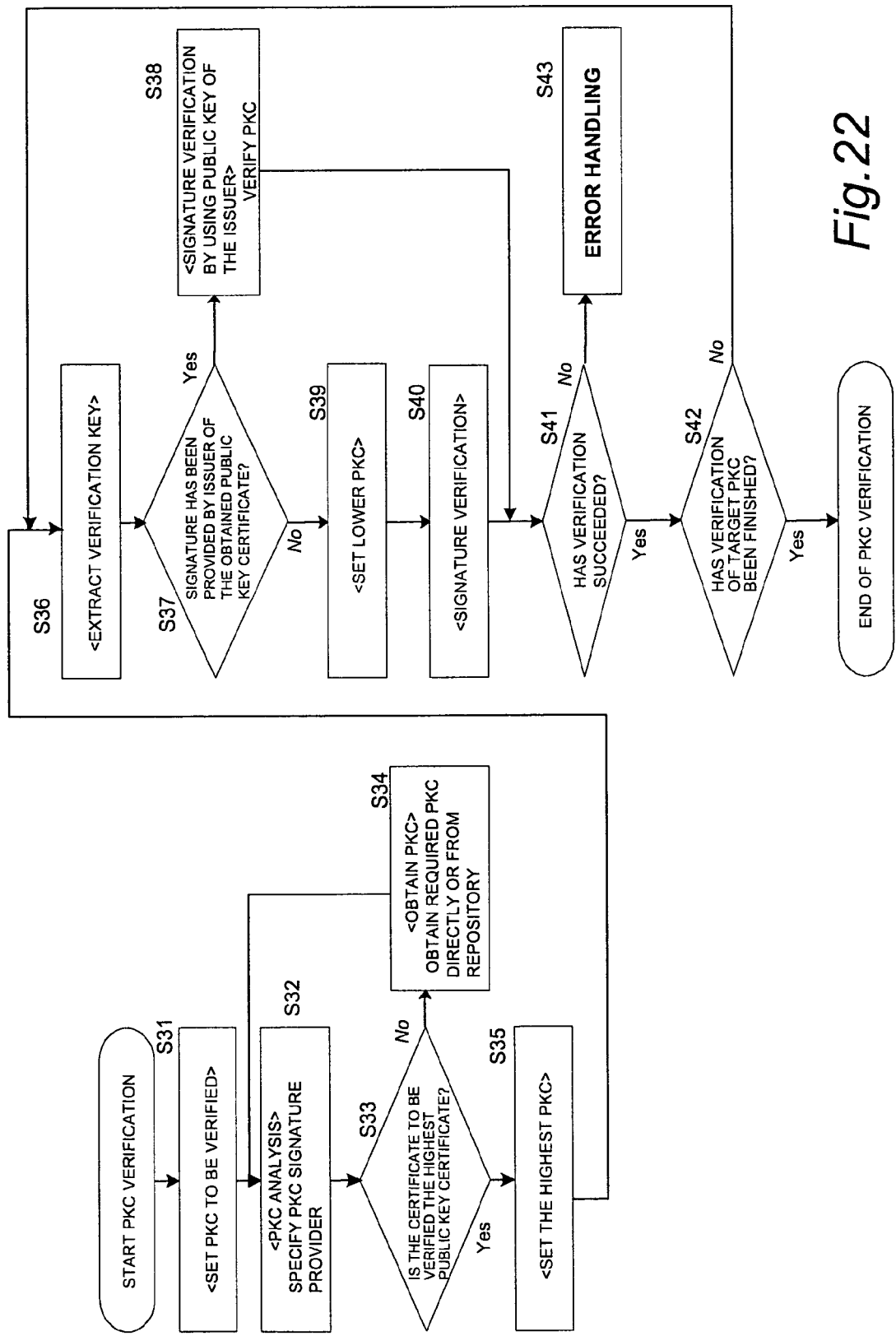
FIG. 22 is a flowchart illustrating public key certificate (PKC) verification processing.

Verification processing for the public key certificate (PKC) is described below with reference to FIG. 22. Verification of the public key certificate (PKC) shown in FIG. 22 is a linkage verification processing flow for obtaining linkage information up to the highest public key certificate by tracing a certificate linkage from a lower certificate to a higher certificate and for performing signature verification of the public key certificates up to the highest certification authority (root CA). A public key certificate (PKC) to be verified is set (S31), and the person who has attached the signature to the public key certificate (PKC) is specified based on the public key certificate (PKC) storage information (S32). It is then determined whether the public key certificate (PKC) is the highest public key certificate of a certificate linkage (S33). If the public key certificate (PKC) is not the highest public key certificate, the highest public key certificate is obtained directly or from a repository (S34). When the highest public key certificate is obtained and set (S35), a verification key (public key) required for signature verification is obtained (S36), and it is determined whether the signature of the public key certificate (PKC) to be verified has been provided by the issuer of the obtained public key certificate (S37). If the signature has not been provided by the issuer of the obtained public key certificate, a lower PKC is set (S39), and signature verification is conducted based on the verification key (public key) obtained from a higher public key certificate (S40). If it is found in the signature verification in step S37 that the signature has been provided by the issuer of the obtained public key certificate, verification is conducted by using the public key of that issuer as a verification key (S38), and the process proceeds to step S41.

If signature verification has been successfully conducted (S41: Yes), it is determined whether the verification of a target PKC has been finished (S42). If it has been finished, PKC verification is completed. If it has not been finished, the process returns to step S36, and a verification key (public key) required for signature verification is obtained, and signature verification of a lower public key certificate is repeated. If the signature verification has failed (S41: No), the process proceeds to step S43, and error handling is performed, for example, the subsequent process is terminated.

Figure 23:
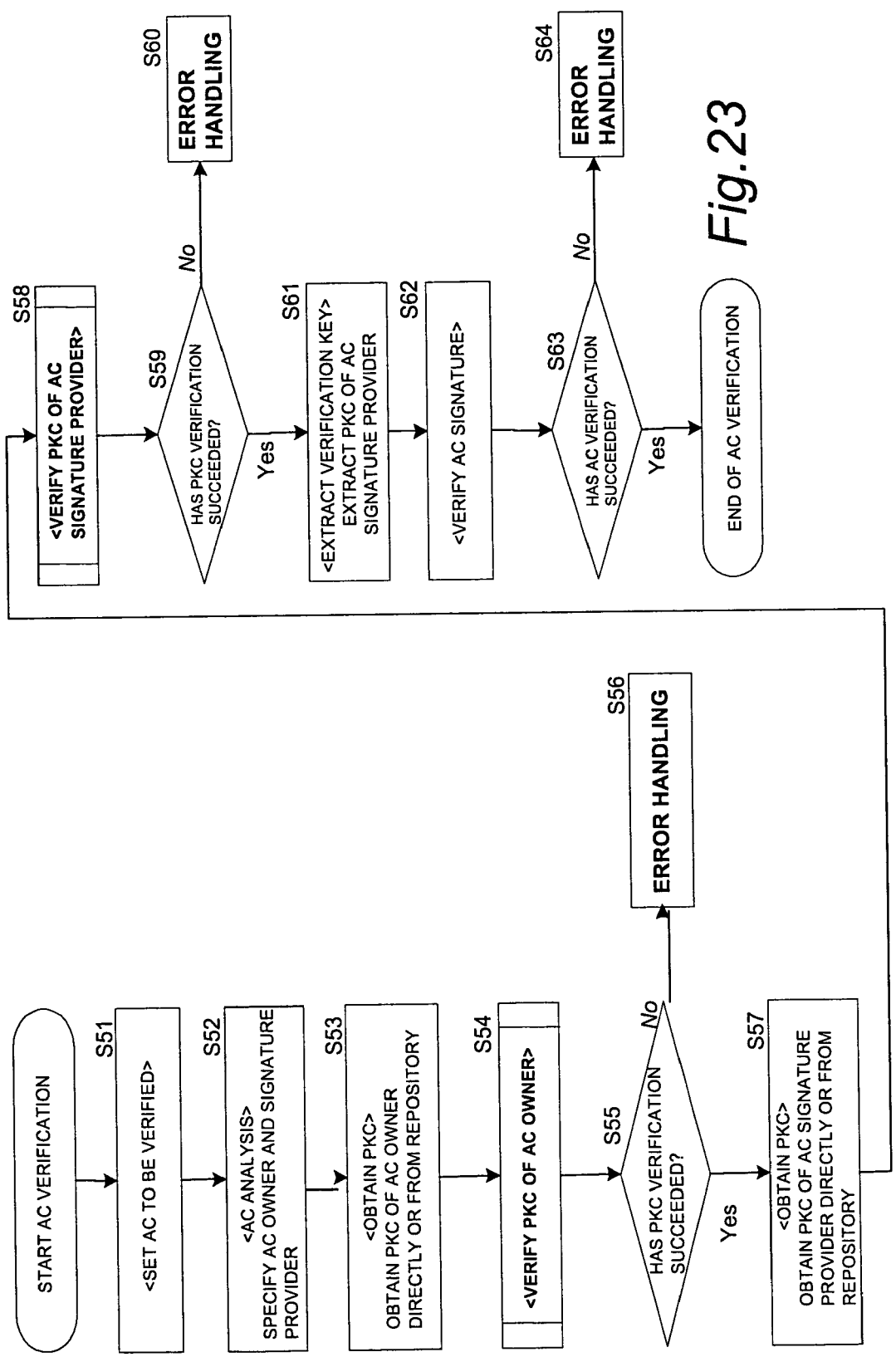
FIG. 23 is a flowchart (example 1) of attribute certificate (AC) verification processing.

Verification processing (example 1) for the attribute certificate (AC) is described below with reference to FIG. 23. An attribute certificate (AC) to be verified is set (S51), and the owner and the signature provider of the attribute certificate (AC) are specified based on the attribute certificate (AC) storage information (S52). The public key certificate of the owner of the attribute certificate (AC) is obtained directly or from a repository (S53) so as to verify the public key certificate (S54).

If the verification of the public key certificate has failed (No in S55), the process proceeds to step S56 in which error handling is performed, for example, the subsequent process is terminated. If the verification of the public key certificate has succeeded (Yes in S55), the public key certificate corresponding to the signature provider of the attribute certificate (AC) is obtained directly or from a repository (S57) so as to verify the public key certificate (S58). If the verification of the public key certificate has failed (No in S59), the process proceeds to step S60 in which error handling is performed, for example, the subsequent process is terminated. If the verification of the public key certificate has succeeded (Yes in S59), the public key is extracted from the public key certificate corresponding to the signature provider of the attribute certificate (AC) (S61), and the signature verification of the attribute certificate (AC) is conducted by using the extracted public key (S62). If signature verification has failed (No in S63), the process proceeds to step S64 in which error handling is performed, for example, the subsequent process is terminated. If signature verification has succeeded (Yes in S63), the verification of the attribute certificate has been finished, and the subsequent processing for, for example, obtaining the encrypted content key in the attribute certificate, is started.

Verification processing (example 2) for the attribute certificate (AC) is now discussed with reference to FIG. 24. In this example, it is determined whether the public key certificate required for verifying the attribute certificate (AC) is stored in the user device, and if the public key certificate is stored therein, the verification of the public key certificate is omitted. An attribute certificate (AC) to be verified is set (S71), and the owner and the signature provider of the attribute certificate (AC) are specified based on the attribute certificate (AC) storage information (S72). It is then determined by search whether the public key certificate (PKC) of the owner of the attribute certificate (AC) is stored in the memory of the user device (S73). If it is stored (Yes in S74), the public key certificate of the owner of the attribute certificate (AC) is extracted (S75), and the process proceeds to step S81.

If the public key certificate (PKC) of the owner of the attribute certificate (AC) is not stored in the memory of the user device (No in S74), it is obtained directly or from a repository (S76), and the verification of the public key certificate (PKC) of the owner of the attribute certificate (AC) is executed (S77). If the verification of the public key certification has failed (No in S78), the process proceeds to step S79 in which error handling is performed, for example, the subsequent process is terminated. If the verification of the public key certificate has succeeded (Yes in S78), the verification result of the public key certificate is stored (S80), and then, it is determined whether the public key certificate (PKC) corresponding to the signature provider of the attribute certificate (AC) is stored in the memory of the user device (S81). If it is stored (Yes in S82), the public key certificate of the signature provider of the attribute certificate (AC) is extracted (S83), and the process proceeds to step S88.

If the public key certificate (PKC) of the signature provider of the attribute certificate (AC) is not stored in the memory of the user device (No in S82), it is obtained directly or from a repository (S84), and the verification of the public key certificate (PKC) of the signature provider of the attribute certificate (AC) is conducted (S85). If the verification of the public key certificate has failed (No in S86), the process proceeds to step S87 in which error handling is performed, for example, the subsequent process is terminated. If the verification of the public key certificate has succeeded (Yes in S86), the key (public key) used for signature verification of the attribute certificate (AC) is extracted from the public key certificate (S88) so as to conduct the signature verification of the attribute certificate (AC) (S89). If signature verification has failed (No in S90), the process proceeds to step S91 in which error handling is performed, for example, the subsequent process is terminated. If signature verification has succeeded (Yes in S90), attribute certificate verification has been finished, and the subsequent processing for, for example, obtaining the encrypted content key in the attribute certificate, is started.

After verifying the attribute certificate by the user device, the attribute certificate is stored in the memory of the security chip of the user device, or in an external memory managed by the user device controller, and is used for obtaining and decrypting the encrypted content key stored in the attribute certificate when utilizing the content. The processing for obtaining the encrypted content key from the attribute certificate and decrypting it is described below.

(a) Mode in which the service provider (SP) storage Public Key: SC.Stopub.SP.K Corresponding to the SP Storage Private Key is Used A description is first given of the content usage processing based on the attribute certificate in which [SC.Stopub.SP.K (Kc)], which is encrypted from the content key: Kc by using the above-described (a) service provider (SP) storage public key: SC.Stopub.SP.K corresponding to the SP storage private key, is stored.

The SP storage private key: SC.Stopri.SP.K is stored in the service provider management area, and the user extracts this key by inputting the above-described authentication information (password). Accordingly, the user is able to obtain the content key: Kc off-line without having to connect to the service provider so as to decrypt the content.

Figure 25:
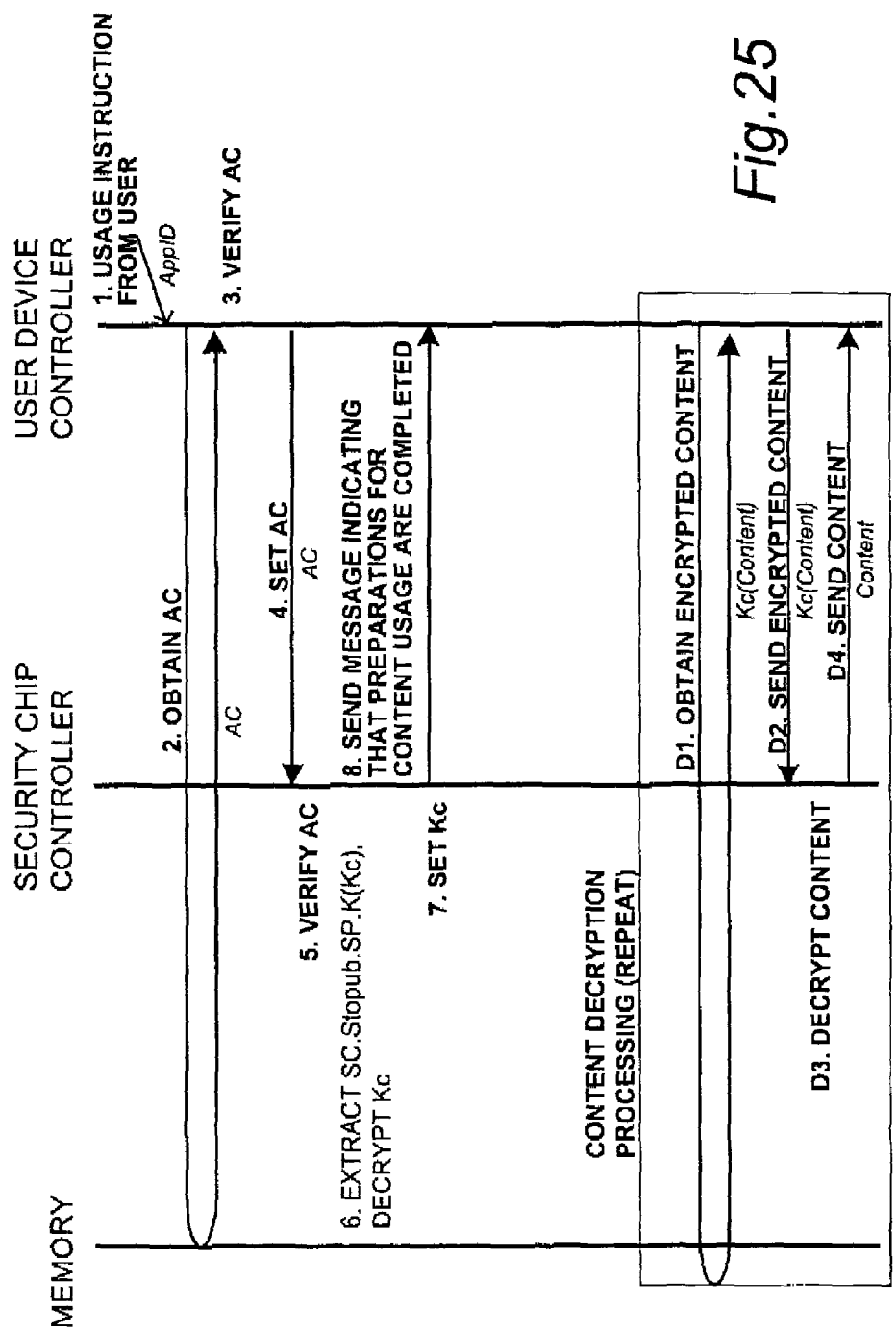
FIG. 25 is a sequence of content-usage processing (off-line) using an attribute certificate (AC).

FIG. 25 is a sequence flow for obtaining the encrypted content key from the attribute certificate and decrypting it and for decrypting the content by using the content key.

The processing is described according to the sequence diagram of FIG. 25. FIG. 25 illustrates, from the left, the processing of the memory of the security chip, the security chip controller, and the user device controller. First, the user device sends the application ID, which is input into the user device from the user as the content ID information, to the security chip controller so as to obtain the attribute certificate (AC) corresponding to the application ID from the memory. The user device then verifies whether the obtained attribute certificate is the attribute certificate (AC) corresponding to the application ID, sets the attribute certificate in the security chip controller, and makes a request to start the processing for obtaining (decrypting) the content key: Kc.

The security chip controller verifies the signature of the attribute certificate to prove that the data is not tampered with. The security chip controller then extracts the encrypted content key: [SC.Stopub.SP.K(Kc)] stored in the attribute certificate, and decrypts it with the SP storage private key: SC.Stopri.SP.K stored in the service provider management area, thereby obtaining the content key: Kc. After successfully obtaining the content key: Kc, the security chip controller sends a message indicating that preparations for decrypting the content are completed to the user device controller.

Then, the user device controller obtains the encrypted content to be decrypted with the obtained content key from the memory via the security chip controller. If the encrypted content is stored in an external memory (for example, a hard disk) rather than in the memory of the security chip, the user device controller obtains the encrypted content from the external memory. The user device controller then sends the obtained encrypted content to the security chip, and the encrypted content is decrypted with the content key: Kc in the security chip, and the content obtained as a result of decryption is output to the user device controller.

In the above-described example, a public key cryptosystem is employed in which the content key is encrypted with the SP storage public key: SC.Stopub.SP.K, and the encrypted content key is decrypted with the SP storage private key: SC.Stopri.SP.K. However, a common key system may be employed, in which case, the SP storage key (common key): SC.Sto.SP.K is used both for encrypting and decrypting the content key. In this case, the SP storage key (common key): SC.Sto.SP.K is stored in the service provider management area of the corresponding service provider in the memory of the security chip.

(b) Mode in which the private key (common key): SP.Sto.K Possessed By the Service Provider is Used A description is now given of the content usage processing based on an attribute certificate in which [SP.Sto.K(Kc)], which is encrypted from the content key: Kc by using the private key: SP.Sto.K possessed by the service provider, is stored.

The private key possessed by the service provider: SP.Sto.K is a key possessed by the service provider, and is not stored in the user device. Accordingly, in order to obtain the content key Kc: it is necessary for the user device to connect to the service provider and to request it to decrypt the content key. That is, content decryption is performed by on-line processing.

Figure 26:
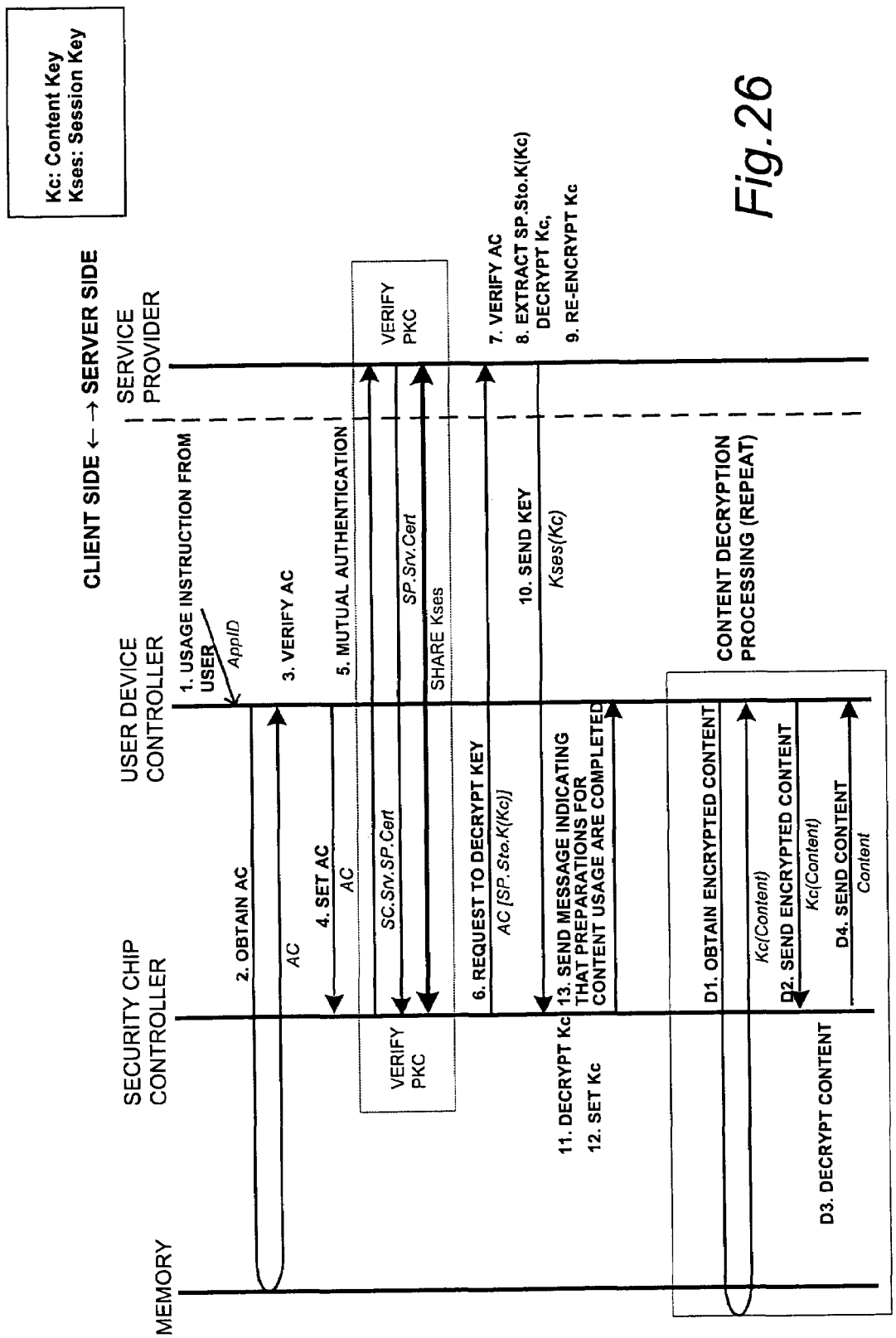
FIG. 26 is a sequence of content-usage processing (on-line) using an attribute certificate (AC).

FIG. 26 is a sequence flow for obtaining and decrypting the content key from the attribute certificate and for decrypting the content with the content key.

The processing is described below with reference to the sequence diagram of FIG. 26. FIG. 26 illustrates, from the left, the processing of the memory in the security chip, the security chip controller, the user device controller, and the service provider.

The user device sends the application ID, which is input into the user device from the user as the content ID information, to the security chip controller so as to obtain the attribute certificate (AC) corresponding to the application ID from the memory. The user device then verifies whether the obtained attribute certificate (AC) is the attribute certificate corresponding to the application ID, sets the attribute certificate in the security chip controller, and makes a request to start the processing for obtaining (decrypting) the content key: Kc.

After verifying the attribute certificate, the security chip controller connects to the service provider, which has issued the attribute certificate, via the user device so as to perform mutual authentication between the security chip and the service provider. This mutual authentication is conducted by the above-described TLS1.0 processing shown in FIG. 16 or another method using, for example, a public key system. In this mutual authentication, the public key certificates of both the security chip and the service provider are verified, and if necessary, linkage verification of the public key certificates up to the root certification authority (CA) is performed. In this authentication, the security chip and the service provider share a session key (Kses).

After mutual authentication has been successfully performed, the security chip controller sends the attribute certificate to the service provider. The data of the content key encrypted with the private key: SP.Sto.K possessed by the service provider, i.e., [SP.Sto.K(Kc)], is stored in the attribute certificate.

Upon receiving the attribute certificate, the service provider verifies the signature of the attribute certificate. In this case, it is preferable that the public key certificate linked to the attribute certificate and the higher public key certificate be verified. There are some cases where this linkage verification must be performed. After verifying the integrity of the attribute certificate by the above-described signature verification, the service provider decrypts the encrypted content key: [SP.Sto.K(Kc)] stored in the attribute certificate by using the private key: SP.Sto.K possessed by the service provider, thereby extracting the content key: Kc. The service provider then encrypts the content key: Kc with the session key (Kses) generated during mutual authentication, and sends the encrypted content key: Kc to the security chip of the user device.

Upon receiving the content key encrypted with the session key, i.e., [Kses(Kc)], from the service provider, the security chip controller decrypts the content key with the session key acquired during mutual authentication so as to obtain the content key: Kc.

After successfully obtaining the content key: Kc, the security chip controller sends a message, indicating that preparations for decrypting the content are completed, to the user device controller. The user device controller then obtains the encrypted content to be decrypted with the obtained content key from the memory via the security chip controller. If the encrypted content is stored in an external memory (for example, a hard disk) rather than in the memory of the security chip, the user device controller obtains the encrypted content from the external memory. The user device controller then sends the obtained encrypted content to the security chip. The security chip decrypts the encrypted content with the content key: Kc, and outputs the content as a decryption result to the user device controller.

(c) Mode in which the global common key: Kg generated as a key to be shared by the system holder (SH) and the user device is used A description is now given of a processing mode in which the global common key: Kg generated as a key to be shared by the system holder (SH) and the user device is indirectly employed for encrypting the content key: Kc and is stored in the attribute certificate. According to the mode using the global common key, only the user device is able to extract the content key: Kc, and the service provider which distributes the content is unable to extract the content key, so that the content distribution and usage without a permission of the system holder can be prevented, and the content distribution under the management of the system holder (SH) can be achieved.

More specifically, a content creator key possessed by a content creator that provides the content to the service provider, a content distributor key possessed by the service provider which distributes the content, the global common key: Kg generated as a common key to be shared by the system holder (SH) and the user device are combined and encrypted to generate key data. The encrypted key data is stored in the attribute certificate.

Figure 27:
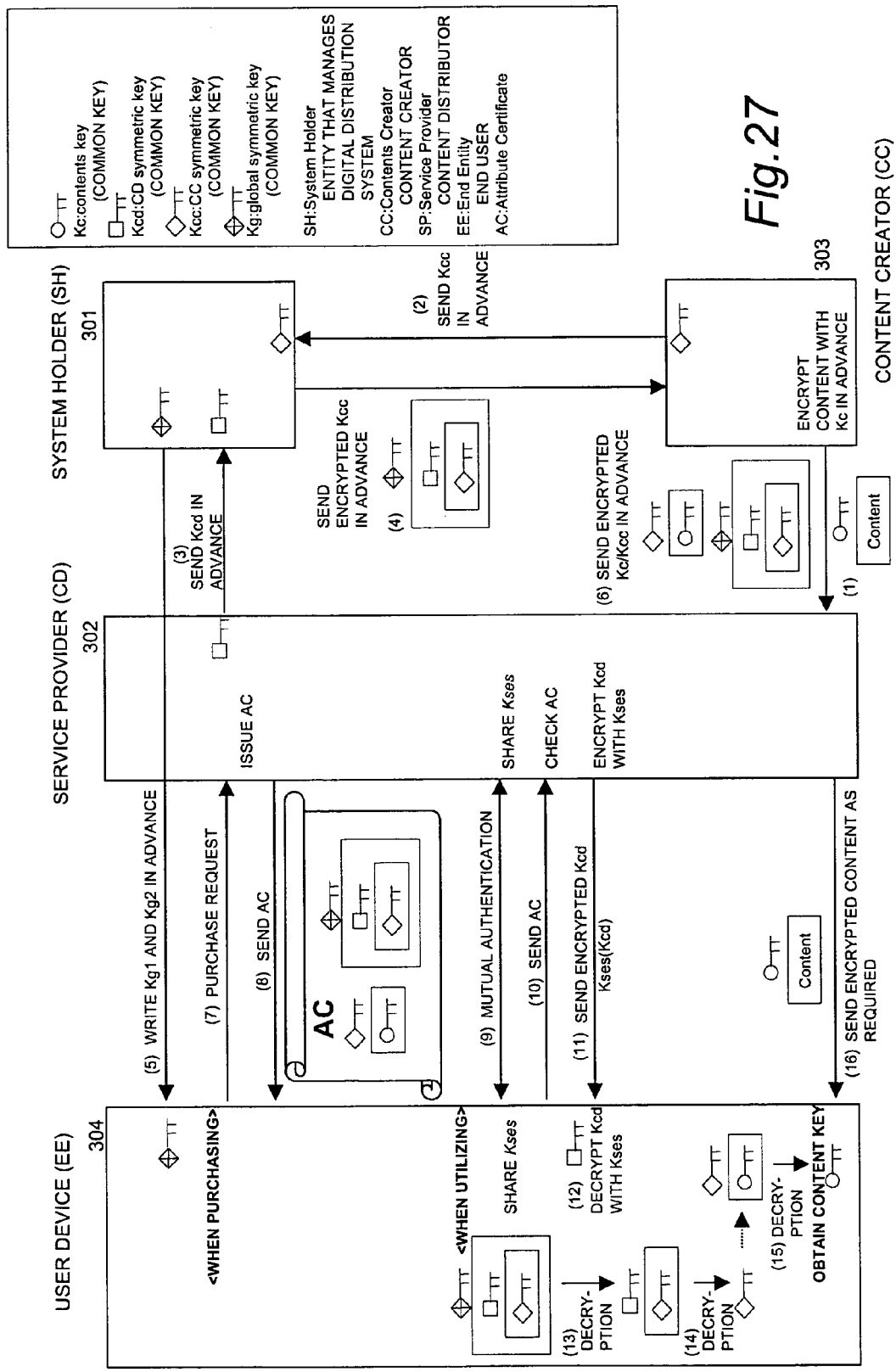
FIG. 27 illustrates content-usage processing (off-line) using an attribute certificate (AC) in which content key data encrypted with a global common key is stored.

FIG. 27 illustrates details of the processing in which the global common key: Kg is indirectly used for encrypting the content key: Kc and for storing the encrypted data of the content key: Kc in the attribute certificate and distributing it.

FIG. 27 illustrates a system holder 301, which constructs and manages a content distribution platform, a service provider (CD: content distributor) 302, which distributes the content, a content creator 303, which generates or manages the content and provides the encrypted content to the service provider 302, and a user device 304, which receives the content from the service provider 302 as an end entity. As in the above-described examples (a) and (b), the user device 304 is provided with a security chip, and service provider management areas are generated in the memory of the security chip.

The processing of FIG. 27 is discussed below. The content creator 303 generates a key: Kc used for encrypting the content to be distributed by using, for example, a random number. (1) The content creator 303 then encrypts the content by using the generated content key (common key): Kc, and sends it to the service provider 302.

The system holder 301 (2) receives from the content creator 303 the content creator key (common key): Kcc possessed by the content creator 303, and (3) receives from the service provider (CD: content distributor) 302 the service provider key (common key): Kcd possessed by the service provider 302. These keys may be sent and received in advance.

The system holder 301 encrypts the content creator key: Kcc with the service provider key: Kcd, and further encrypts this encrypted data with the global common key: Kg. That is, the system holder 301 generates the encrypted key data: [Kg([Kcd(Kcc)])] and (4) sends it to the content creator 303. [Kg([Kcd(Kcc)])] may be sent and received in advance. The global common key: Kg is a key shared by the system holder 301 and the user device 304. In the user device 304, (5) one or more global common keys: Kg1 through Kgn are stored by the time when the device is manufactured or is sold, or at the latest before the content is purchased, and they are updated under the management of the system holder. The updating processing is described below.

The content creator 303 encrypts the content key: Kc with the content creator key: Kcc to generate data: [Kcc(Kc)], and (6) sends it to the service provider 302. The content creator 303 also sends [Kg([Kcd(Kcc)])], which is received from the system holder 301 and is obtained by encrypting the content creator key: Kcc with the service provider key: Kcd and by further encrypting this encrypted data with the global common key: Kg. [Kg([Kcd(Kcc)])] may be sent and received in advance.

(7) When the user device 304 makes a content purchase request to the service provider 302, (8) the service provider generates an attribute certificate corresponding to the requested content, and sends it to the user device 304. In the attribute certificate (AC) to be generated, the above-described encrypted key data: [Kg([Kcd(Kcc)])], and more specifically, the data obtained by encrypting the content creator key: Kcc with the service provider key: Kcd and by further encrypting this encrypted data with the global common key: Kg, and the data: [Kcc(Kc)] obtained by encrypting the content key: Kc with the content creator key: Kcc are stored. Other data, such as data of content usage conditions, are also stored. Then, a digital signature of the service provider 302 is attached to the attribute certificate, and the attribute certificate is sent to the user device 304. The user device 304 then stores the received attribute certificate (AC) in the memory.

When utilizing the content, (9) after performing mutual authentication with the service provider 302, (10) the user device 304 sends the received attribute certificate (AC) to the service provider 302. Mutual authentication is conducted between the security chip of the user device and the service provider. This mutual authentication is conducted by, for example, the above-described TLS1.0 processing shown in FIG. 16 or another method using, for example, a public key system. In this mutual authentication, the public key certificates of both the user device 304 and the service provider 302 are verified, and if necessary, the public key certificates up to the root certification authority (CA) are verified. In this authentication, the security chip and the service provider share the session key (Kses).

In the attribute certificate, the encrypted data: [Kg([Kcd (Kcc)])] obtained by encrypting the content creator key: Kcc with the service provider key: Kcd and by further encrypting this encrypted data with the global common key: Kg, and the data: [Kcc(Kc)] obtained by encrypting the content key: Kc with the content creator key: Kcc are stored.

Upon receiving the attribute certificate from the security chip, the service provider verifies the signature of the attribute certificate. In this case, it is preferable that the public key certificate linked to the attribute certificate and the higher public key certificate be verified. There may be some cases where this linkage verification must be performed. After verifying the integrity of the attribute certificate by the above-described verification processing, (11) the service provider encrypts the service provider key: Kcd possessed by the service provider with the session key: Kses generated during mutual authentication so as to generate the encrypted key data [Kses(Kcd)], and sends it to the user device.

(12) The security chip controller of the user device 304 decrypts the encrypted key data [Kses(Kcd)] received from the service provider 302 with the session key so as to obtain the service provider key: Kcd. The service provider key: Kcd may be stored in the service provider memory area in advance.

Then, (13) the security chip controller of the user device 304 decrypts the data: [Kg([Kcd(Kcc)])], stored in the attribute certificate, which is obtained by encrypting the content creator key: Kcc with the service provider key: Kcd and by further encrypting this encrypted data with the global common key: Kg, by using the global common key: Kg possessed by the user device 304 so as to obtain [Kcd(Kcc)].

(14) The security chip controller of the user device 304 also decrypts [Kcd(Kcc)]) with the service provider key: Kcd obtained by decrypting the encrypted key data received from the service provider 302 so as to obtain the content creator key: Kcc.

(15) The security chip controller of the user device 304 then extracts the data: [Kcc(Kc)], stored in the attribute certificate, which is obtained by encrypting the content key: Kc with the content creator key: Kcc, and decrypts the extracted data: [Kcc(Kc)] with the content creator key: Kcc obtained in the above-mentioned processing so as to obtain the content key: Kc.

After successfully obtaining the content key: Kc, the security chip controller of the user device 304 sends a message, indicating that preparations for decrypting the content are completed, to the user device controller.

The user device 304 then sends the encrypted content (processing of (16)) obtained from the service provider 302 to the security chip, and the security chip decrypts the encrypted content with the content key: Kc.

Before sending and receiving the data, such as the keys and encryption keys between the above-described entities, mutual authentication is preferably performed between the entities for sending and receiving the data, and then, the data is sent and received if mutual authentication is successfully conducted. It is also preferable that the data to be sent and received is encrypted with a session key, and a signature is provided to the data.

As discussed above, the global common key is owned only by the user device and the system holder, and other entities do not possess nor able to obtain this key. Accordingly, even the service provider is unable to obtain the content key, and the distribution of the content key and the content without a permission of the system holder can be prevented.

Figure 28:
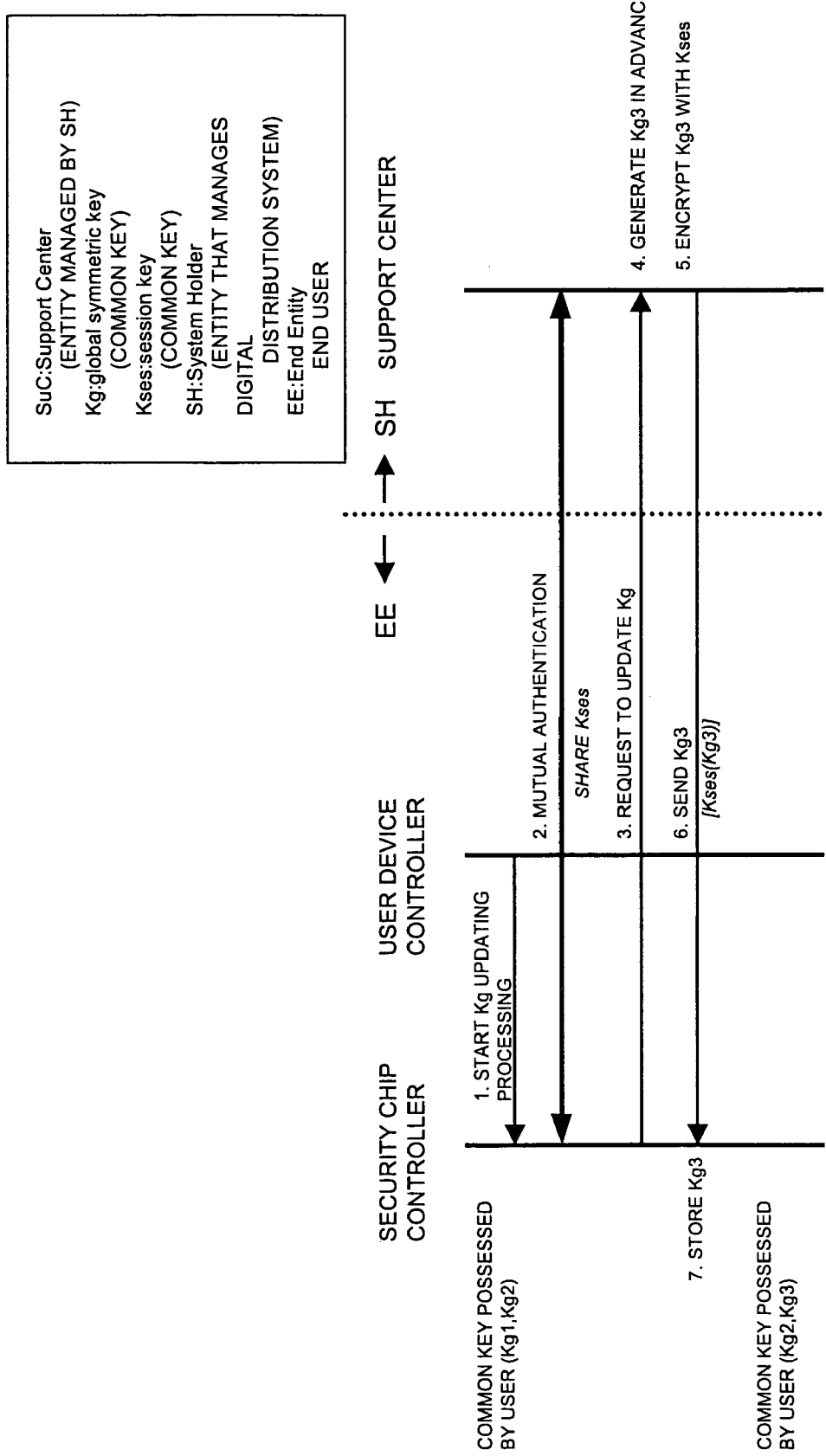
FIG. 28 is a sequence of updating processing of a global common key.

The global common key is updated when necessary. The support center, which is under the management of the system holder, updates the global common key. A sequence of the processing for updating global common keys executed between the support center and the user device is shown in FIG. 28. It is now assumed that two global common keys Kg1 and Kg2 are stored in the memory area in the security chip of the user device. The key data in the attribute certificate is encrypted and decrypted by using either of the two keys. Alternatively, the key data in the attribute certificate may be encrypted and decrypted by using the two keys according to, for example, a triple DES algorithm.

Each processing in the processing sequence of FIG. 28 is described below. FIG. 28 illustrates, from the left, the processing of the security chip controller, the user device controller, and the support center, which is under the management of the system holder.

The user device controller sends a request to update the global common key: Kg to the security chip controller. Then, the security chip controller connects to the support center, which is under the management of the system holder, via the user device, and performs mutual authentication between the security chip and the support center. This mutual authentication is executed according to, for example, the above-described TLS1.0 processing shown in FIG. 16, or another processing using, for example, a public key system. In this mutual authentication, the public key certificates of both the security chip and the support center are verified, and if necessary, the public key certificates up to the root certification authority (CA) are verified. In this authentication processing, the security chip and the support center share the session key (Kses).

After the mutual authentication has been successfully conducted, the security chip controller outputs a request to update the global common key: Kg to the support center. The support center sends encrypted key data: [Kses(Kg3)], which is obtained by encrypting an updating global common key: Kg3, which has been generated or is generated in response to a request, with the session key: Kses generated during authentication processing to the security chip of the user device.

Upon receiving the global common key: Kg3 encrypted with the session key, i.e., [Kses(Kg3)], from the support center, the security chip controller decrypts [Kses(Kg3)] with the session key acquired during mutual authentication so as to obtain the global common key: Kg3.

After successfully obtaining the global common key: Kg3, the security chip controller replaces the global common key: Kg1 by the obtained global common key: Kg3. Thus, the global common keys possessed by the user device are Kg2 and Kg3. The order of the global common keys possessed by the user device also makes sense, and thus, the order [Kg1, Kg2] is also replaced by [Kg2, Kg3]. The global common key has data indicating, not only the key data, but also the order of the global common keys.

Figure 29:
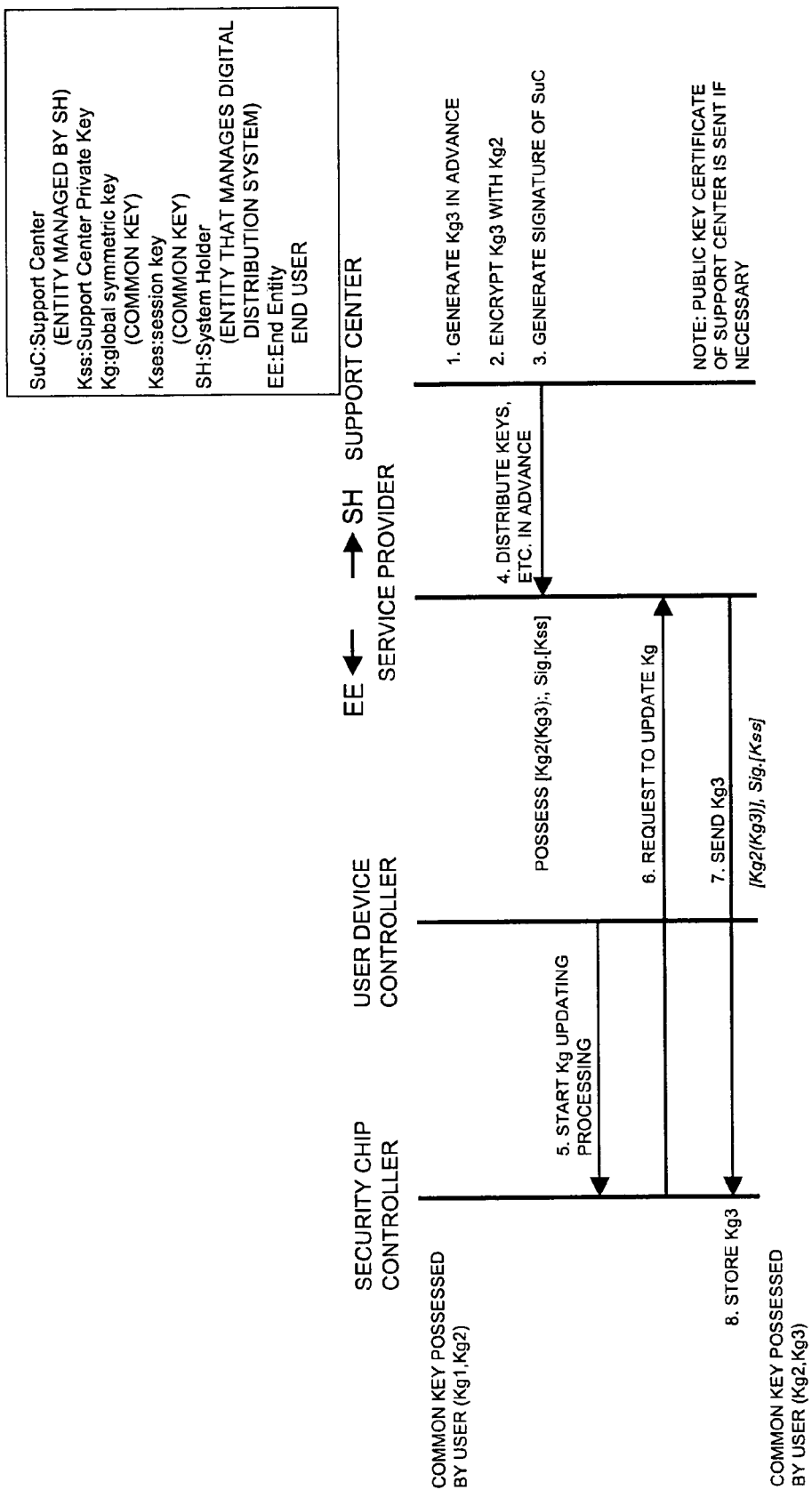
FIG. 29 is a sequence of updating processing of a global common key.

FIG. 29 illustrates an example of a processing sequence for updating a global common key by the service provider, which serves as an intermediate entity, without the need for the user device and the support center to directly send and receive data.

Each processing of the processing sequence of FIG. 29 is discussed below. FIG. 29 illustrates, from the left, the processing of the security chip controller, the user device controller, the service provider, and the support center, which is under the management of the system holder.

The support center generates a new global common key: Kg3 in advance, and encrypts it with the global common key: Kg2, which has already been distributed to the user device, so as to generate data: [Kg2(Kg3)]. The support center then attaches a signature to the data [Kg2(Kg3)] by using the private key: Kss of the support center, and sends it to the service provider. The service provider has data [Kg2(Kg3)] and Sig[Kss]. A, Sig[B] indicates that a signature is attached to data A with key B.

Subsequently, the user device controller sends a request to update the global common key: Kg to the security chip controller. Then, the security chip controller connects to the service provider via the user device, and performs mutual authentication between the security chip and the service provider. This mutual authentication is performed by the above-described TLS1.0 processing shown in FIG. 16 or another method using, from example, a public key system. In this mutual authentication, the public key certificates of both the security chip and the service provider are verified, and if necessary, the public key certificates up to the root certification authority (CA) are verified. In this authentication, the security chip and the service provider share the session key (Kses).

After the mutual authentication has been successfully conducted, the security chip controller outputs a request to update the global common key: Kg to the service provider. The service provider then sends data [Kg2(Kg3)], Sig[SuC], which has been received from the support center, to the security chip of the user device.

Upon receiving the data [Kg2(Kg3)], Sig[SuC], which has been transferred from the support center, from the service provider, the security chip controller checks the signature to verify that the data is not tampered with, and then, decrypts [Kg2(Kg3)], which is obtained by encrypting the global common key: Kg3 with the global common key: Kg2, by using the global common key: Kg2 possessed by the security chip, thereby obtaining the global common key: Kg3. If the public key of the support center is used for verifying the signature of the support center, the public key certificate of the support center is sent to the user device together with the data [Kg2(Kg3)], Sig[SuC], or is distributed to the user device in advance.

After successfully obtaining the global common key: Kg3, the security chip controller updates the global common key: Kg1 stored in the key storage area, for example, in the above-described device management area, of the memory, by the global common key: Kg3. According to this updating processing, the global common keys possessed by the user device result in Kg2 and Kg3.

[Decryption Processing Using Decoder]

Encrypted content or an encrypted content key can be processed faster by using a dedicated decoder provided with a decryption processing function. However, since a decoder has a hardware configuration independent of a security chip, the content key or the content must be decrypted after checking the reliability of the decoder. A description is given below, with reference to the drawings, of the decryption of the encrypted content or the encrypted content key by using a decoder.

Figure 30:
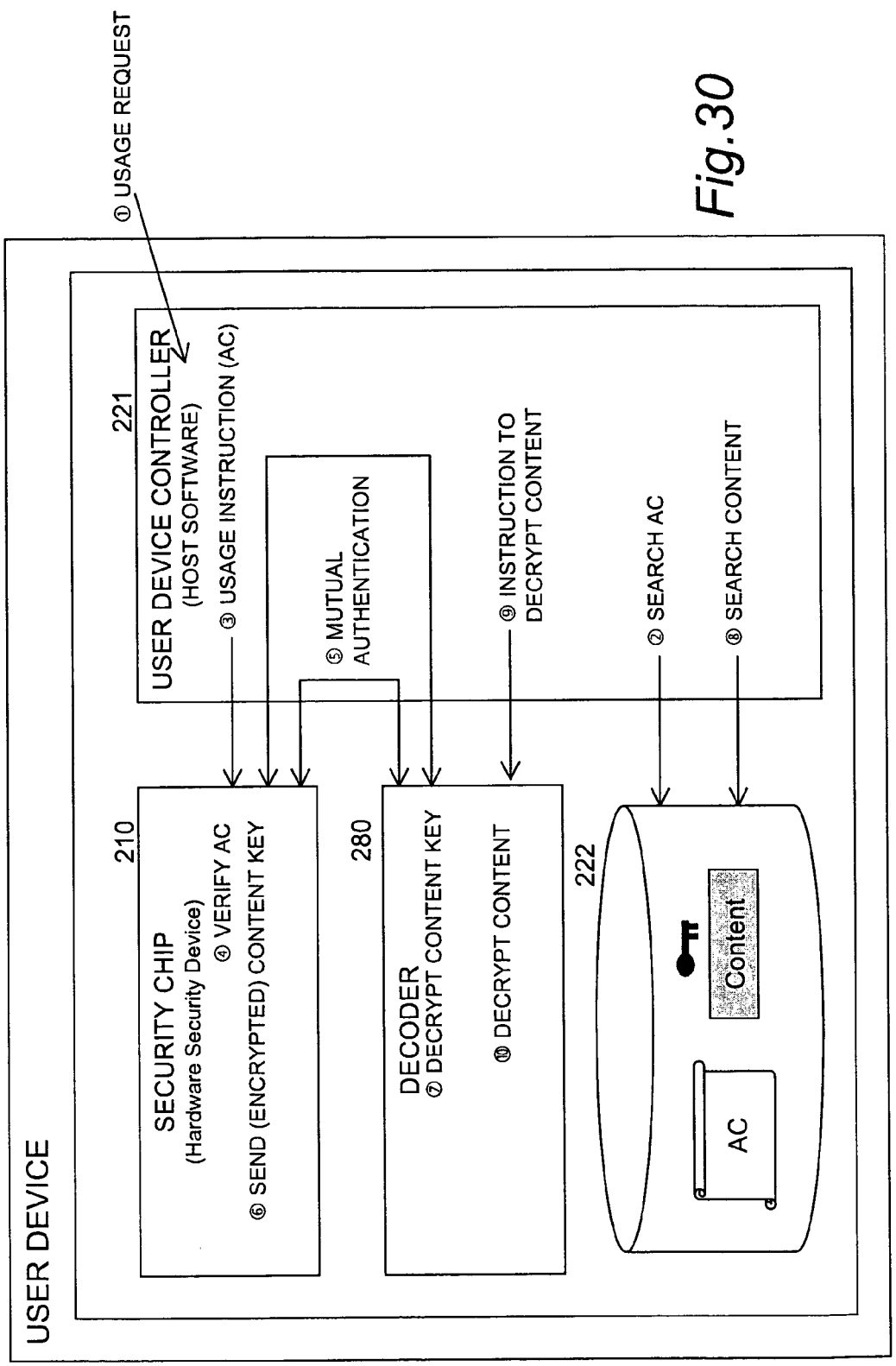
FIG. 30 illustrates decryption processing using a decoder.

FIG. 30 illustrates a processing sequence for decrypting a content key and content when the user device is provided with a security chip and a decoder.

The user device includes the security chip 210, a decoder 280, the memory 222 formed of, for example, a hard disk or a flash memory, and the user device controller 221. The user device controller 221 inputs and outputs data into and from the security chip 210, the decoder 280, and the memory 222, and instructs these elements to perform processing by using host software.

The sequence for decrypting the content is as follows. First, the user inputs a content usage request by designating the content into the user device controller 221 by operating input means. Then, the user device controller 221 searches for the attribute certificate (AC) stored in the memory 222 and set for the designated content. The attribute certificate (AC) extracted by search is transferred to the security chip 210, and the security chip 210 performs the verifying processing of the attribute certificate (AC).

After the attribute certificate (AC) has been successfully verified, mutual authentication and the sharing of the session key are performed between the security chip 210 and the decoder 280. After successfully conducting the mutual authentication, the security chip 210 decrypts the encrypted content key extracted from the attribute certificate (AC), re-encrypts the content key with the session key, which is shared with the decoder 280 during the mutual authentication, and sends the re-encrypted content key to the decoder 280. Upon receiving the encrypted content key, the decoder 280 decrypts the encrypted content key with the session key so as to obtain the content key.

Then, the user device controller 221 extracts by search the encrypted content stored in the memory 222, and sends it to the decoder 280. The decoder 280 decrypts the encrypted content input from the user device controller 221 with the previously obtained content key.

In the above-described processing using the decoder, the content key is not used in the security chip 210. The decoder decrypts the encrypted content and outputs it as analog output, such as sound or picture data, to an external source. In the attribute certificate (AC), the decoder ID or the authentication method may be indicated, in which case, the security chip 210 determines during the mutual authentication whether the decoder matches the decoder ID or the authentication method indicated in the attribute certificate (AC), and only when the decoder matches such data, the security chip 210 outputs the content key to the decoder.

Figure 31:
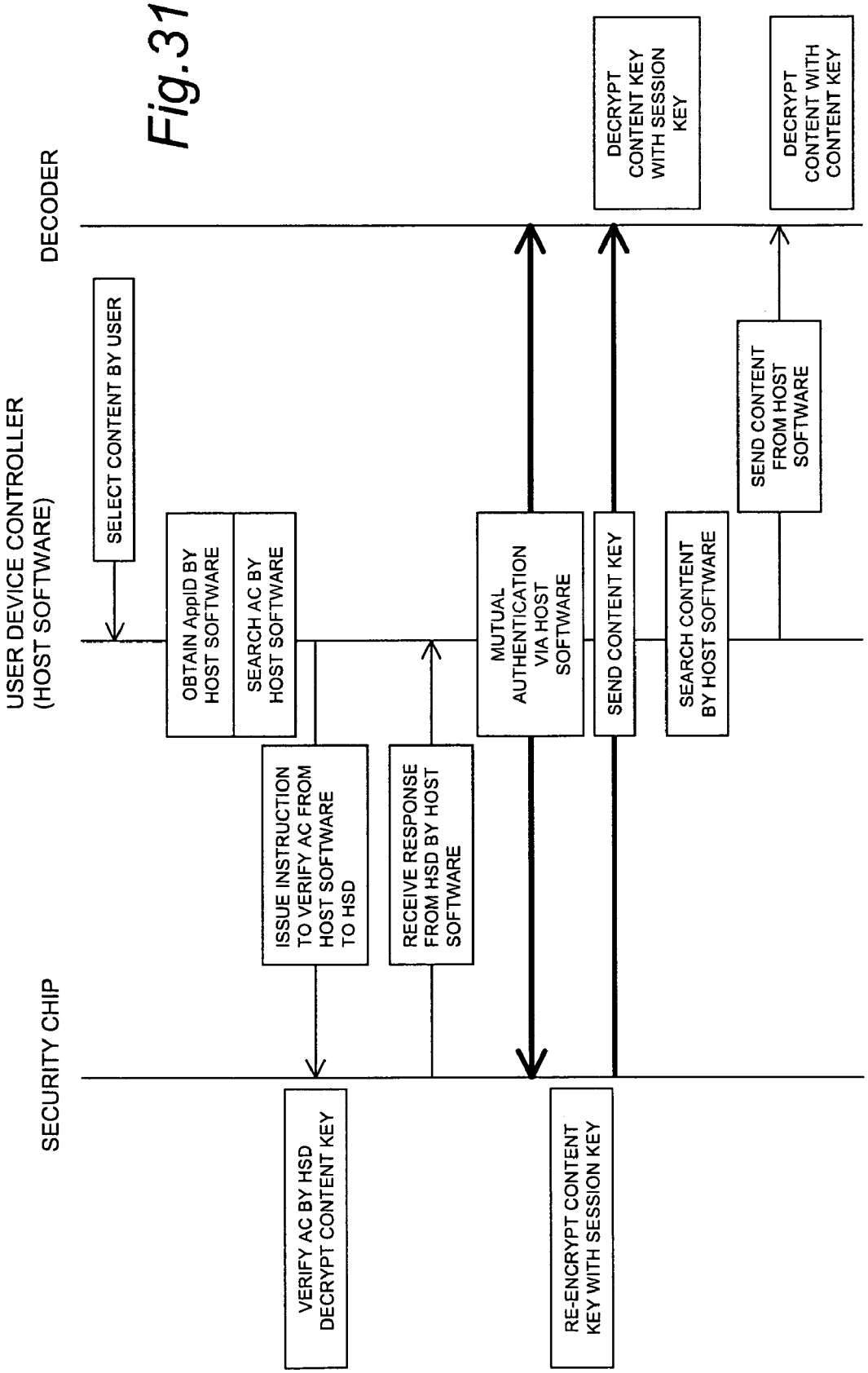
FIG. 31 is a sequence of decryption processing using a decoder.

A processing sequence using the decoder is described below with reference to FIG. 31. FIG. 31 illustrates, from the left, the processing of the security chip, the host software (user device controller), and the decoder.

The user inputs a content usage request by designating the content into the host software (user device controller) by operating the input means. Then, the host software (user device controller) obtains the application ID corresponding to the designated content, and, based on this application ID, the host software searches for the attribute certificate (AC) corresponding to the application ID stored in the memory, for example, a hard disk.

The attribute certificate (AC) extracted by search is transferred to the security chip together with an instruction to verify the attribute certificate (AC). The security chip verifies the attribute certificate (AC), and if the attribute certificate (AC) is successfully verified, the security chip extracts the encrypted content key from the attribute certificate (AC) and decrypts it, and also outputs a response message to the host software (user device controller).

Subsequently, mutual authentication and the sharing of the session key are performed between the security chip and the decoder via the host software (user device controller). After the mutual authentication has been successfully conducted, the security chip decrypts the encrypted content key extracted from the attribute certificate (AC), re-encrypts the content key with the session key, which is shared with the decoder during the mutual authentication, and sends the encrypted content key to the decoder. Upon receiving the encrypted content key, the decoder decrypts the encrypted content key by using the session key so as to obtain the content key.

Then, the user device controller extracts by search the encrypted content stored in the memory, and sends it to the decoder. The decoder decrypts the encrypted content input from the user device controller by using the previously obtained content key.

Figure 32:
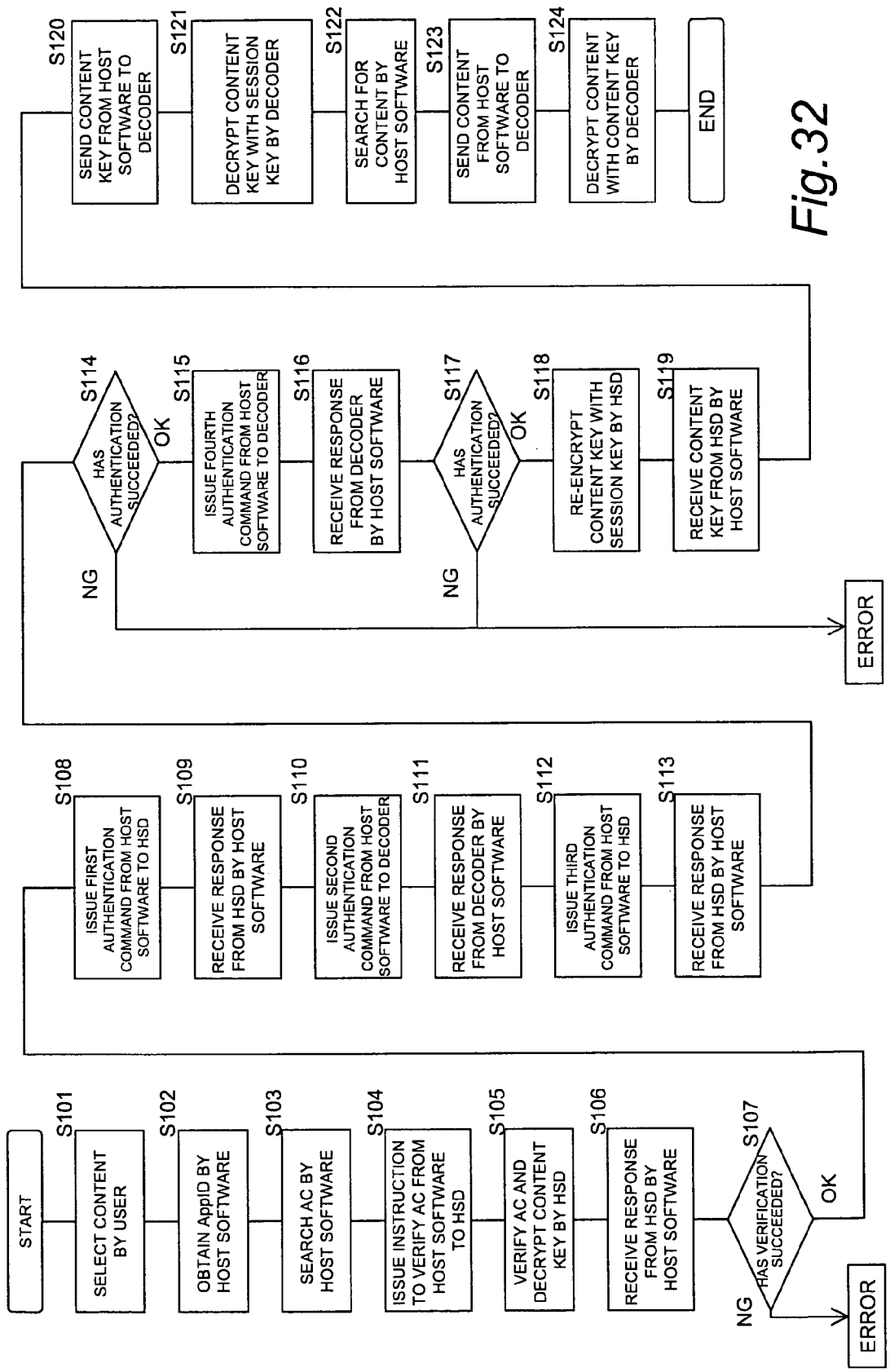
FIG. 32 is a flowchart illustrating decryption processing using a decoder.

Content decryption processing using the decoder is described below with reference to the flowchart of FIG. 32.

In step S101, the user inputs a content usage request by designating the content into host software (user device controller) by operating the input means. Then, in step S102, the host software (user device controller) obtains the application ID corresponding to the designated content. In step S103, the host software (user device controller) searches for the attribute certificate (AC) corresponding to the application ID stored in the memory, such as a hard disk, based on the application ID. In step S104, the attribute certificate (AC) extracted by search is transferred to the security chip together with an instruction to verify the attribute certificate (AC). In step S105, the security chip verifies the attribute certificate (AC), and if the verification of the attribute certificate (AC) has succeeded, the security chip extracts the encrypted content key from the attribute certificate (AC) and decrypts it. In step S106, the security chip also outputs a response message to the host software (user device controller).

If the verification of the attribute certificate (AC) has not succeeded, the subsequent process is terminated. If the verification has succeeded, mutual authentication and the sharing of the session key are performed between the security chip and the decoder via the host software (user device controller). More specifically, in step S108, a first authentication command is issued from the host software (user device controller) to the security chip. Then, in step S109, the host software (user device controller) receives a response from the security chip. In step S110, a second authentication command is issued from the host software (user device controller) to the decoder. Then, in step S111, the host software (user device controller) receives a response from the decoder. In step S112, a third authentication command is issued from the host software (user device controller) to the security chip. Then, in step S113, the host software (user device controller) receives a response from the security chip. In this manner, the authentication of the decoder by the security chip is conducted. If the authentication has failed (NG in S114), the subsequent process is terminated, and if the authentication has succeeded, the process proceeds to step S115.

In step S115, a fourth authentication command is issued from the host software (user device controller) to the decoder. Then, in step S116, the host software (user device controller) receives a response from the decoder. According to this processing, the authentication of the security chip by the decoder can be determined. If the authentication processing has failed (NG in S117), the subsequent process is terminated. If the authentication has succeeded, the process proceeds to step S118.

In step S118, the security chip decrypts the encrypted content key extracted from the attribute certificate (AC), and then, re-encrypts the content key by using the session key, which is shared with the decoder during the authentication processing (S118), and sends the content key to the host software (user device controller) (S119). The host software (user device controller) sends the received encrypted content key to the decoder (S120).

Upon receiving the encrypted content key, the decoder decrypts the encrypted content key with the session key so as to obtain the content key (S121). The host software (user device controller) extracts the encrypted content stored in the memory by search (S122), and sends the content to the decoder (S123). The decoder decrypts the encrypted content input from the host software by using the previously obtained content key (S124).

As discussed above, in the decryption processing using the decoder, mutual authentication is conducted between the security chip and the decoder, and only when the mutual authentication is successfully conducted, the content key encrypted with the session key is output to the decoder. With this configuration, decryption is performed only in the reliable entities, thereby making it possible to achieve the authorized use of the content.

[Content Usage Restrictions]

As has been discussed above, the content-usage-condition-related information stored in the attribute information field of the content attribute certificate in which the restricted-content-usage information is stored includes various usage conditions, such as a restricted number of usages and a validity period of the content provided by the service provider. That is, the following items of information are stored:

conditions: information indicating whether the content is to be used on-line or off-line, and information indicating whether the content is to be fully purchased (full-purchase content), to be used with a restricted period, to be used on-line with a restricted number of usages, or to be used off-line with a restricted number of usages;

validity period: information indicating the validity period if the period of the content usage is restricted; and restricted number of usages: possible usage number if the number of usages is restricted.

If the content is fully purchased, and the use of the content after being purchased is free of charge, "full purchase" is set as a condition in the attribute certificate. If the content has a restricted usage period, a restricted usage period is set as a condition, and thus, the validity period is set in the attribute certificate. If the content has a restricted usage number, a restricted number of usages is set as a condition in the attribute certificate, and a value (number of usages) is set in the restricted usage number. The condition for a restricted number of usages includes off-line/usage-period restrictions in which the number of usages is controlled in the user device for utilizing the content, and on-line/usage-period restrictions in which the number of usages is checked in the service provider and the use of the content is permitted within the number set in the attribute certificate. A mode in which the period restrictions and the usage-number restrictions are combined is also available. In the user device, the content is utilized according to the mode recorded in the attribute certificate. Specific examples of these modes are described below.

For utilizing the content in the user device, it is necessary to obtain the content key: Kc by extracting the encrypted content key from the attribute certificate corresponding to the target content and by decrypting the encrypted content key. As discussed above, for obtaining the content key, off-line processing may be performed to decrypt the content key in the security chip of the device, or on-line processing may be performed by sending the attribute certificate to the service provider and requesting it to decrypt the content key. Also, the content usage processing according to the content usage conditions indicated in the attribute certificate includes off-line processing in which the usage conditions are checked in the user device and on-line processing in which the usage conditions must be checked in the service provider. It is determined whether off-line processing or on-line processing is performed by a description in the attribute information field of the attribute certificate.

Figure 33:
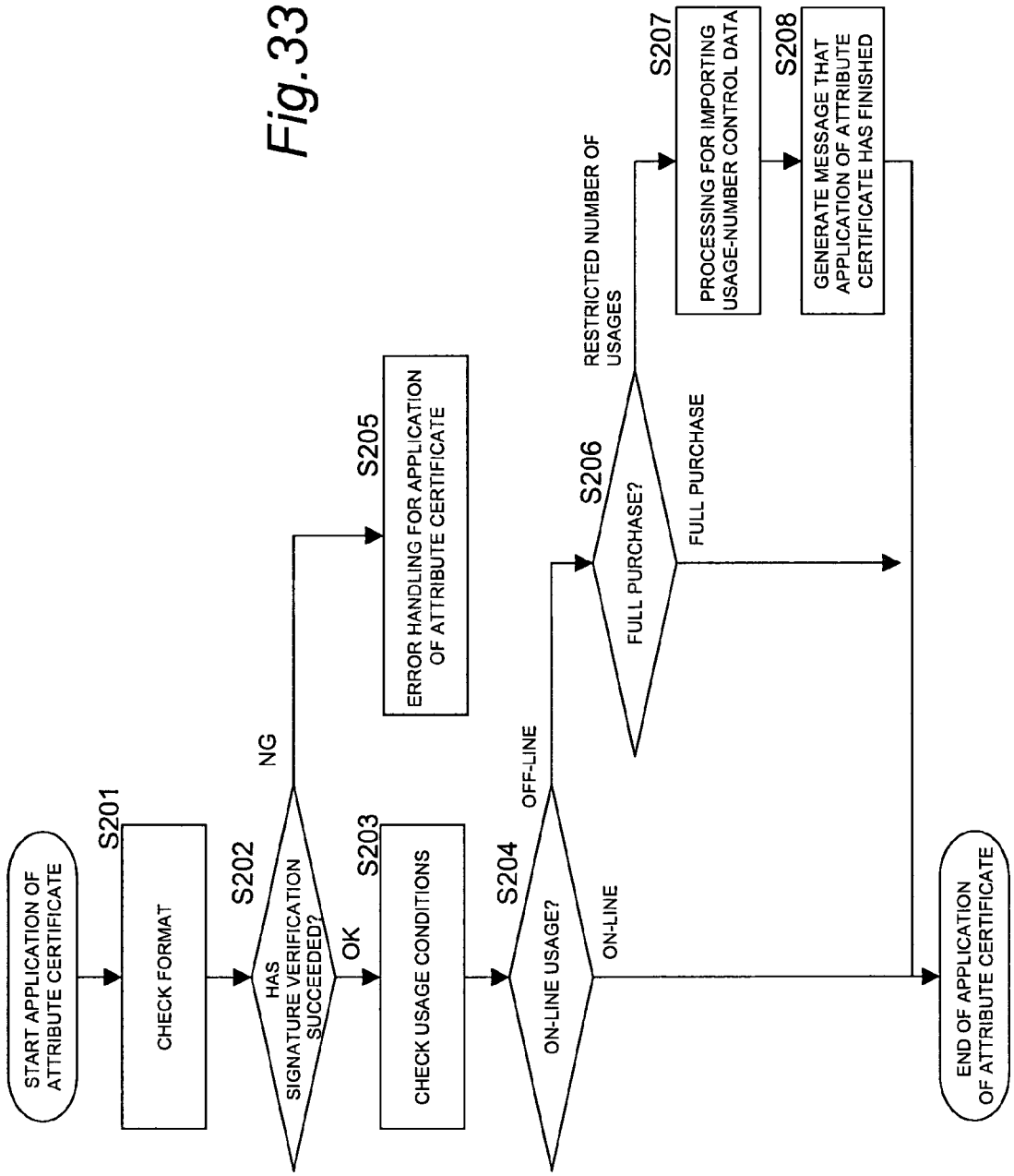
FIG. 33 is a flowchart illustrating the application of an attribute certificate (AC) in the user device.

FIG. 33 is a flowchart for the application of the attribute certificate (AC) in the user device when utilizing the content. The individual steps of the flowchart are described below.

The user device selects the attribute certificate for the content to be utilized according to the application ID (content ID information), and then, checks the format of the attribute certificate (S201). It is checked in step S201 whether the required items are recorded in the attribute certificate and whether the period of the certificate is valid. After checking the format, the signature is verified in step S202. As has been discussed above, the digital signature of the attribute certificate issuer (for example, the service provider) is attached to the attribute certificate, and thus, the user device verifies the signature (see FIG. 20) by extracting the public key from the public key certificate of the attribute certificate issuer. In this case, if necessary, the public key certificate used for verifying the signature is also preferably verified, and more preferably, linkage verification is performed. There may be some cases where linkage verification must be performed.

If the verification has been successfully conducted in the signature verification processing in step S202, it proves that the attribute certificate is not tampered with. In this case, the process proceeds to step S203. In contrast, if the verification has not been successfully conducted in the signature verification processing in step S202, it proves that the attribute certificate is tampered with. In this case, the process proceeds to step S205 in which the processing using the attribute certificate is not executed, and the subsequent process, that is, the content usage processing, is terminated.

If it is determined that the attribute certificate is not tampered with, the process proceeds to step S203 in which the content-usage-condition information in the attribute information field of the attribute certificate is obtained. That is, the content-usage-condition information indicates whether the content is to be used on-line or off-line, whether the content is to be fully purchased, to be used with a restricted period, to be used on-line with a restricted number of usages, or to be used off-line with a restricted number of usages. According to these conditions, it is determined in step S204 whether the content is to be used on-line. If the content is to be used off-line, it is determined in step S206 whether the content is to be fully purchased or to be used with a restricted number of usages.

If it is determined in step S204 that the content is to be used on-line, the attribute certificate is sent to the service provider to verify the restricted usage information in the attribute certificate, as has been discussed with reference to FIG. 26. If the content is to be used on-line, it must have period restrictions or usage-number restrictions. Accordingly, the service provider obtains the content-usage-condition information from the attribute certificate, and if the request from the user is to use the content within the usage conditions, the service provider allows the user to obtain the content key. If the request from the user is to use the content exceeding the usage conditions, the service provider sends a message indicating that the content cannot be utilized without allowing the user to obtain the content key.

If it is determined in step S204 that the content is to be used off-line, and if it is determined in step S206 that the content is to be fully purchased, the following processing is performed. In the attribute certificate, the content key data: [SC.Stopub-.SP.K(Kc)] encrypted with the service provider (SP) public key: SC.Stopub.SP.K corresponding to the SP storage private key stored in the service provider management area of the security chip of the user device is stored. The user device decrypts the content key data: [SC.Stopub.SP.K(Kc)] with the SP storage private key SC.Stopri.SP.K stored in the service provider management area so as to obtain the content key: Kc, and then, the user device decrypts the content with the content key: Kc for utilizing the content.

If it is determined in step S204 that the content is to be used off-line, and if it is determined in step S206 that the content has a restricted number of usages, the number of usages is checked in the user device based on the conditions set in the attribute certificate so as to check whether the content can be utilized. Thereafter, if it is determined that the content can be utilized, the encrypted content key stored in the attribute certificate is decrypted, and content-usage-number control data, which is controlled in the device, is updated. It is thus necessary that the user device have the content-usage-number control data.

Processing for importing the usage-number control data in step S207 is to generate control data for the content usage number. The processing for importing the usage-number control data is performed based on the attribute certificate. There are two modes for controlling the content usage number: one mode in which the content usage number is controlled in the security chip of the user device; and the other mode in which a number control file is stored and controlled in an external memory (for example, a hard disk) outside the security chip, and only the hash value of the control data is stored in the memory of the security chip. Details of such modes are given below. A step of generating a message indicating that the application of the attribute certificate has finished in step S208 is to report from the security chip to the user device outside the security chip that the processing for importing the usage-number control data in step S207 has been finished.

The content usage conditions indicated in the attribute certificate (AC) are divided into the following four modes, which are sequentially discussed:

(A) on-line, usage-period restricted content;
(B) on-line, usage-number restricted content;
(C) off-line, full-purchase content; and
(D) off-line, usage-number restricted content (A) On-line, usage-period restricted content A description is first given, with reference to the sequence diagram of FIG. 34, of a process from the acquirement of an attribute certificate to the acquirement of the content when the content usage conditions recorded in the attribute certificate indicate on-line, usage period restrictions.

Figure 34:
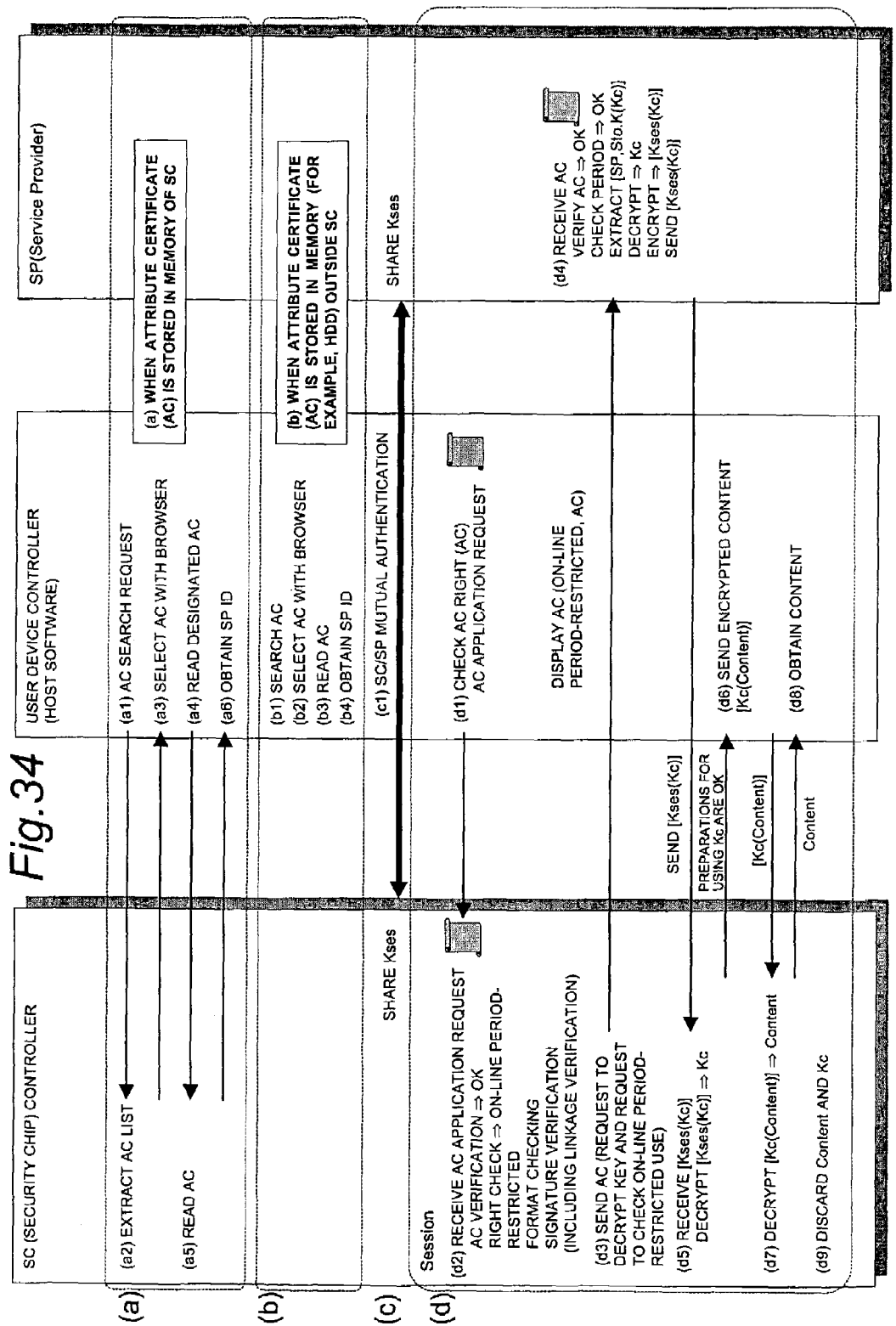
FIG. 34 is a sequence of on-line period-restricted content usage processing using an attribute certificate (AC).

The sequence of FIG. 34 indicates the processing performed in the user device which has already received from the service provider the encrypted content and the attribute certificate in which content usage conditions and the encrypted content key are stored. FIG. 34 illustrates, from the left, the processing of the security chip controller in the user device, the user device controller (host software), and the service provider.

In FIG. 34, the uppermost section (a) indicates processing for obtaining a service provider ID from an attribute certificate when the attribute certificate is stored in the internal memory of the security chip, and (b) indicates processing for obtaining a service provider ID from an attribute certificate when the attribute certificate is stored in an external memory outside the security chip, i.e., in a memory that can be accessed by mere control of the user device controller. Processing (a) or (b) is selectively executed according to the storage location of the attribute certificate. Mutual authentication processing (c) and content obtaining processing (d) are conducted regardless of the storage location of the attribute certificate.

The processing (a) is discussed first. (a1) The user device controller requests the security chip controller to search for the attribute certificate corresponding to the content to be utilized. (a2) The security chip controller outputs a list of the attribute certificates stored in the memory of the chip, and (a3) the user device displays the list by using a browser attached to the user device. (a4) The user designates the attribute certificate (AC) corresponding to the content to be utilized from the displayed list, and sends a read command to the security chip controller. (a5) The security chip controller reads the designated attribute certificate from the internal memory, and outputs it to the user device controller. (a6) The user device displays the attribute certificate by using the attached browser, and obtains the service provider identifier (SP ID) in the attribute certificate storage data.

If the attribute certificate is stored in an external memory outside the security chip, i.e., in a memory that can be accessed by the mere control of the user device controller, the processing (b) is performed. (b1) The user device controller searches for the attribute certificate for the content to be utilized. (b2) The user device designates the attribute certificate (AC) corresponding to the content from an AC list displayed by using the attached browser, and (b3) reads and displays the designated attribute certificate, (b4) thereby obtaining the service provider identifier (SP ID) in the attribute certificate storage data.

The service provider identifier (SP ID) obtained by either the processing (a) or (b) is used for obtaining information required for mutual authentication from the service provider management area. As stated above, it is necessary to input a password set for each service provider for accessing the service provider management area, and the user inputs the password corresponding to the service provider identifier (SP ID) obtained from the attribute certificate so as to access the service provider management area. Then, mutual authentication between the security chip and the service provider indicated in (c1) of FIG. 34 is conducted.

This mutual authentication is performed by the above-described TLS1.0 processing shown in FIG. 16 or another processing using, for example, a pubic key method. In this mutual authentication, the pubic key certificates of both the security chip and the service provider are verified, and if necessary, the public key certificates up to the root certification authority (CA) is verified. In this authentication processing, the security chip and the support center share the session key (Kses). After the mutual authentication has been successfully conducted, the processing (d) shown in FIG. 34, i.e., the content obtaining processing, is performed.

(d1) The user checks the right information (content usage conditions) of the attribute certificate displayed by the attached browser of the user device, and outputs a request to utilize the content with the application of the attribute certificate to the security chip. The content usage conditions recorded in the attribute certificate in this example indicate on-line period restrictions.

(d2) Upon receiving the attribute-certificate (AC) application request from the user device controller, the security chip controller verifies the attribute certificate. This verification processing includes the checking of the right information (content usage conditions), format checking, and signature verification. The signature verification is conducted by a sequence similar to the above-described processing flow of FIG. 20.

If necessary, the security chip controller preferably obtains the public key certificate linked to the attribute certificate (AC) according to the public key certificate information of the AC possessor in the attribute certificate (AC) so as to verify the public key certificate. For example, if the reliability of the attribute certificate (AC) issuer is uncertain, it can be determined whether the AC issuer has a public key certificate authorized by the certification authority by verifying the public key certificate of the attribute certificate (AC) issuer. If the public key certificate forms a hierarchical structure, as described above, linkage verification is preferably performed to trace the path from a lower CA to a higher CA so as to verify the public key certificate issued by the root certification authority (CA). There may be some cases where this linkage verification must be performed.

(d3) After verifying the attribute certificate, if it is determined that the attribute certificate is not tampered with, the security chip controller sends the attribute certificate to the service provider. In the attribute certificate, it is indicated as the usage conditions that the content is an on-line period-restricted content, and the validity period data is also stored. The content key data, i.e., [SP.Sto.K(Kc)], encrypted with the service provider private key: SP.Sto.K is also stored.

(d4) Upon receiving the attribute certificate from the security chip, the service provider verifies the signature of the attribute certificate. In this case, the public key certificate linked to the attribute certificate is preferably verified, and the higher public key certificates are also preferably verified. There are some cases where this linkage verification must be performed. After proving the integrity of the attribute certificate by this verification processing, the usage condition data and validity period data stored in the attribute certificate are checked. If it is determined that the request to utilize the content is within the validity period recorded in the attribute certificate as the usage conditions, data: [SP.Sto.K(Kc)], which is stored in the attribute certificate and has been obtained by encrypting the content key: Kc used for decrypting the content, is decrypted.

The service provider decrypts the encrypted content key: [SP.Sto.K(Kc)] stored in the attribute certificate by using the private key: SP.Sto.K of the service provider so as to extract the content key: Kc. The service provider then encrypts the extracted content key: Kc with the session key (Kes), which has been generated in the previous mutual authentication processing, and sends the encrypted content key to the security chip.

(d5) Upon receiving the content key encrypted with the session key, i.e., [Kses(Kc)], from the service provider, the security chip controller decrypts the encrypted content key with the session key acquired during the mutual authentication so as to obtain the content key: Kc. After successfully obtaining the content key: Kc, the security chip controller reports to the user device controller that preparations for decrypting the content are completed.

(d6) The user device controller then obtains the encrypted content [Kc(Content)] to be decrypted with the obtained content key from the memory (for example, a hard disk) of the user device or from the memory of the security chip via the security chip controller. The user device controller then sends the encrypted content to the security chip. (d7) The security chip decrypts the encrypted content with the content key: Kc and outputs the content to the user device controller as a decryption result. (d8) The user device controller then obtains the content. After completing this processing, (d9) the security chip controller discards the content key: Kc and the content obtained by the decryption processing.

According to the above-described processing, the service provider checks the usage period based on the attribute certificate (AC), and only when the content is to be utilized within the restricted usage period, the content key: Kc is re-encrypted such that it can be decrypted in the security chip, and is sent. Thus, the security chip obtains the content key and decrypts the content with the obtained content key, thereby enabling the use of the content in the user device.

There are two modes in which the content or the attribute certificate (AC) is distributed from the service provider to the user device: one mode in which the distribution is made in response to a request from a user to the service provider; and the other mode is a so-called push mode (push model) in which the distribution is unconditionally made from the service provider to any user who has made, for example, a subscriber contract, regardless of whether there is a request from the user. Either mode can be utilized. In the push model, the service provider generates the attribute certificates (AC) for the target users in advance, and distributes them.

(B) On-line, usage-number restricted content

Figure 35:
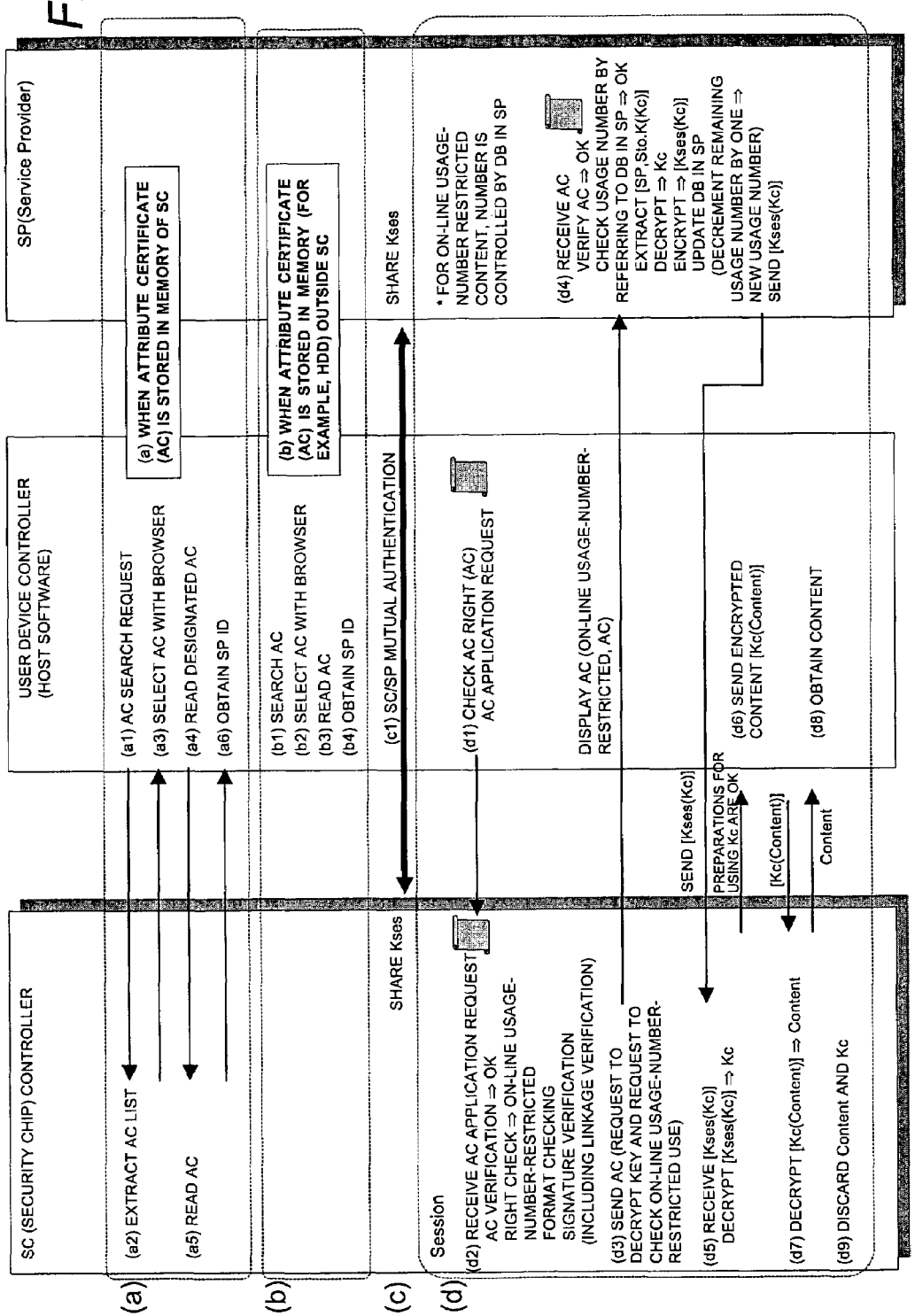
FIG. 35 is a sequence of on-line number-restricted content usage processing using an attribute certificate (AC).

A description is now given, with reference to the sequence diagram of FIG. 35, of a process from the acquirement of an attribute certificate to the acquirement of the content when the content usage conditions recorded in the attribute certificate indicate an on-line usage-number restricted content.

As in the above-described processing sequence shown in FIG. 34, the sequence of FIG. 35 indicates the processing performed by the user device which has already received from the service provider the encrypted content and the attribute certificate in which the content usage conditions and the encrypted content key are stored. FIG. 35 illustrates, from the left, the processing of the security chip controller of the user device, the user device controller (host software), and the service provider.

In FIG. 35, the uppermost section (a) indicates processing for obtaining a service provider ID from an attribute certificate when the attribute certificate is stored in the internal memory of the security chip, and (b) indicates processing for obtaining a service provider ID from an attribute certificate when the attribute certificate is stored in an external memory outside the security chip, i.e., in a memory that can be accessed by mere control of the user device controller. Processing (a) or (b) is selectively executed according to the storage location of the attribute certificate. Processing (a) and (b) and mutual authentication processing (c) are similar to those for the on-line period-restricted content discussed with reference to FIG. 34, and an explanation thereof is thus omitted. After mutual authentication processing (c) has been successfully conducted, processing indicated by (d) of FIG. 35, i.e., content obtaining processing, is executed.

(d1) The user checks the right information (content usage conditions) of the attribute certificate displayed by the attached browser of the user device, and outputs a request to utilize the content with the application of the attribute certificate to the security chip. The content usage conditions recorded in the attribute certificate in this example indicate on-line usage-number restrictions.

(d2) Upon receiving the attribute-certificate (AC) application request from the user device controller, the security chip controller verifies the attribute certificate. This verification processing includes the checking of the right information (content usage conditions), format checking, and signature verification. The signature verification is conducted by a sequence similar to, for example, the above-described processing flow of FIG. 20. In this verification processing, the security chip controller preferably performs linkage verification by tracing the path from a lower CA to a higher CA from the public key certificate linked to the attribute certificate according to the public key certificate information of the AC possessor in the attribute certificate (AC) so as to verify the public key certificate issued by the root certification authority (CA). There may be some cases where this linkage verification must be performed.

(d3) After verifying the attribute certificate, if it is determined that the attribute certificate is not tampered with, the security chip controller sends the attribute certificate to the service provider. In the attribute certificate, it is indicated as the usage conditions that the content is an on-line usage-number restricted content, and the restricted number of usages is also stored. The content key data, i.e., [SP.Sto.K (Kc)], encrypted with the service provider private key: SP.Sto.K is also stored.

(d4) Upon receiving the attribute certificate from the security chip, the service provider verifies the signature of the attribute certificate. In this case, the public key certificate linked to the attribute certificate is preferably verified, and the higher public key certificates are also preferably verified. There are some cases where this linkage verification must be performed. After proving the integrity of the attribute certificate by this verification processing, the usage condition data and the restricted number of usages stored in the attribute certificate are checked. The number of usages is stored in a database in the service provider, and the service provider determines whether the content is to be used within the restricted number recorded in the attribute certificate by referring to the control data in the database.

If it is determined that the content is to be used within the restricted number of usages recorded in the attribute certificate, data: [SP.Sto.K(Kc)], which is stored in the attribute certificate and has been obtained by encrypting the content key: Kc used for decrypting the content, is decrypted. The service provider decrypts the encrypted content key: [SP.Sto.K(Kc)] stored in the attribute certificate by using the private key: SP.Sto.K of the service provider so as to extract the content key: Kc.

The service provider also updates the content-usage-number control data in the database so as to decrement the number of usages of the content. The service provider then encrypts the extracted content key: Kc with the session key (Kses), which has been generated in the previous mutual authentication processing, and sends the encrypted content key to the security chip of the user device.

(d5) Upon receiving the content key encrypted with the session key, i.e., [Kses(Kc)], from the service provider, the security chip controller decrypts the encrypted content key with the session key acquired during the mutual authentication so as to obtain the content key: Kc. After successfully obtaining the content key: Kc, the security chip controller reports to the user device controller that preparations for decrypting the content are completed.

(d6) The user device controller then obtains the encrypted content [Kc(Content)] to be decrypted with the obtained content key from the memory (for example, a hard disk) of the user device or from the memory of the security chip via the security chip controller. The user device controller then sends the encrypted content to the security chip. (d7) The security chip decrypts the encrypted content with the content key: Kc and outputs the content to the user device controller as a decryption result. (d8) The user device controller then obtains the content. After completing this processing, (d9) the security chip controller discards the content key: Kc and the content obtained by the decryption processing.

According to the above-described processing, the service provider checks the number of content usages based on the attribute certificate (AC), and only when the content is to be utilized within the restricted number of usages, the content key: Kc is re-encrypted such that it can be decrypted in the security chip, and is sent. Thus, the security chip obtains the content key and decrypts the content with the obtained content key, thereby enabling the use of the content in the user device.

There are two modes in which the content or the attribute certificate (AC) is distributed from the service provider to the user device: one mode in which the distribution is made in response to a request from a user to the service provider; and the other mode is a so-called push mode (push model) in which the distribution is unconditionally made from the service provider to any user who has made, for example, a subscriber contract, regardless of whether there is a request from the user. Either mode can be utilized. In the push model, the service provider generates the attribute certificates (AC) for the target users in advance, and distributes them.

(C) Off-line full-purchase content

Figure 36:
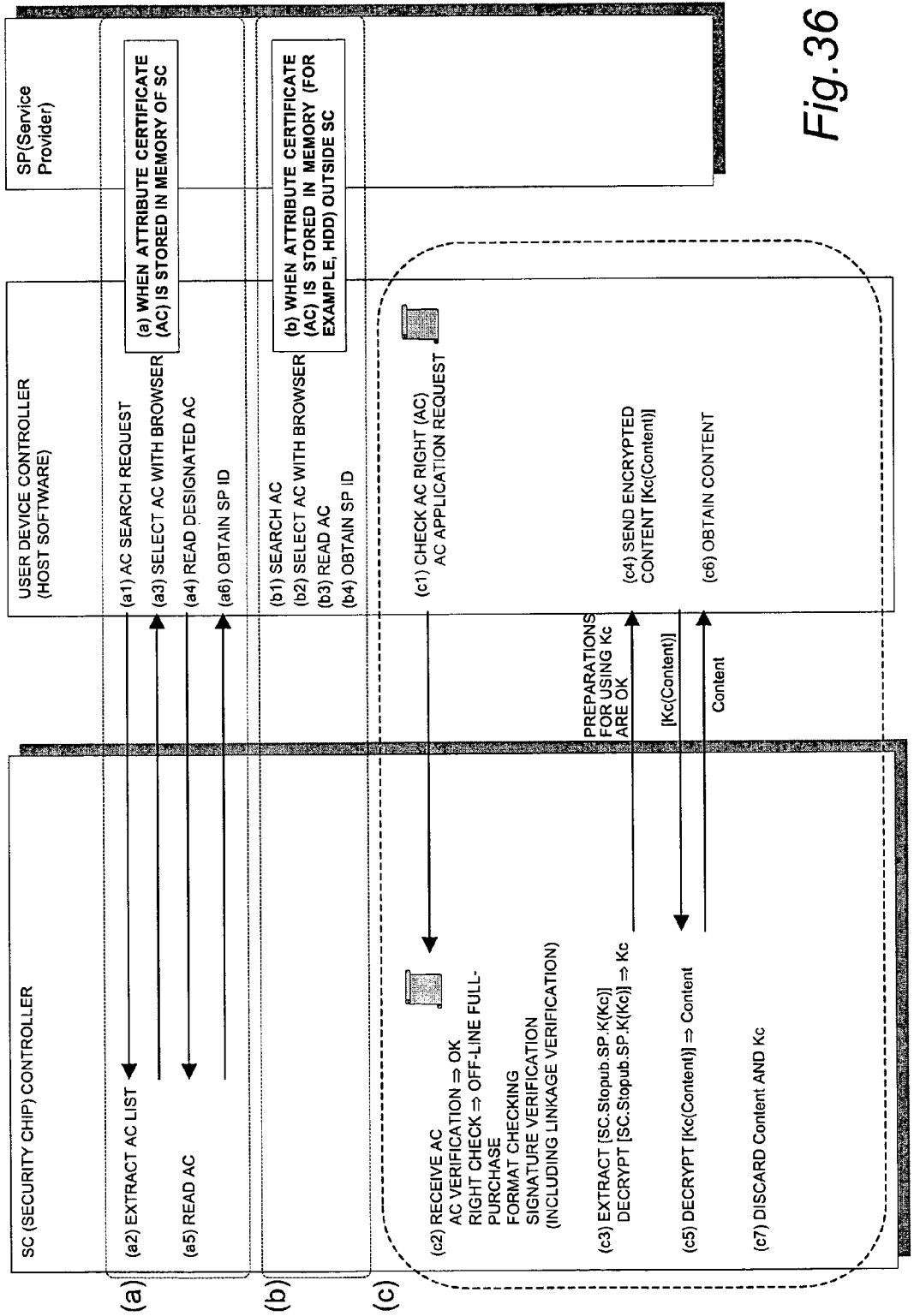
FIG. 36 is a sequence of off-line full-purchase content usage processing using an attribute certificate (AC).

A description is now given, with reference to the sequence diagram of FIG. 36, of a process from the acquirement of an attribute certificate to the acquirement of the content when the content usage conditions recorded in the attribute certificate indicate an off-line full-purchase content.

As in the above-described processing sequences shown in FIGS. 34 and 35, the sequence of FIG. 36 indicates the processing performed by the user device which has already received from the service provider the encrypted content and the attribute certificate in which the content usage conditions and the encrypted content key are stored. FIG. 36 illustrates, from the left, the processing of the security chip controller of the user device, the user device controller (host software), and the service provider.

In FIG. 36, the uppermost section (a) indicates processing for obtaining a service provider ID from an attribute certificate when the attribute certificate is stored in the internal memory of the security chip, and (b) indicates processing for obtaining a service provider ID from an attribute certificate when the attribute certificate is stored in an external memory outside the security chip, i.e., in a memory that can be accessed by mere control of the user device controller. Processing (a) or (b) is selectively executed according to the storage location of the attribute certificate. Processing (a) and (b) are similar to those for the on-line period-restricted content discussed with reference to FIG. 34, and an explanation thereof is thus omitted. After obtaining the service provider ID by either processing (a) or (b), processing indicated by (c) of FIG. 36, i.e., content obtaining processing, is performed.

(c1) The user checks the right information (content usage conditions) of the attribute certificate displayed by the attached browser of the user device, and outputs a request to utilize the content with the application of the attribute certificate to the security chip. The content usage conditions recorded in the attribute certificate in this example indicate off-line full-purchase.

(c2) Upon receiving the attribute-certificate (AC) application request from the user device controller, the security chip controller verifies the attribute certificate. This verification processing includes the checking of the right information (content usage conditions), format checking, and signature verification. The signature verification is conducted by a sequence similar to, for example, the above-described processing flow of FIG. 20. In this verification processing, the security chip controller preferably performs linkage verification by tracing the path from a lower CA to a higher CA from the public key certificate linked to the attribute certificate according to the public key certificate information of the AC possessor in the attribute certificate (AC) so as to verify the public key certificate issued by the root certification authority (CA). There may be some cases where this linkage verification must be performed.

(c3) After verifying the attribute certificate, if it is determined that the attribute certificate is not tampered with, the security chip controller extracts the content key data: [SP.Sto-pub.K(Kc)] stored in the attribute certificate, and decrypts it with the SP storage private key: SC.Stopri.SP.K stored in the service provider management area so as to obtain the content key: Kc. After successfully obtaining the content key: Kc, the security chip controller reports to the user device controller that preparations for decrypting the content are completed.

(c4) The user device controller then obtains the encrypted content [Kc(Content)] to be decrypted with the obtained content key from the memory (for example, a hard disk) of the user device or from the memory of the security chip via the security chip controller. The user device controller then sends the encrypted content to the security chip. (c5) The security chip decrypts the encrypted content with the content key: Kc and outputs the content to the user device controller as a decryption result. (c6) The user device controller then obtains the content. After completing this processing, (c7) the security chip controller discards the content key: Kc and the content obtained by the decryption processing.

According to the above-described processing, after checking whether the content is to be fully purchased based on the attribute certificate (AC), the security chip decrypts the content key: Kc to obtain the content key, and decrypts the content with the obtained content key, thereby enabling the use of the content in the user device.

In the above-described example, a public key cryptosystem is employed in which the SP storage public key: SC.Stopub-.SP.K is used to encrypt the content key, and the SP storage private key: SC.Stopri.SP.K is used to decrypt the content key. However, a common key system may be employed, in which case, the SP storage key (common key): SC.Sto.SP.K is used both for encrypting and decrypting the content key. In this case, the SP storage key (common key): SC.Sto.SP.K is stored in the service provider management area of the corresponding service provider in the memory of the security chip.

There are two modes in which the content or the attribute certificate (AC) is distributed from the service provider to the user device: one mode in which the distribution is made in response to a request from a user to the service provider; and the other mode is a so-called push mode (push model) in which the distribution is unconditionally made from the service provider to any user who has made, for example, a subscriber contract, regardless of whether there is a request from the user. Either mode can be utilized. In the push model, the service provider generates the attribute certificates (AC) for the target users in advance, and distributes them.

(D) Off-line usage-number restricted content

A description is now given of a process from the acquirement of an attribute certificate to the acquirement of the content when the content usage conditions recorded in the attribute certificate indicate an off-line usage-number restricted content. When the usage conditions in the attribute certificate indicate an off-line usage-number restricted content, it is necessary for the user device to have content-usage-number control data for controlling the number of usages in the device based on the conditions set in the attribute certificate. To acquire the content-usage-number control data is processing for importing the usage-number control data.

(D-1) Import processing

The import processing for the usage-number control data is first discussed. There are two modes for controlling the number of content usages: one mode in which the number of content usages is controlled in the security chip of the user device; and the other mode in which a number control file is stored and controlled in an external memory (for example, a hard disk) outside the security chip, and only the hash value of the control data is stored in the memory of the security chip.

Figure 37:
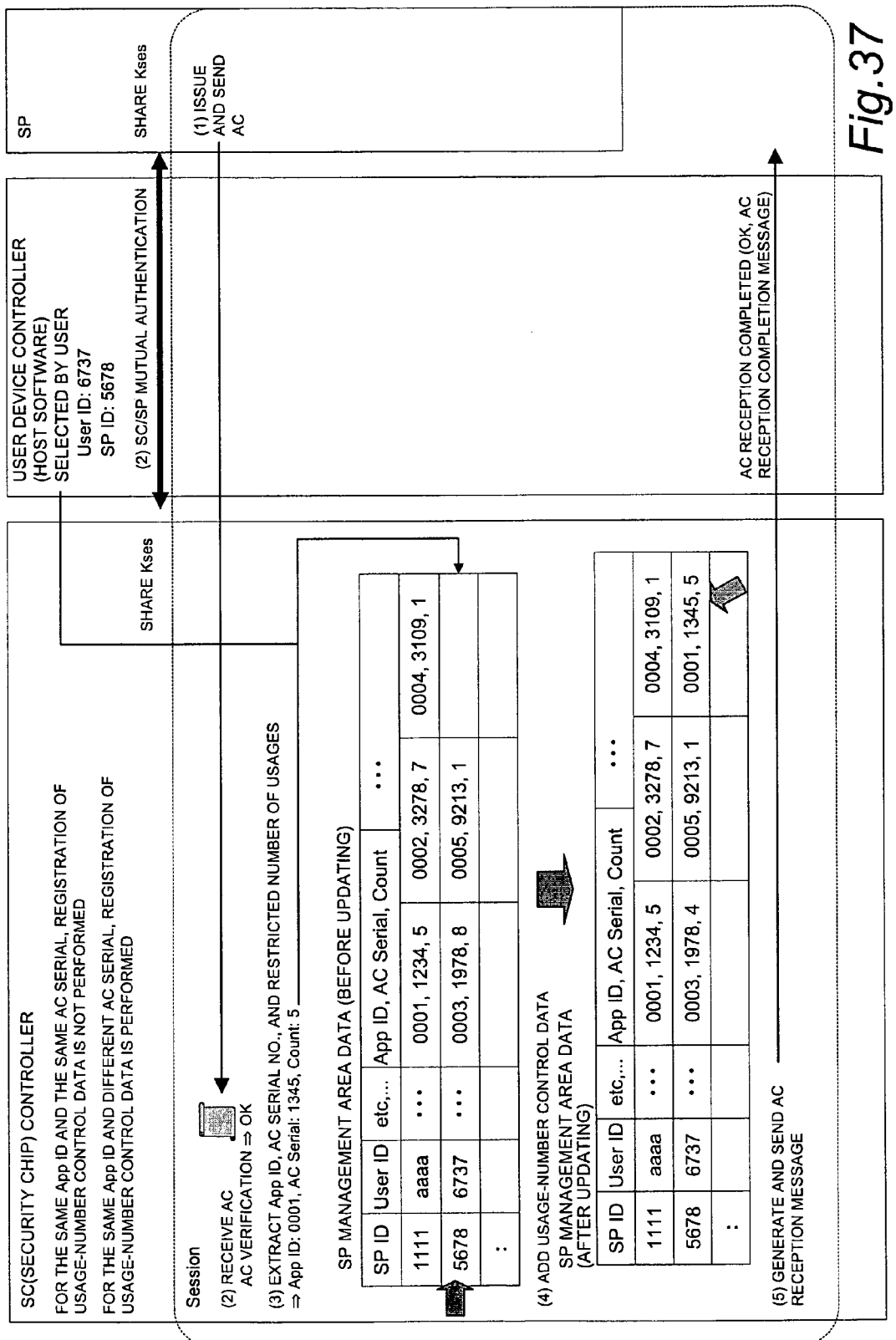
FIG. 37 illustrates import processing for usage-number control data corresponding to off-line number-restricted content.

An import processing sequence for the usage-number control data when the number of content usages is controlled in the security chip of the user device is first described with reference to FIG. 37. FIG. 37 illustrates, from the left, the processing of the security chip controller of the user device, the user device controller (host software), and the service provider. The sequence of FIG. 37 illustrates the processing for issuing an attribute certificate for the purchased content from the service provider to the security chip, and the subsequent processing, after mutual authentication for the content purchase processing has been successfully conducted between the security chip and the service provider. In the attribute certificate issued by the service provider, the content usage conditions indicate an off-line usage-number restricted content, and the restricted number of content usages is recorded.

(1) When an attribute certificate is issued and sent from the service provider, (2) the security chip controller verifies the attribute certificate. The verification processing includes the checking of right information (content usage conditions), format checking, and signature verification. The signature verification processing is executed according to a sequence similar to, for example, the above-described processing of FIG. 20. In this verification processing, the security chip controller preferably performs linkage verification by tracing the path from a lower CA to a higher CA from the public key certificate linked to the attribute certificate according to the public key certificate information of the AC possessor in the attribute certificate (AC) so as to verify the public key certificate issued by the root certification authority (CA). There may be some cases where this linkage verification must be performed.

(3) After determining that the content usage conditions recorded in the attribute certificate indicate an off-line usage-number restricted content, the security chip controller obtains data, such as the application ID corresponding to the content identifier, the serial number of the attribute certificate (AC), and the restricted number of content usages, from the attribute certificate. The security chip controller also obtains data, such as the user ID and the service provider ID input by the user when purchasing the content, via the user device controller, and checks whether the content-usage-number control data associated with each item of the data, such as the application ID, the attribute certificate (AC) serial number, and the user ID, has been registered in the service provider management area of the memory in the security chip. If the user logs in to the user device, the user ID, etc. are retained, and thus, the user ID and the service provider ID may be sent by the user device rather than the user.

Figure 38:
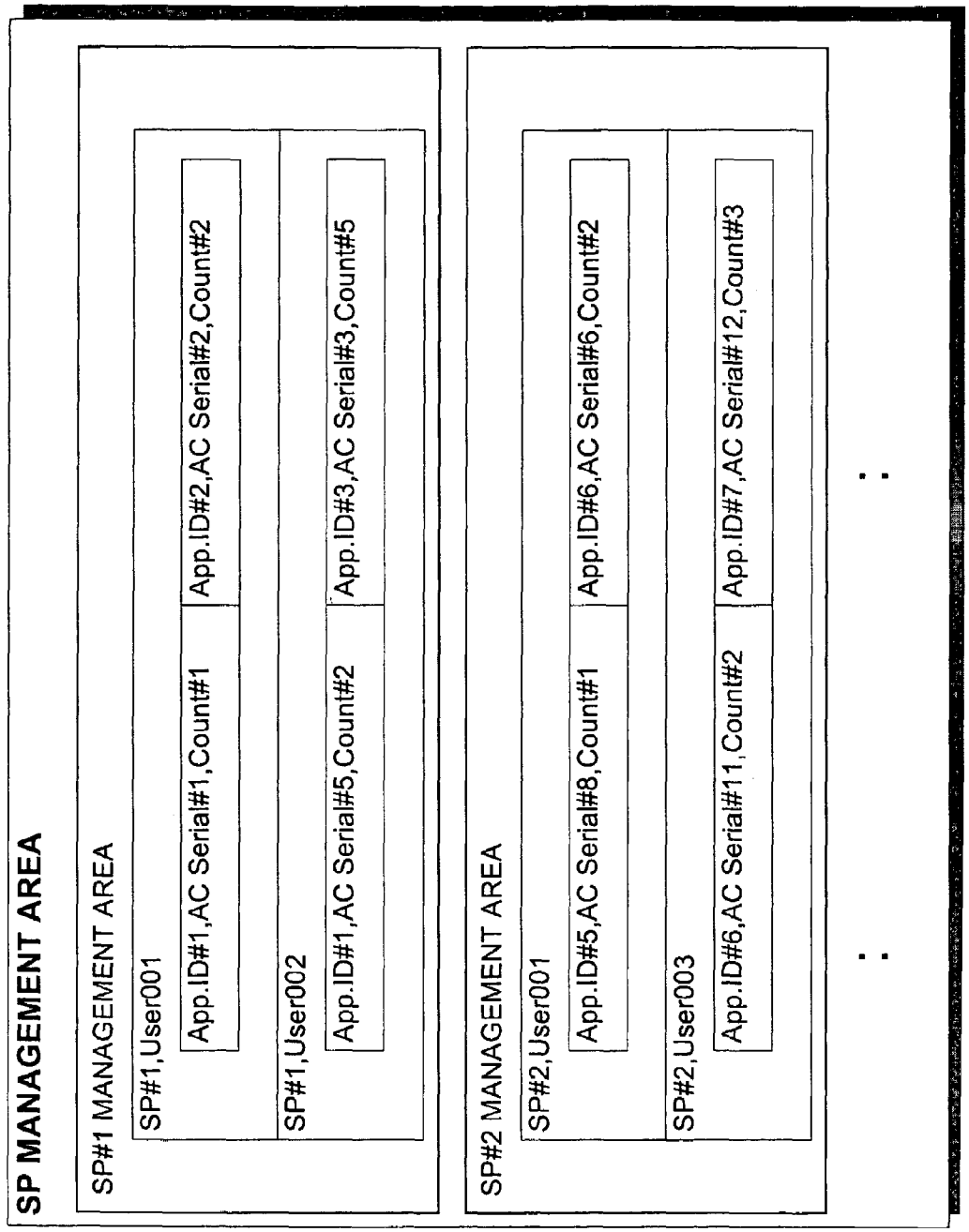
FIG. 38 illustrates an example of the configuration of usage-number control data corresponding to off-line number-restricted content.

As stated above, in the memory of the security chip, a service provider management area is set for each registered service provider. In this management area, the content-usage-number control data is registered. FIG. 38 illustrates an example of the configuration of the content-usage-number control data set in the service provider management areas of the memory in the security chip.

As shown in FIG. 38, in the service provider management area, the application ID (App. ID#n) as the content identifier, the AC serial (AC Serial#n), which is the identifier of the corresponding attribute certificate (AC), and the remaining usage number data (Count#n) are stored for each service provider ID and for each user ID such that the above-mentioned data items are related to each other. With this configuration, even for the same content, the usage number can be independently counted according to the users based on the different attribute certificates.

Referring back to FIG. 37, the sequence for import processing for the usage-number control data is discussed. (3) The security chip controller checks whether the content-usage-number control data associated with each item of the data obtained from the attribute certificate, such as application ID corresponding to the content identifier, the attribute-certificate (AC) serial number, and the restricted number of content usages, and each of the user ID and the service provider ID input by the user, has been registered in the service provider management area of the memory in the security chip. If there are content-usage-number control data which have not been registered, (4) the security chip controller registers such content-usage-number control data in the corresponding service provider management areas, and (5) after the registration, it generates a message indicating that the attribute certificate has been received, and sends the message to the service provider.

In the example shown in FIG. 37, the attribute certificate (AC) received from the service provider includes:

application ID: 0001;

attribute certificate (AC) serial: 1345; and restricted number of content usages: 5.

The user input data includes:

user ID: 6737; and service provider ID: 5678.

The security chip controller checks whether the content-usage-number control data associated with each item of such data has been registered in the corresponding service provider management area of the memory. In the SP management area data (before updating) shown in FIG. 37, the content-usage-number control data associated with the service provider ID: 5678 and the user ID: 6737 does not include data for the application ID: 0001 and the attribute certificate (AC) serial: 1345.

Accordingly, the content-usage-number control data corresponding to the attribute certificate received from the service provider is additionally registered as the content-usage-number control data for the service provider ID: 5678 and the user ID: 6737. As a result, in the lower section of the SP management area data (after updating) in FIG. 37, the number control data for the application ID: 0001 and the attribute certificate (AC) serial: 1345 is registered, and the restricted number of content usages: 5 recorded in the received attribute certificate is set.

When utilizing the content, this content-usage-number control data is checked, and every time the content is utilized, the data is updated by decrementing the usage number as 5→4→3→2→1→0. When the restricted number of usages reaches 0, the use of the content is refused. Accordingly, it is possible to utilize the content within the restricted number of usages recorded in the attribute certificate. This content usage processing is described below.

If the data for the same application ID and the same attribute certificate (AC) serial as those in the attribute certificate received from the service provider is already present in the service provider management area of the corresponding service provider ID and user ID as the content-usage-number control data, it is determined that a duplicate attribute certificate has been issued, and the content-usage-number control data of such an attribute certificate is not registered.

If data for the same application ID and a different attribute certificate (AC) serial when compared to those in the attribute certificate received from the service provider has already been registered in the service provider management area of the corresponding service provider ID and user ID as the content-usage-number control data, it is determined that the attribute certificate received from the service provider enables the use of the same content under new conditions, and the content-usage-number control data based on such an attribute certificate is additionally registered.

More specifically, even if, for example, the following data is present as the content-usage-number control data in the service provider management area for the same service provider ID and the user ID:
- application ID: 0001;
- AC serial: 0001; and
- remaining number of content usages: 2, new control data having the following data:
- application ID: 0001;
- AC serial: 0002; and
- remaining number of content usages: 5 is additionally registered.

Figure 39:
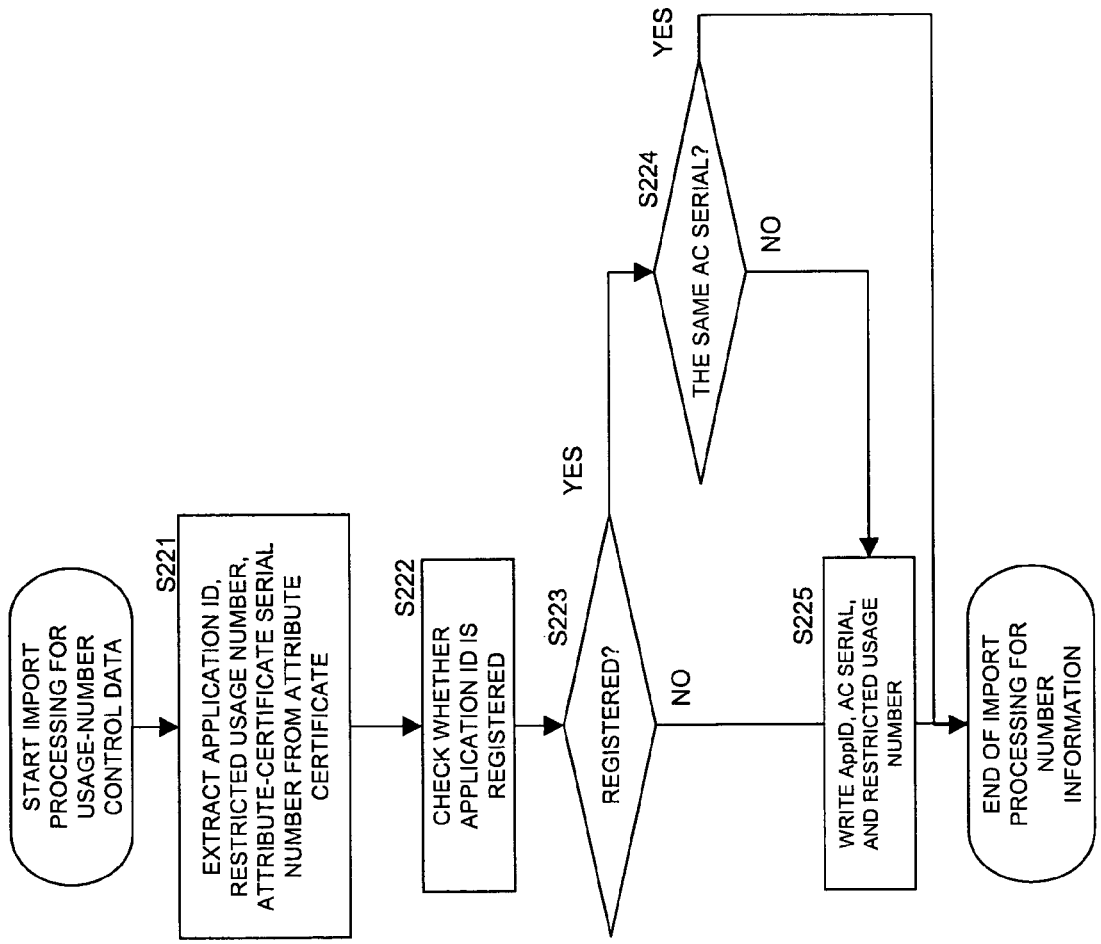
FIG. 39 is a flowchart illustrating import processing for usage-number control data corresponding to off-line number-restricted content.

FIG. 39 is a flowchart illustrating the import processing for the usage-number control data performed by the security chip when the content usage number is controlled in the security chip of the user device. The individual steps are as follows.

In step S221, the application ID, the restricted usage number, and the attribute-certificate serial number are extracted from the (verified) attribute certificate. In step S222, it is checked whether number control data for the same application ID as that stored in the attribute certificate has been registered in the service provider management area set in the memory of the security chip.

If it is determined in step S223 that there is no registration of number control data for the same application ID as that in the attribute certificate, the process proceeds to step S225. In step S225, the application ID: nnnn, the attribute certificate (AC) serial: mmmm, and the restricted number of content usages: x recorded in the received attribute certificate as the usage number are set according to the attribute certificate, thereby conducting registration of the usage-number control data.

If it is determined in step S223 that the number control data for the same application ID as that in the attribute certificate has been registered, the process proceeds to step S224. In step S224, it is determined whether number control data for the same attribute certificate (AC) serial as that obtained from the attribute certificate has been registered in the service provider management area in the memory. If such data has been registered, it is determined that a duplicate attribute certificate has been issued, and thus, the process is completed without conducting data registration. In contrast, if it is determined that there is no registration of number control data for the same attribute certificate (AC) serial as that obtained from the attribute certificate in the service provider management area, the process proceeds to step S225. In step S225, the application ID: nnnn, the attribute certificate (AC) serial: mmmm, and the restricted number of content usages: x recorded in the received attribute certificate as the usage control data are set according to the attribute certificate, thereby conducting registration of the usage-number control data.

Figure 40:
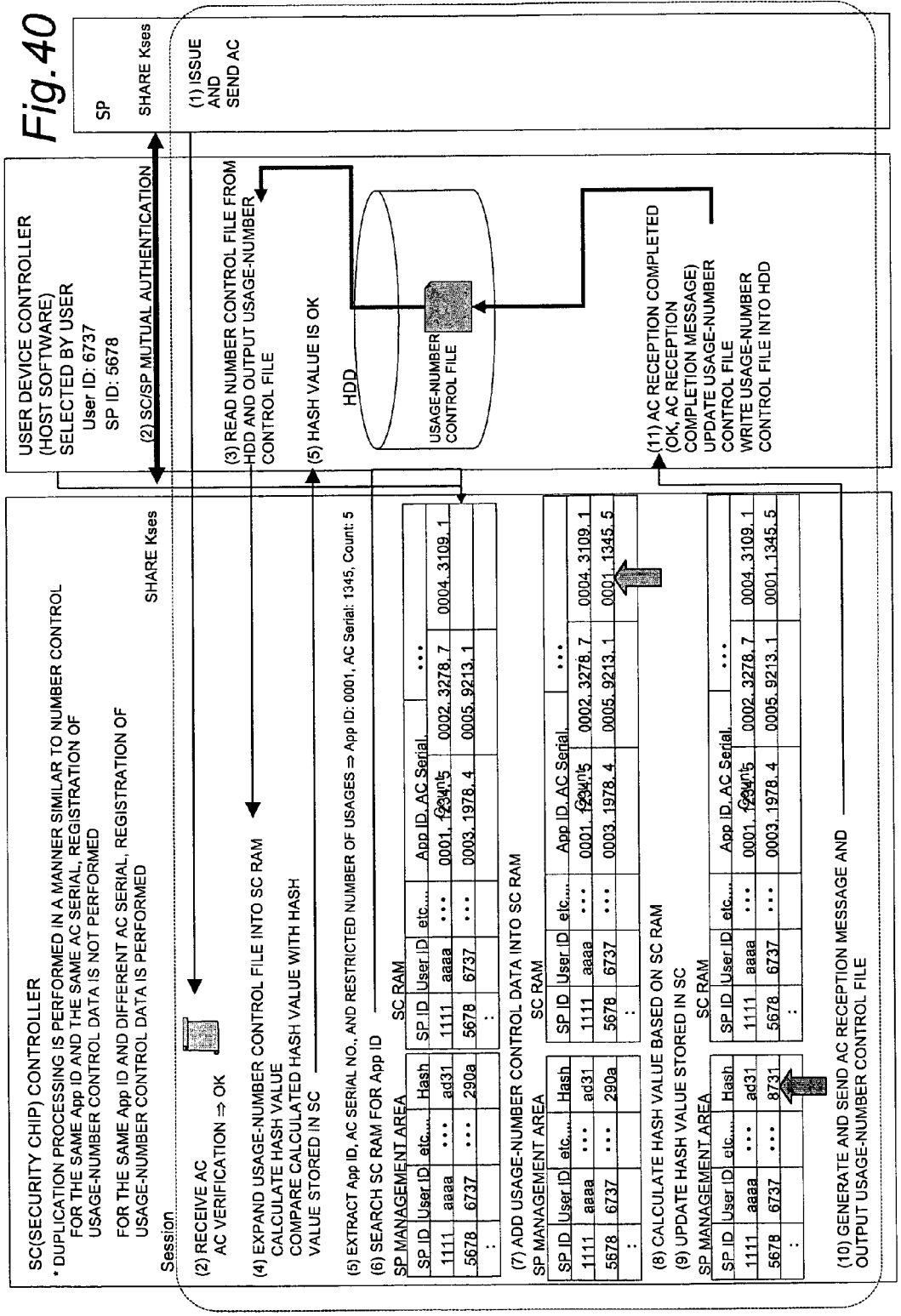
FIG. 40 illustrates import processing for usage-number control data corresponding to off-line number-restricted content by using a hash value.

A description is now given, with reference to FIG. 40, of an import processing sequence for the usage-number control data when a number control file is stored in an external memory (for example, a hard disk) outside the security chip, and only the hash value of the control data is stored in the memory of the security chip. FIG. 40 illustrates, from the left, the processing of the security chip controller of the user device, the user device controller (host software), and the service provider. The sequence of FIG. 40 illustrates the processing for issuing an attribute certificate corresponding to the purchased content from the service provider to the security chip, and the subsequent processing, after mutual authentication for the content purchase processing has been successfully conducted between the security chip and the service provider. In the attribute certificate issued by the service provider, the content usage conditions indicate an off-line usage-number restricted content, and the restricted number of content usages is recorded.

In this processing mode, the memory area having a limited capacity in the security chip is effectively utilized. An actual data file of the number control data is stored and controlled in an external memory (for example, a hard disk) outside the security chip, and the hash value of the information of this external management file is controlled in the security chip, thereby making it possible to verify whether the external management file information is tampered with. The hash function is a function for inputting a message, compressing the message into a predetermined length of data, and outputting it as a hash value. In the hash function, it is difficult to predict the input from the hash value (output), and when one bit of the data input into the hash function changes, many bits of the hash value change. It is also difficult to find different input data having the same hash value. As the hash function, MD4, MD5, SHA-1 may be used. Alternatively, DES-CBC may be used, in which case, MAC (check value: corresponding to ICV), which is the final output value, is the hash value.

The sequence of FIG. 40 is discussed below. (1) When an attribute certificate is issued and sent from the service provider, (2) the security chip controller verifies the attribute certificate. The verification processing includes the checking of right information (content usage conditions), format checking, and signature verification. The signature verification processing is executed according to a sequence similar to, for example, the above-described processing of FIG. 20. In this verification processing, the security chip controller preferably performs linkage verification by tracing the path from a lower CA to a higher CA from the public key certificate linked to the attribute certificate according to the public key certificate information of the AC possessor in the attribute certificate (AC) so as to verify the public key certificate issued by the root certification authority (CA). There may be some cases where this linkage verification must be performed.

Upon determining that the content usage conditions recorded in the attribute certificate indicate an off-line usage-number restricted content, the security chip controller reads the number control file from the external memory. In FIG. 40, the number control file is stored in an HDD managed by the user device controller. (3) The user device controller reads the number control file and outputs it to the security chip. In this case, all the data of the control file may be read, or only the data relating to the service provider of the corresponding content may be read.

Then, (4) the security chip controller expands the number control file received from the user device controller into the RAM of the security chip, and calculates hash values based on the expanded data. The number control data is formed of fields in which a plurality of items of number control data associated with the service provider IDs and the user IDs are stored. In the service provider management areas in the memory of the security chip, hash values are generated and stored for the field data associated with the service provider IDs and the user IDs.

The security chip controller extracts the field data associated with the service provider ID and the user ID designated by the user from the control data file received from the user device controller and expanded into the RAM, and calculates a hash value. The security chip controller then compares the calculated hash value with the hash value stored in the service provider management area of the memory in the security chip. If the calculated hash value coincides with the stored hash value, it is determined that the data is not tampered with, and the subsequent processing is started.

In the example shown in FIG. 40, the hash value is calculated based on the field data for the service provider ID: 5678 and the user ID: 6737 in the data expanded into the RAM, and is compared with the hash value: 290$a$ for the service provider ID: 5678 and the user ID: 6737 in the corresponding field stored in the service provider (SP) management area in the security chip.

(5) If the two hash values coincide with each other, the security chip controller sends a message indicating that the two hash values are equal to each other to the user device controller. If the two values do not coincide with each other, the security chip controller sends an error message to the user device controller. (6) Then, the security chip controller obtains data, such as the application ID corresponding to the content identifier, the attribute certificate (AC) serial number, and the restricted number of content usages, from the attribute certificate. The security chip controller also obtains data, such as the user ID and the service provider ID, input by the user when the content has been purchased via the user device controller. The security chip controller then determines whether the content-usage-number control data associated with each item of the data, such as the application ID, the attribute certificate (AD) serial number, and the user ID, has been registered in the number control file received from the user device controller and expanded into the RAM.

If it is determined that the content-usage-number control data has not been registered, (7) the security chip controller extracts the content-usage-number control data from the attribute certificate (AC) and additionally registers it into the number control file expanded into the RAM, (8) calculates a new hash value based on the additional data, and (9) stores the calculated hash value in the corresponding field of the service provider (SP) management area of the security chip. (10) After completing the additional registration, the security chip controller sends an attribute-certificate reception message to the user device together with the updated number control file, and (11) the user device stores the received number control file in the hard disk.

In the example of FIG. 40, the attribute certificate (AC) received from the service provider includes the following data:

application ID: 0001;
attribute certificate (AC) serial: 1345; and
restricted number of content usages: 5, and the user input data includes:
user ID: 6737; and
service provider ID: 5678.

The security chip controller verifies whether the content-usage-number control data corresponding to the above-described data items has been registered in the number control file expanded into the RAM. In the uppermost section of the SC RAM data shown in FIG. 40, the content-usage-number control data associated with the service provider ID: 5678 and the user ID: 6737 does not contain data corresponding to the application ID: 0001 and the attribute certificate (AC) serial: 1345.

Accordingly, the content-usage-number control data in the attribute certificate received from the service provider is additionally registered as the content-usage-number control data corresponding to the service provider ID 5678 and the user ID: 6737. As a result, in the middle section of the SC RAM data shown in FIG. 40, the number control data for the application ID: 0001 and the attribute certificate (AC) serial: 1345 is added, and the restricted number of content usages: 5 recorded in the received attribute certificate is set as the possible usage number.

A hash value is calculated based on the field data associated with the service provider ID: 5678 and the user ID: 6737. In the example of FIG. 40, the hash value before updating the data is 290$a$, and the hash value after updating the data is 8731. Accordingly, the hash value in the lowermost section of the SP management area in FIG. 40 is updated to 8731.

When utilizing the content, this content-usage-number control data is checked. Every time the content is utilized, the data is updated by decrementing the usage number as 5→4→3→2→1→0, and also, a new hash value is calculated based on the updated data. The content utilizing processing is described below.

If data for the same application ID and the same attribute certificate (AC) serial as those in the attribute certificate received from the service provider is already present in the field of the corresponding service provider ID and user ID of the number control file received from the user device and expanded into the RAM as the content-usage-number control data, it is determined that a duplicate attribute certificate has been issued, and the content-usage-number control data of such an attribute certificate is not registered.

If data for the same application ID and a different attribute certificate (AC) serial when compared to those in the attribute certificate received from the service provider has already been registered in the field of the corresponding service provider ID and user ID of the number control file received from the user device and expanded into the RAM as the content-usage-number control data, it is determined that the attribute certificate received from the service provider is a certificate that enables the use of the same content under new conditions, and the content-usage-number control data based on such an attribute certificate is additionally registered, and the hash value is updated.

Figure 41:
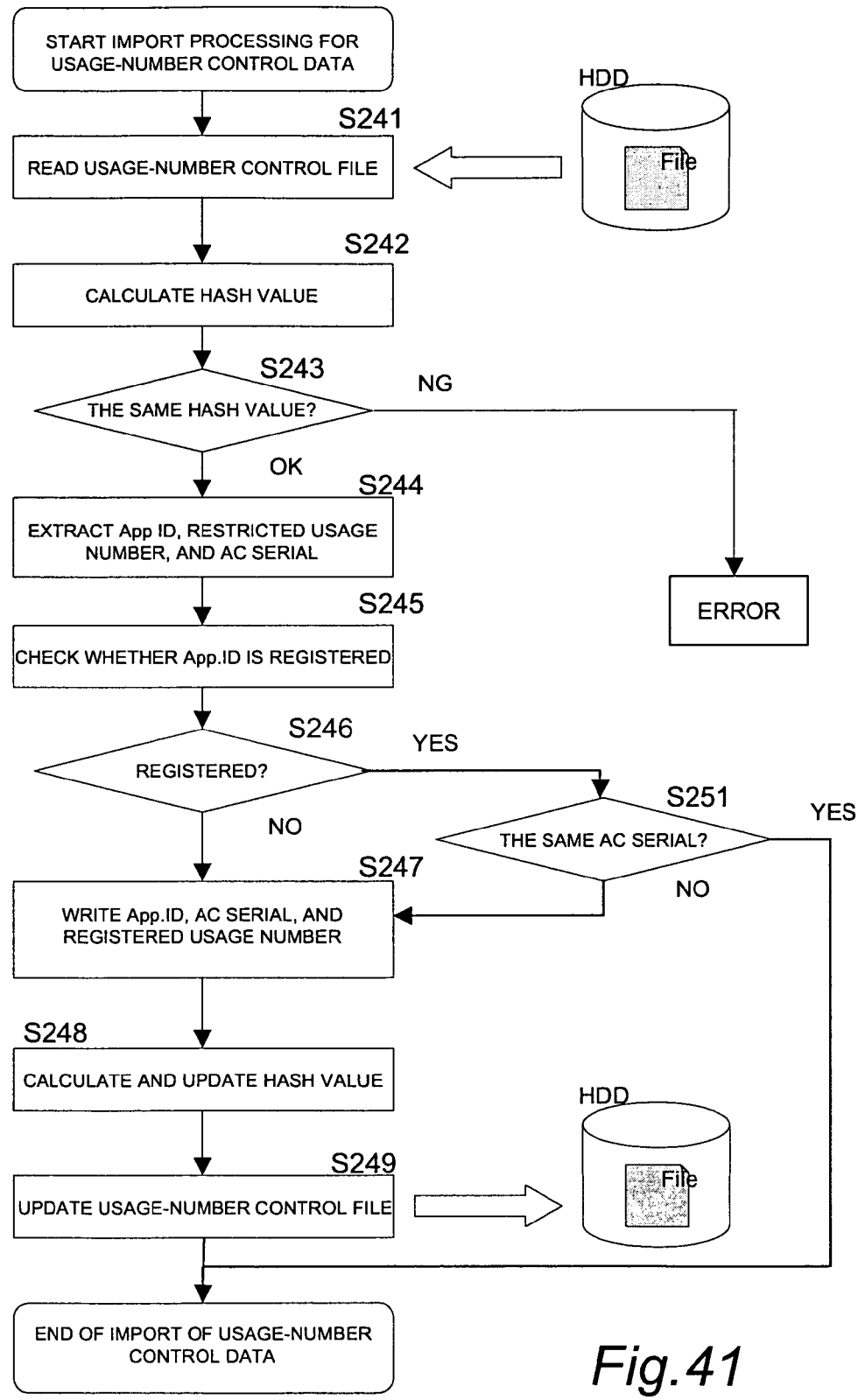
FIG. 41 is a flowchart illustrating import processing for usage-number control data corresponding to off-line number-restricted content by using a hash value.

FIG. 41 is a flowchart illustrating import processing for the usage-number control data when a number control file is stored in an external memory (for example, a hard disk) outside the security chip, and when only the hash value of the control data is stored in the memory of the security chip. The individual steps are as follows.

In step S241, a number control file is read from an external memory. In step S242, a hash value is calculated based on the field data specified from the service provider ID and the user ID, and the calculated hash value is compared with the hash value stored in the service provider management area in the memory of the security chip (S243). If the two hash values do not coincide with each other, it is determined that the number control data read from the external memory is tampered with, and error handling is performed, for example, the subsequent process is terminated.

If it is determined that the two hash values are equal to each other, it proves that the number control data read from the external memory is not tampered with. Then, the process proceeds to step S244 in which the application ID, the restricted usage number, and the attribute-certificate serial number are extracted from the (verified) attribute certificate. It is then checked in step S245 whether number control data for the same application ID as that stored in the attribute certificate is stored in the number control file received from the user device controller and expanded into the RAM.

If it is determined in step S246 that there is no registration of number control data having the same application ID, the process proceeds to step S247. In step S247, the application ID: nnnn, the attribute certificate (AC) serial: mmmm, and the restricted number of content usages: x recorded in the received attribute certificate as the possible usage number are set according to the attribute certificate, thereby conducting registration of the usage-number control data.

If it is determined in step S246 that the number control data for the same application ID has been registered, the process proceeds to step S251. In step S251, it is determined whether number control data for the same attribute certificate (AC) serial as that obtained from the attribute certificate has been registered in the number control file expanded into the RAM. If such number control data has been registered, it is determined that a duplicate attribute certificate has been issued, and the process is completed without registering the data. In contrast, if it is determined that number control data for the same attribute certificate (AC) serial as that obtained from the attribute certificate has not been registered in the number control file expanded into the RAM, the process proceeds to step S247. In step S247, the application ID: nnnn, the attribute certificate (AC) serial: mmmm, and the restricted number of content usages: x recorded in the received attribute certificate as the possible usage number are set according to the attribute certificate, thereby conducting registration of the usage-number control data.

Upon writing the new number control data into the number control file expanded into the RAM according to the attribute certificate in step S247, a new hash value is calculated based on the data including the new data, and the new hash value is stored in the corresponding field of the corresponding service provider (SP) management area in the security chip in step S248. In step S249, the number control file stored in the external memory (for example, a hard disk) is updated based on the updated number control file.

A process from the acquirement of an attribute certificate to the acquirement of the content when the content usage conditions recorded in the attribute certificate is an off-line usage-number restricted content is described below with reference to the sequence diagram of FIG. 42.

Figure 42:
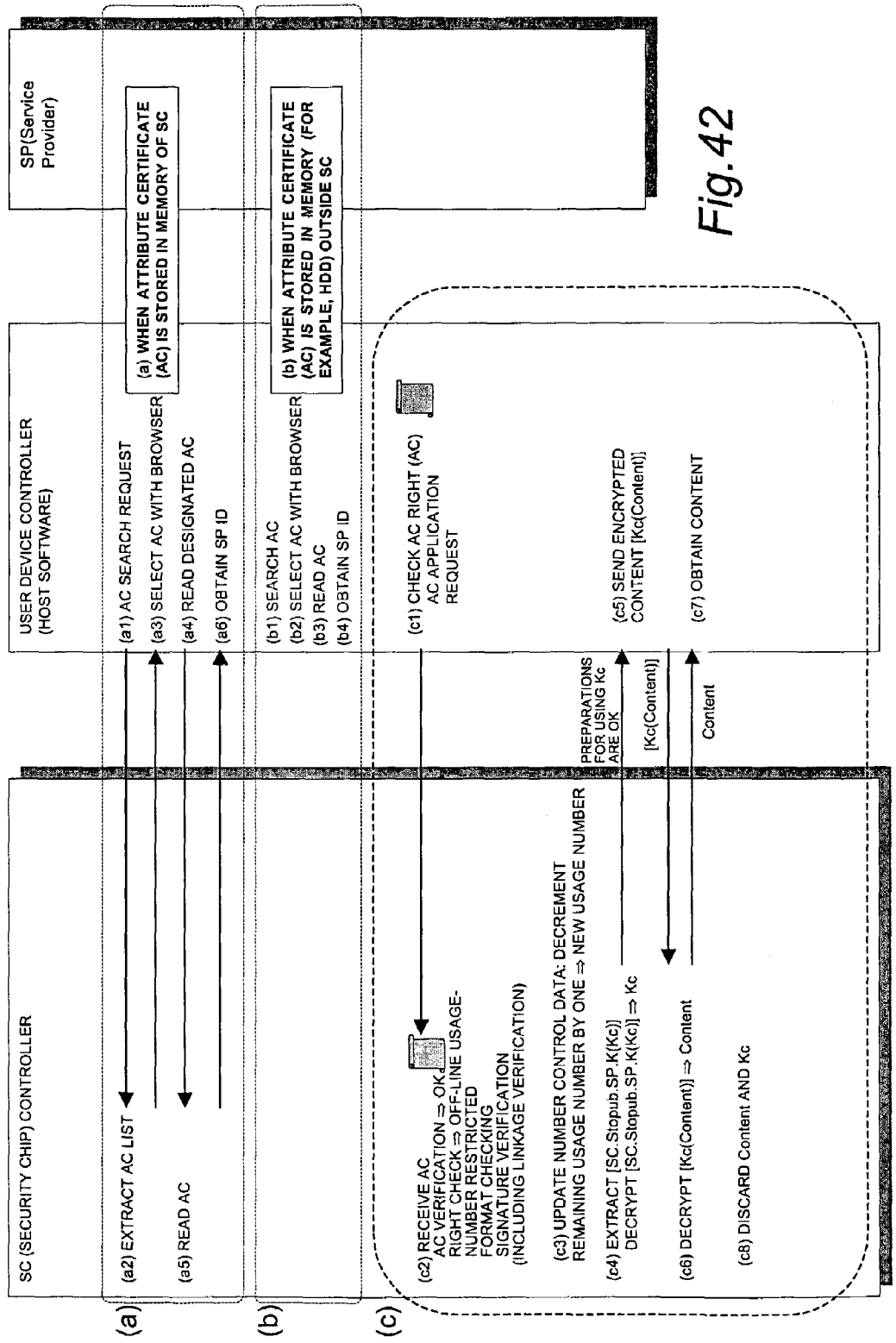
FIG. 42 illustrates content usage processing using an attribute certificate for off-line number-restricted content.

As in the above-described processing sequences shown in FIGS. 34, 35, and 36, the sequence of FIG. 42 illustrates the processing performed by the user device which has already received from the service provider the encrypted content and the attribute certificate in which the content usage conditions and the encrypted content key are stored. FIG. 42 illustrates, from the left, the processing of the security chip controller of the user device, the user device controller (host software), and the service provider.

In FIG. 42, the uppermost section (a) indicates processing for obtaining a service provider ID from an attribute certificate when the attribute certificate is stored in the internal memory of the security chip, and (b) indicates processing for obtaining a service provider ID from an attribute certificate when the attribute certificate is stored in an external memory outside the security chip, i.e., in a memory that can be accessed by mere control of the user device controller. Processing (a) or (b) is selectively executed according to the storage location of the attribute certificate. Processing (a) and (b) are similar to those for the on-line period-restricted content discussed with reference to FIG. 34, and an explanation thereof is thus omitted. After obtaining the service provider ID by either processing (a) or (b), processing indicated by (c) of FIG. 42, i.e., content obtaining processing, is performed.

(c1) The user checks the right information (content usage conditions) of the attribute certificate displayed by the attached browser of the user device, and outputs a request to utilize the content with the application of the attribute certificate to the security chip. The content usage conditions recorded in the attribute certificate in this example indicate off-line usage-number restrictions.

(c2) Upon receiving the attribute-certificate (AC) application request from the user device controller, the security chip controller verifies the attribute certificate. This verification processing includes the checking of the right information (content usage conditions), format checking, and signature verification. The signature verification is conducted by a sequence similar to, for example, the above-described processing flow of FIG. 20. In this verification processing, the security chip controller preferably performs linkage verification by tracing the path from a lower CA to a higher CA from the public key certificate linked to the attribute certificate according to the public key certificate information of the AC possessor in the attribute certificate (AC) so as to verify the public key certificate issued by the root certification authority (CA). There may be some cases where this linkage verification must be performed.

(c3) After verifying the attribute certificate, if it is determined that the attribute certificate is not tampered with, the security chip controller updates the number control data. Details of the updating of the number control data are given below. (c4) The security chip controller also extracts the encrypted content key data: [SP.Stopub.K(Kc)] stored in the attribute certificate, and decrypts it with the SP storage private key: SC.Stopri.SP.K stored in the service provider management area so as to obtain the content key: Kc. After successfully obtaining the content key: Kc, the security chip controller reports to the user device controller that preparations for decrypting the content are completed.

(c5) The user device controller then obtains the encrypted content [Kc(Content)] to be decrypted with the obtained content key from the memory (for example, a hard disk) of the user device or from the memory of the security chip via the security chip controller. The user device controller then sends the encrypted content to the security chip. (c6) The security chip decrypts the encrypted content with the content key: Kc and outputs the content to the user device controller as a decryption result. (c7) The user device controller then obtains the content. After completing this processing, (c8) the security chip controller discards the content key: Kc and the content obtained by the decryption processing.

According to the above-described processing, after checking whether the content is to be utilized within the restricted usage number based on the attribute certificate (AC), the security chip decrypts the content key: Kc to obtain the content key, and decrypts the content with the obtained content key, thereby enabling the use of the content in the user device.

In the above-described example, a public key cryptosystem is employed in which the SP storage public key: SC.Stopub.SP.K is used to encrypt the content key, and the SP storage private key: SC.Stopri.SP.K is used to decrypt the content key. However, a common key system may be employed, in which case, the SP storage key (common key): SC.Sto.SP.K is used both for encrypting and decrypting the content key. In this case, the SP storage key (common key): SC.Sto.SP.K is stored in the service provider management area of the corresponding service provider in the memory of the security chip.

There are two modes in which the content or the attribute certificate (AC) is distributed from the service provider to the user device: one mode in which the distribution is made in response to a request from a user to the service provider; and the other mode is a so-called push mode (push model) in which the distribution is unconditionally made from the service provider to any user who has made, for example, a subscriber contract, regardless of whether there is a request from the user. Either mode can be utilized. In the push model, the service provider generates the attribute certificates (AC) for the target users in advance, and distributes them.

Figure 43:
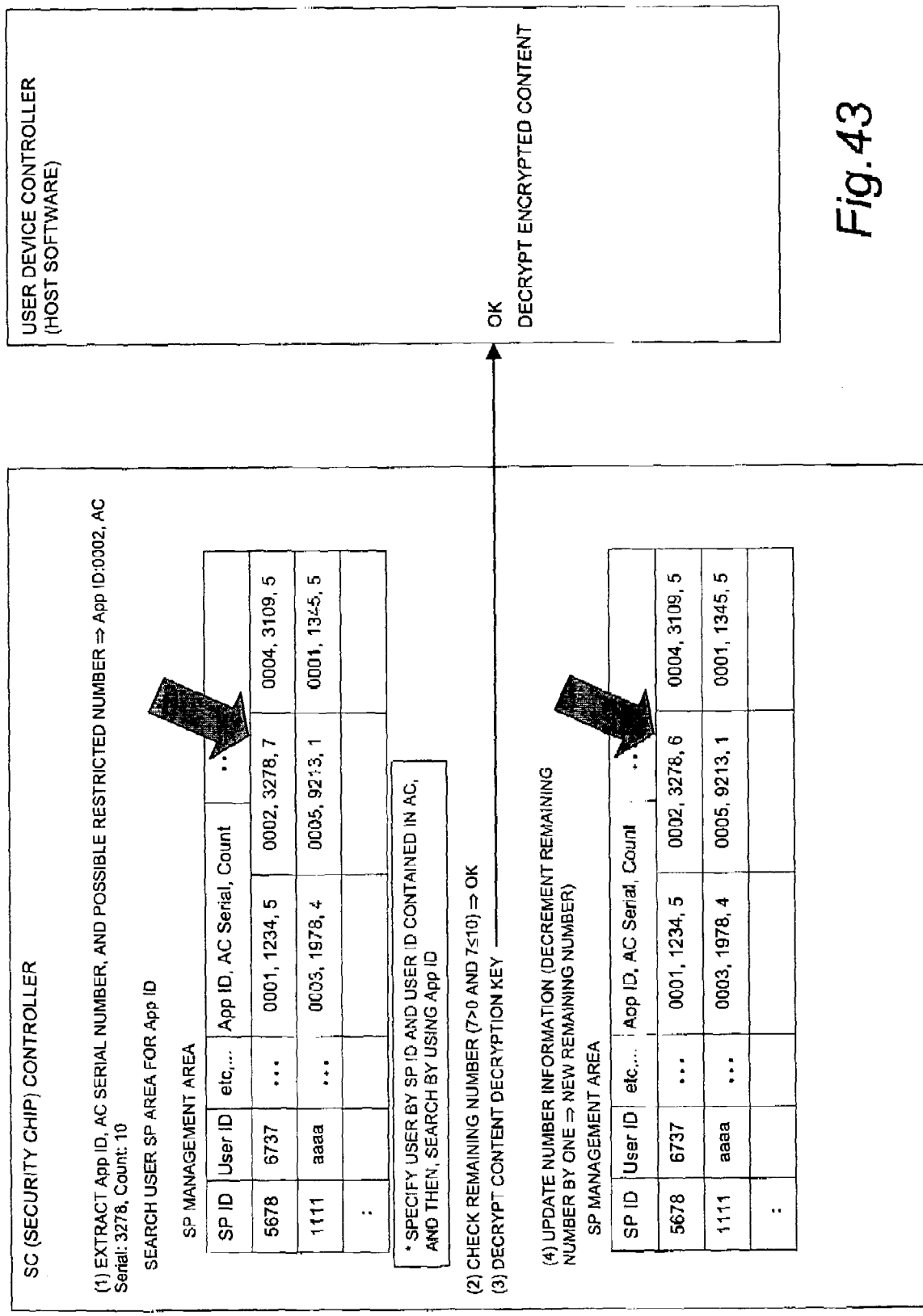
FIG. 43 illustrates updating processing of number control data corresponding to off-line number-restricted content.
Figure 44:
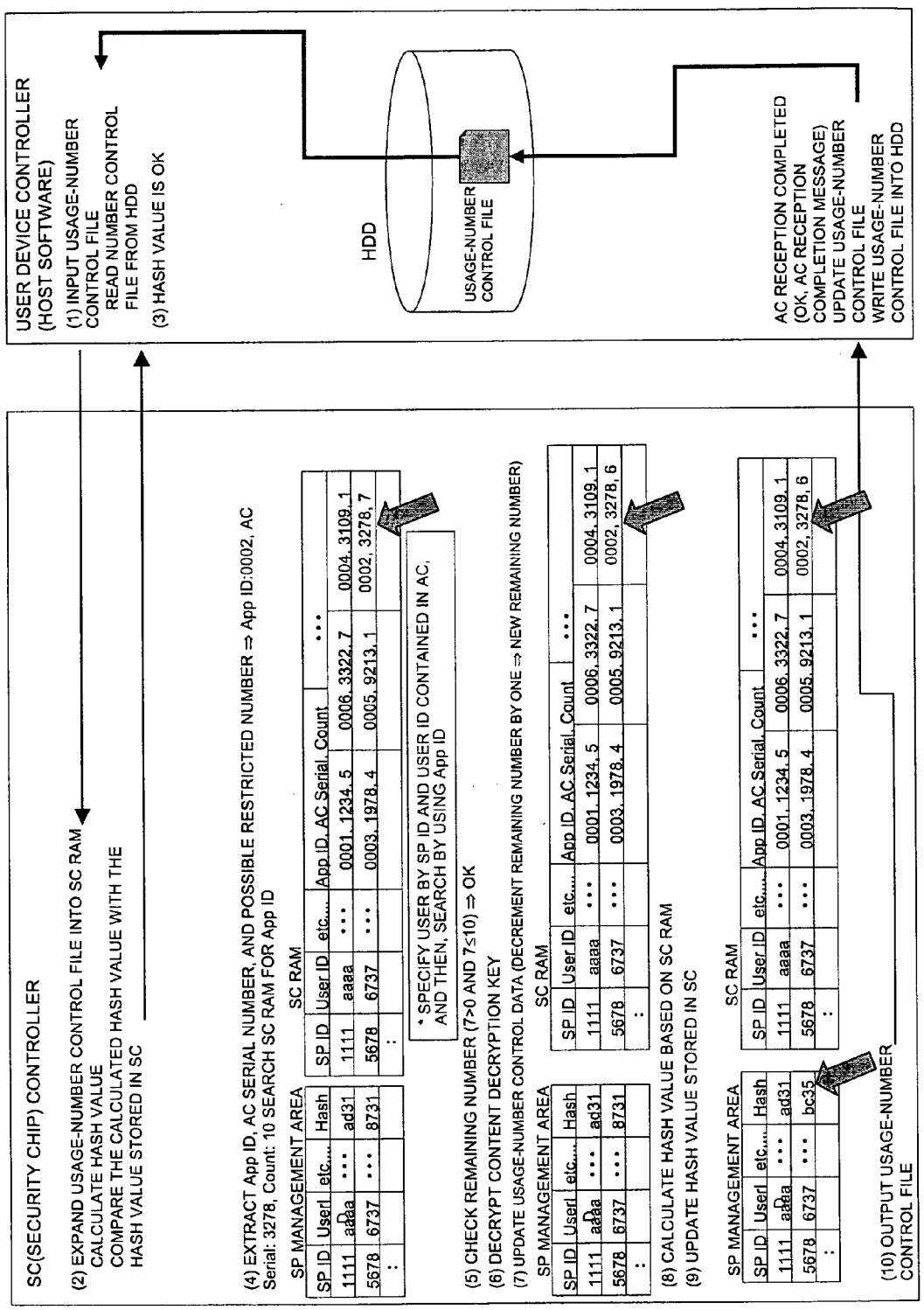
FIG. 44 illustrates updating processing for usage-number control data corresponding to off-line number-restricted content by using a hash value.

The updating processing for the usage-number control data is discussed below with reference to FIGS. 43 and 44. As discussed above, there are two modes for controlling the content usage number: one mode in which the content usage number is controlled in the security chip of the user device; and the other mode in which a number control file is stored and controlled in an external memory (for example, a hard disk) outside the security chip, and only the hash value of the control data is stored in the memory of the security chip. FIG. 43 illustrates an updating sequence in the first mode, and FIG. 44 illustrates an updating sequence in the second mode.

A description is first given, with reference to FIG. 43, the updating sequence for the number control data when the content usage number is controlled in the security chip of the user device. FIG. 43 illustrates the processing of the security chip controller of the user device, and the user device controller (host software). The sequence of FIG. 43 illustrates the processing after the attribute certificate has been verified in the security chip.

(1) Upon determining that the content usage conditions recorded in the verified attribute certificate indicate an off-line usage-number restricted content, the security chip controller obtains data, such as the application ID corresponding to the content identifier, the attribute certificate (AC) serial number, and the restricted number of content usages from the attribute certificate. The security chip controller also obtains data, such as the user ID and the service provider ID, input by the user when the content has been purchased, via the user device controller, and determines whether the content-usage-number control data associated with each item of the data, such as the application ID, the attribute certificate (AC) serial number, and the user ID, has been registered in the service provider management area in the memory of the security chip.

As discussed above, in the memory of the security chip, a service provider management area is set for each registered service provider, and content-usage-number control data is registered in this management area.

In the example of FIG. 43, the attribute certificate (AC) includes the following data:
application ID: 0002;
attribute certificate (AC) serial: 3278; and
restricted number of content usages: 10.
The user input data includes:
user ID: 6737; and
service provider ID: 5678.

The security chip controller determines whether the content-usage-number control data associated with the above-described data items has been registered in the corresponding service provider management area of the memory. In the SP management area data (before updating) shown in FIG. 43, the content-usage-number control data corresponding to the service provider ID: 5678 and the user ID: 6737 includes data associated with the application ID: 0002 and the attribute certificate (AC) serial: 3278, in which the possible usage number (remaining number) is set to 7.

(2) The security chip controller checks from this extracted data that the possible usage number (remaining number) is 7>0, and is also less than or equal to the restricted number $10 \geqq 7$ recorded in the attribute certificate, and after checking these conditions, the security chip controller allows the use of the content, i.e., (3) decrypts the encrypted content key stored in the attribute certificate.

(4) The security chip controller also updates the data in the corresponding service provider management area of the memory by decrementing the possible usage number by one. In this case, the security chip controller updates the possible usage number (remaining number): 7 in the data for the application ID: 0002 and the attribute certificate (AC) serial: 3278 by 6. It should be noted that (4) the updating of the number control data may be performed before (3) the decryption of the encrypted content key, or (3) and (4) may be simultaneously performed.

A description is now given, with reference to FIG. 44, of an updating sequence for the number control data when a number control file is stored in an external memory (for example, a hard disk) outside the security chip, and only the hash value of the control data is stored in the memory of the security chip. FIG. 44 illustrates the processing of the security chip controller of the user device and the user device controller (host software). The sequence of FIG. 44 illustrates the processing after the attribute certificate has been verified in the security chip.

Upon determining that the content usage conditions recorded in the attribute certificate indicate an off-line usage-number restricted content, the security chip controller reads a number control file from an external memory. In FIG. 44, the number control file is stored in an HDD managed by the user device controller. (1) The user device controller reads the number control file, and outputs it to the security chip. In this case, all the data of the control file may be read, or only the data relating to the service provider of the corresponding content may be read.

Then, (2) the security chip controller expands the number control file received from the user device controller into the RAM of the security chip, and calculates hash values based on the expanded data. The number control data is formed of fields in which a plurality of items of number control data associated with the service provider IDs and the user IDs are stored. In the service provider management areas in the memory of the security chip, hash values are generated and stored for the field data associated with the service provider IDs and the user IDs.

The security chip controller extracts field data associated with the service provider ID and the user ID designated by the user from the control data file received from the user device and expanded into the RAM, and calculates a hash value. The security chip controller then compares the calculated hash value with the hash value stored in the service provider management area of the memory in the security chip. If the calculated hash value coincides with the stored hash value, it is determined that the data is not tampered with, and the subsequent processing is started.

In the example shown in FIG. 44, the hash value is calculated based on the field data for the service provider ID: 5678 and the user ID: 6737 in the data expanded into the RAM, and is compared with the hash value: 8731 for the service provider ID: 5678 and the user ID: 6737 in the corresponding field of the service provider (SP) management area in the security chip.

(3) If the two hash values coincide with each other, the security chip controller sends a message indicating that the two hash values are equal to each other to the user device controller. If the two values do not coincide with each other, the security chip controller sends an error message to the user device controller. (4) Then, the security chip controller obtains data, such as the application ID corresponding to the content identifier, the attribute certificate (AC) serial number, and the restricted number of content usages, from the attribute certificate. The security chip controller also obtains data, such as the user ID and the service provider ID, input by the user when the content has been purchased via the user device controller. The security chip controller then determines whether the content-usage-number control data associated with each item of the data, such as the application ID, the attribute certificate (AD) serial number, and the user ID, has been registered in the number control file received from the user device and expanded into the RAM.

In the example of FIG. 44, the attribute certificate (AC) includes the following data:
- application ID: 0002;
- attribute certificate (AC) serial: 3278; and
- restricted number of content usages: 10, and the user input data includes:
- user ID: 6737; and
- service provider ID: 5678.

The security chip controller verifies whether the content-usage-number control data corresponding to the above-described data items has been registered in the number control file expanded into the RAM. In the uppermost section of the SC RAM data shown in FIG. 44, the content-usage-number control data associated with the service provider ID: 5678 and the user ID: 6737 contains data corresponding to the application ID: 0002 and the attribute certificate (AC) serial: 3278, in which the possible usage number (remaining number) is set to 7.

(5) The security chip controller checks from this extracted data that the possible usage number (remaining number) is 7>0, and is also less than or equal to the restricted number $10 \geqq 7$ recorded in the attribute certificate, and after checking these conditions, the security chip controller allows the use of the content, i.e., (6) decrypts the encrypted content key stored in the attribute certificate.

(7) The security chip controller also updates the data by decrementing the possible usage number of the corresponding data of the number control file expanded into the RAM by one. In this case, the security chip controller updates the possible usage number (remaining number): 7 in the data for the application ID: 0002 and the attribute certificate (AC) serial: 3278 by 6.

(8) The security chip controller then calculates a new hash value based on the updated data, and (9) stores it in the corresponding field of the service provider (SP) management area of the security chip. In the example of FIG. 44, the hash value based on the field data for the application ID: 0002 and the attribute certificate (AC) serial: 3278 before being updated is 8731, and the hash value based on the same field data after being updated is bc35. Accordingly, the hash value: bc35 in the SP management area in the lowermost section of FIG. 44 for the service provider ID: 5678 and the user ID: 6737 is stored as an updated hash value.

(10) Upon completing the updating processing, the security chip controller sends the updated number control file to the user device controller, and the user device controller stores the received number control file in the hard disk.

As described above, when utilizing the content, this content-usage-number control data is checked. Every time the content is utilized, the data is updated by decrementing the possible usage number as $5 \rightarrow 4 \rightarrow 3 \rightarrow 2 \rightarrow 1 \rightarrow 0$, and a new hash value is calculated based on the updated data. It is thus possible to utilize the content within the restricted usage number recorded in the attribute certificate.

A description has been given of the use of the content in accordance with the content usage conditions of the attribute certificate. In the above description, period restrictions and number restrictions are independently imposed. However, an attribute certificate may have both restrictions, such as period restrictions and number restrictions. In this case, it is determined whether the use of the content is permitted based on the two conditions, and after checking that the content is to be utilized within the period and the number set in the attribute certificate, the content key is decrypted.

[Upgrade Processing]

In the above description, various usage conditions, such as period restrictions, number restrictions, and full-purchase, are set as the content usage conditions, and, based on these usage conditions, the content is utilized in a user device provided with a security chip. A description is now given of changes in content usage restrictions, for example, changes in a restricted number of content usages or the extension of period restrictions set in an attribute certificate. That is, upgrade processing is described below.

More specifically, upgrade processing includes the following various modes.

(1) The restricted usage number indicated in an attribute certificate as the content usage conditions is increased. For example:
- 10 content usages have been purchased, and after using 5 usages, the usage number is increased to 10; and
- 10 content usages have been purchased, after using 10 usages, the usage number is increased to 10.

(2) The restricted usage period indicated in an attribute certificate as the content usage conditions is extended. For example:
- a usage period, which expires in one week, is extended by one month; and
- a usage period, which has expired, is extended by one month.

(3) The usage conditions, such as number restrictions or period restrictions, indicated in an attribute certificate are changed. For example:
- number restrictions are changed to period restrictions;
- period restrictions are changed to number restrictions;
- number restrictions are changed to full-purchase; and
- period restrictions are changed to full-purchase.

(4) Album upgrading

Content data formed into an album, such as a plurality (n) of items of content 1 through n stored in, for example, a CD or a DVD, or a series of items of content 1 through n, are provided. Some of the content items have been purchased, and a plurality of attribute certificates 1 through n for the purchased content items are retained in a user device of the user, for example, in the following manner:
- attribute certificate 1 for content 1;
- attribute certificate 3 for content 3; and
- attribute certificate 5 for content 5.

By providing these attribute certificates to the service provider, the user is able to purchase the other items of content, such as content 2, 4, 6 to n, at a reduced price so that the user can purchase the whole album.

Accordingly, there are various modes as described above for upgrade processing based on an attribute certificate. An overview of an upgrade processing sequence is described below. The service provider (SP) first provides an upgrade menu to the user device, and the user makes a selection from the upgrade menu. According to the designation by the user, the user device sends an upgrade request command to the security chip together with designation data of an attribute certificate to be upgraded. The security chip controller communicates with the service provider and sends the attribute certificate to be upgraded to the service provider. The service provider verifies the received attribute certificate, and then performs upgrade processing designated by the user, and issues and sends a new attribute certificate to the security chip. The user device is then able to utilize the content based on the usage conditions of the new attribute certificate.

A description is now given of upgrade processing when the content usage conditions indicated in an attribute certificate (AC), which is used as a reference for upgrading, are the following three modes:
 (A) on-line usage-period restricted content;
 (B) on-line usage-number restricted content; and
 (C) off-line usage-number restricted content.
 (A) Upgrade processing based on on-line usage-period restricted attribute certificate (AC)

Figure 45:
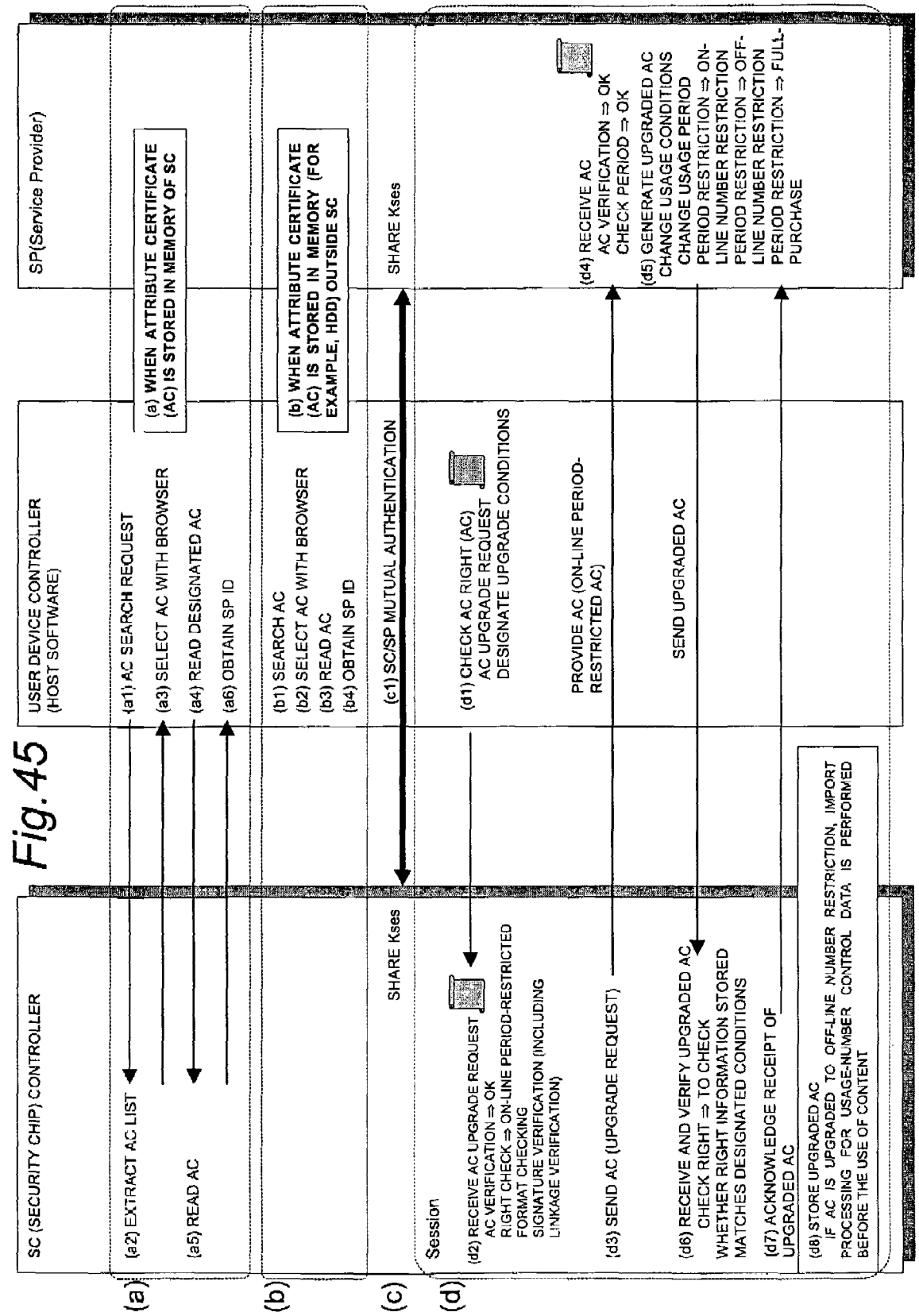
FIG. 45 illustrates upgrade processing using an on-line period-restricted attribute certificate.

A description is first given, with reference to the sequence diagram of FIG. 45, of upgrade processing when the content usage conditions indicated in an attribute certificate indicate on-line processing usage-period restrictions. FIG. 45 illustrates processing of the security chip controller of the user device, the user device controller (host software), and the service provider.

In FIG. 45, the uppermost section (a) indicates processing for obtaining a service provider ID from an attribute certificate when the attribute certificate is stored in the internal memory of the security chip, and (b) indicates processing for obtaining a service provider ID from an attribute certificate when the attribute certificate is stored in an external memory outside the security chip, i.e., in a memory that can be accessed by mere control of the user device controller. Processing (a) or (b) is selectively executed according to the storage location of the attribute certificate. Mutual authentication processing (c) and content obtaining processing (d) are conducted regardless of the storage location of the attribute certificate.

Processing (a) is discussed first. (a1) The user device controller requests the security chip controller to search for the attribute certificate to be upgraded. (a2) The security chip controller outputs a list of the attribute certificates stored in the memory of the chip to the user device controller, and (a3) the user device displays the list by using a browser attached to the user device. (a4) The user designates the attribute certificate (AC) to be upgraded from the displayed list, and sends a read command to the security chip controller. (a5) The security chip controller reads the designated attribute certificate from the internal memory, and outputs it to the user device controller. (a6) The user device displays the attribute certificate by using the attached browser, and obtains the service provider identifier (SP ID) in the attribute certificate storage data.

If the attribute certificate is stored in an external memory outside the security chip, i.e., in a memory that can be accessed by mere control of the user device controller, processing (b) is performed. (b1) The user device controller searches for the attribute certificate to be upgraded. (b2) The user device designates the attribute certificate (AC) to be upgraded from an AC list displayed by using the attached browser, and reads and displays the designated attribute certificate, (b4) thereby obtaining the service provider identifier (SP ID) in the attribute certificate storage data.

The service provider identifier (SP ID) obtained by either processing (a) or (b) is used for obtaining information required for mutual authentication from the service provider management area. As stated above, it is necessary to input a password set for each service provider for accessing the corresponding service provider management area, and the user inputs the password corresponding to the service provider identifier (SP ID) obtained from the attribute certificate so as to access the service provider management area. Then, mutual authentication between the security chip and the service provider indicated in (c1) of FIG. 45 is conducted.

This mutual authentication is performed by the above-described TLS1.0 processing shown in FIG. 16 or another processing using, for example, a pubic key method. In this mutual authentication, the pubic key certificates of both the security chip and the service provider are verified, and if necessary, the public key certificates up to the root certification authority (CA) are verified. In this authentication processing, the security chip and the service provider share the session key (Kses). After the mutual authentication has been successfully conducted, processing (d) shown in FIG. 45, i.e., processing for obtaining an upgraded attribute certificate, is performed.

(d1) The user checks right information (content usage conditions) in the attribute certificate displayed by the attached browser, and sends a request to upgrade the attribute certificate together with upgrade conditions to the security chip. The content usage conditions recorded in the attribute certificate to be upgraded in this example are on-line period restrictions, and the upgrade conditions designated by the user are, for example:
 changing of period restrictions (extension);
 period restrictions→on-line number restrictions;
 period restrictions→off-line number restrictions; or
 period restrictions→full-purchase.

(d2) Upon receiving a request to upgrade the attribute certificate (AC) from the user device controller, the security chip controller verifies the attribute certificate. This verification processing includes the checking of the right information (content usage conditions), format checking, and signature verification. The signature verification is conducted by a sequence similar to the above-described processing flow of FIG. 20.

If necessary, it is preferable that the security chip controller obtain the public key certificate linked to the attribute certificate (AC) according to the public key certificate information of the AC possessor in the attribute certificate (AC) so as to verify the public key certificate. For example, if the reliability of the attribute certificate (AC) issuer is uncertain, it can be determined whether the AC issuer has a public key certificate authorized by the certification authority by verifying the public key certificate of the attribute certificate (AC) issuer. If the public key certificate forms a hierarchical structure, as described above, linkage verification is preferably performed to trace the path from a lower CA to a higher CA so as to verify the public key certificate issued by the root certification authority (CA). There may be some cases where this linkage verification must be performed.

(d3) After verifying the attribute certificate, if it is determined that the attribute certificate is not tampered with, the security chip controller sends the attribute certificate to be upgraded to the service provider together with the upgrade condition information designated by the user. In the attribute certificate to be upgraded, it is indicated as the usage conditions that the content is on-line period-restricted content, and the validity period data is also stored. The content key data, i.e., [SP.Sto.K(Kc)], encrypted with the service provider private key: SP.Sto.K is also stored.

(d4) Upon receiving the attribute certificate from the security chip, the service provider verifies the signature of the attribute certificate. In this case, the public key certificate linked to the attribute certificate is preferably verified, and the higher public key certificates are also preferably verified. There are some cases where this linkage verification must be performed. After proving the integrity of the attribute certificate by this verification processing, (d5) an upgraded attribute certificate is generated based on the upgrade condition information designated by the user.

An upgraded attribute certificate is generated by issuing a new attribute certificate in which the content usage conditions designated by the user are recorded, i.e., an attribute certificate having a serial number different from that of the attribute certificate received from the security chip. In this case, in an upgraded attribute certificate to be issued, log data containing the serial of the attribute certificate before being updated is stored.

As stated above, the upgrade mode is:
changing of period restrictions (extension);
period restrictions→on-line number restrictions;
period restrictions→off-line number restrictions; or
period restrictions→full-purchase.

If the period is to be changed, an upgraded attribute certificate in which a new usage period is set is generated. If the period restrictions are to be changed to on-line or off-line number restrictions, an upgraded attribute certificate in which a usage number is stored is generated. If the period restrictions are to be changed to full-purchase, an upgraded attribute certificate in which the content usage conditions are set to be full-purchase is generated.

If the period is changed, or the period restrictions are changed to on-line number restrictions, the content key to be stored in an upgraded attribute certificate is [SP.Sto.K(Kc)] encrypted with the service provider private key, as in the original attribute certificate. However, if period restrictions are changed to off-line number restrictions or to full-purchase, the content key encrypted with the public key corresponding to the SP storage private key: SC.Stopri.SP.K stored in the service provider management area of the security chip of the user device, i.e., [SC.Stopub.SP.K(kc)], is stored in an upgraded attribute certificate, unlike the content key in the original attribute certificate.

If the period restrictions are changed to off-line restrictions according to a common key system rather than a public key system, a content key encrypted with the SP storage key (common key) stored in the service provider management area of the security chip of the user device is stored. If the service provider does not possess this common key, the SP storage key (common key) is sent together with the attribute certificate sent from the security chip to the service provider in step (d3) of FIG. 45. In this case, the common key is encrypted with the session key generated during mutual authentication before being sent.

After generating the upgraded attribute certificate, the service provider sends it to the security chip.

(d6) Upon receiving the upgraded attribute certificate (AC) from the service provider, the security chip controller verifies the attribute certificate. This verification processing includes checking whether the right information (content usage conditions) stored matches the designated conditions, format checking, and signature verification. The signature verification is conducted by a sequence similar to, for example, the above-described processing flow of FIG. 20. In this verification processing, the security chip controller preferably performs linkage verification by tracing the path from a lower CA to a higher CA from the public key certificate linked to the attribute certificate according to the public key certificate information of the AC possessor in the attribute certificate (AC) so as to verify the public key certificate issued by the root certification authority (CA). There may be some cases where this linkage verification must be performed.

(d7) After verifying the attribute certificate, if it is determined that the attribute certificate is not tampered with, the security chip controller sends an acknowledgement of the receipt of the upgraded attribute certificate to the service provider, and (d8) stores the upgraded attribute certificate in the memory.

If the upgraded attribute certificate indicates off-line number restrictions, the security chip controller performs the above-described import processing for the usage-number control data before the use of the content. Details of the import processing for the usage-number control data have been discussed with reference to FIGS. 37 through 41, in which there are two modes: one mode in which the possible usage number is stored in the security chip; and the other mode in which the possible usage number is stored in an external memory, and only the hash value is stored in the security chip.

According to the above-described processing, the user device obtains a new upgraded attribute certificate based on the stored attribute certificate, and is thus able to use the content according to the usage conditions indicated in the upgraded attribute certificate.

(B) Upgrade processing based on on-line usage-number restricted attribute certificate (AC)

Figure 46:
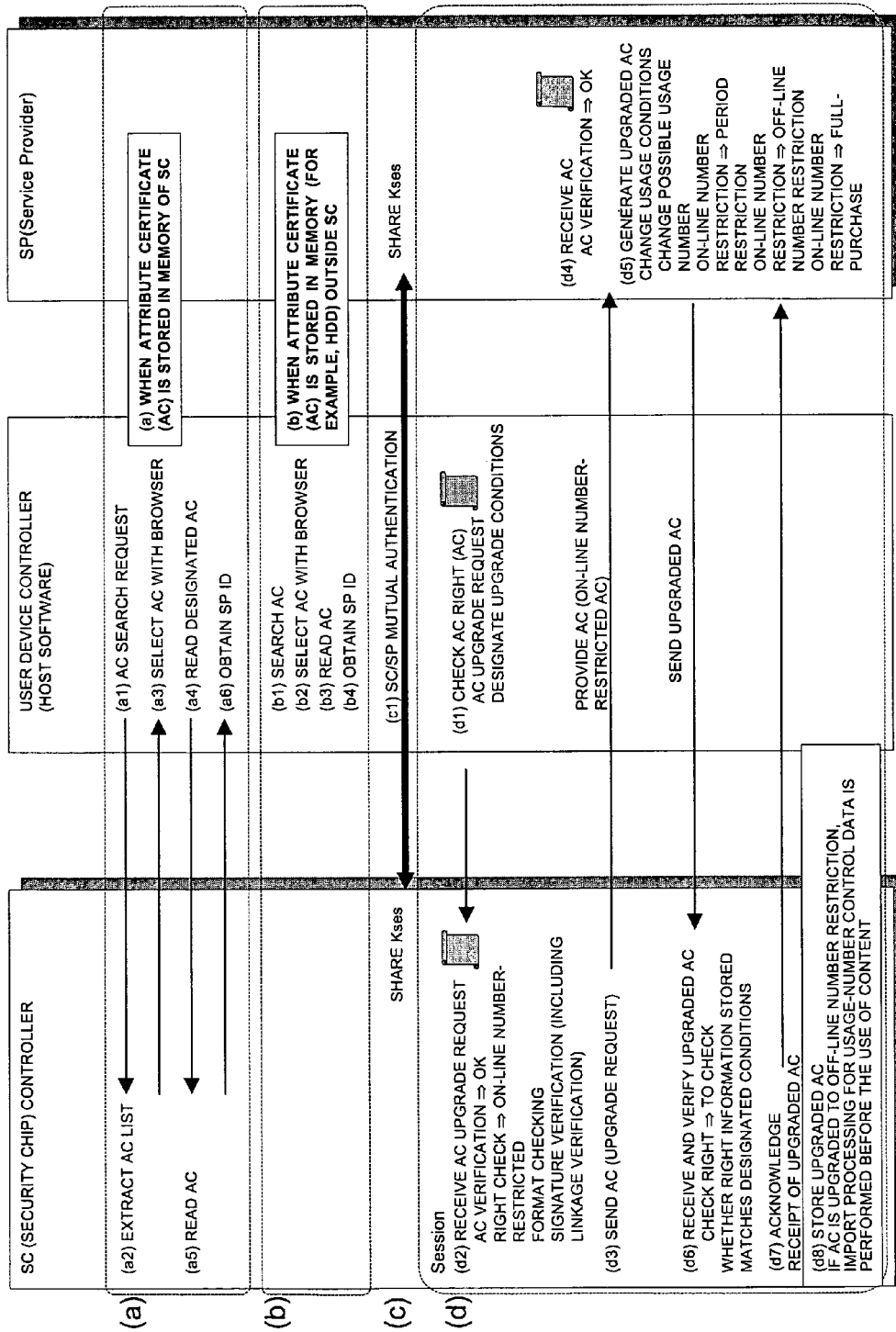
FIG. 46 illustrates upgrade processing using an on-line number-restricted attribute certificate.

Upgrade processing is now described with reference to the sequence diagram of FIG. 46 when the content usage conditions indicated in an attribute certificate indicate on-line processing usage-number restrictions. FIG. 46 illustrates processing of the security chip controller of the user device, the user device controller (host software), and the service provider.

In FIG. 46, the uppermost section (a) indicates processing for obtaining a service provider ID from an attribute certificate when the attribute certificate is stored in the internal memory of the security chip, and (b) indicates processing for obtaining a service provider ID from an attribute certificate when the attribute certificate is stored in an external memory outside the security chip, i.e., in a memory that can be accessed by mere control of the user device controller. Processing (c) indicates mutual authentication processing between the security chip and the service provider. These processings are similar to those of FIG. 45, and an explanation thereof is thus omitted.

After mutual authentication has successfully conducted, (d1) the user checks right information (content usage conditions) in the attribute certificate displayed by the attached browser, and sends a request to upgrade the attribute certificate together with upgrade conditions to the security chip. The content usage conditions recorded in the attribute certificate to be upgraded in this example are on-line number restrictions, and the upgrade conditions designated by the user are, for example:

changing of the possible usage number (increasing the number);
on-line number restrictions→period restrictions;
on-line number restrictions→off-line number restrictions; or
on-line restrictions→full-purchase.

(d2) Upon receiving a request to upgrade the attribute certificate (AC) from the user device controller, the security chip controller verifies the attribute certificate. This verification processing includes the checking of the right information (content usage conditions), format checking, and signature verification. Signature verification is conducted by a sequence similar to the above-described processing flow of FIG. 20. If necessary, it is preferable that the security chip controller verify the public key certificate of the AC possessor in the attribute certificate (AC), and further perform linkage verification so as to verify the public key certificate issued by the root certification authority (CA). There may be some cases where this linkage verification must be performed.

(d3) After verifying the attribute certificate, if it is determined that the attribute certificate is not tampered with, the security chip controller sends the attribute certificate to be upgraded to the service provider together with the upgrade condition information designated by the user. In the attribute certificate to be upgraded, it is indicated as the usage conditions that the content is on-line number-restricted content, and the restricted usage number is also stored. The content key data, i.e., [SP.Sto.K(Kc)], encrypted with the service provider private key: SP.Sto.K is also stored.

(d4) Upon receiving the attribute certificate from the security chip, the service provider verifies the signature of the attribute certificate. In this case, the public key certificate linked to the attribute certificate is preferably verified, and the higher public key certificates are also preferably verified. There are some cases where this linkage verification must be performed. After proving the integrity of the attribute certificate by this verification processing, (d5) an upgraded attribute certificate is generated based on the upgrade condition information designated by the user.

An upgraded attribute certificate is generated by issuing a new attribute certificate in which the content usage conditions designated by the user are recorded, i.e., an attribute certificate having a serial number different from that of the attribute certificate received from the security chip. In this case, in an upgraded attribute certificate to be issued, log data containing the serial of the attribute certificate before being updated is stored.

As stated above, the upgrade mode is:
changing of the possible usage number (increasing the number);
on-line number restrictions→period restrictions;
on-line number restrictions→off-line number restrictions; or
on-line restrictions→full-purchase.

If the usage number is to be changed, an upgraded attribute certificate in which a new usage number is set is generated. If on-line number restrictions are to be changed to period restrictions, an upgraded attribute certificate in which restricted period information is stored is generated.

If the on-line restricted usage number is changed, or if on-line number restrictions are changed to period restrictions, the content key to be stored in an upgraded attribute certificate is [SP.Sto.K(Kc)] encrypted with the service provider private key, as in the original attribute certificate. However, if on-line number restrictions are changed to off-line number restrictions or to full-purchase, the content key encrypted with the public key corresponding to the SP storage private key: SC.Stopri.SP.K stored in the service provider management area of the security chip of the user device, i.e., [SC.Stopub.SP.K (kc)], is stored in an upgraded attribute certificate, unlike the content key in the original attribute certificate.

If on-line period restrictions are changed to off-line restrictions according to a common key system rather than a public key system, a content key encrypted with the SP storage key (common key) stored in the service provider management area of the security chip of the user device is stored. If the service provider does not possess this common key, the SP storage key (common key) is sent together with the attribute certificate sent from the security chip to the service provider in step (d3) of FIG. 46. In this case, the common key is encrypted with the session key generated during mutual authentication before being sent.

After generating the upgraded attribute certificate, the service provider sends it to the security chip.

(d6) Upon receiving the upgraded attribute certificate (AC) from the service provider, the security chip controller verifies the attribute certificate. This verification processing includes checking whether the right information (content usage conditions) stored matches the designated conditions, format checking, and signature verification. Signature verification is conducted by a sequence similar to, for example, the above-described processing flow of FIG. 20. In this verification processing, the security chip controller preferably performs linkage verification by tracing the path from a lower CA to a higher CA from the public key certificate linked to the attribute certificate according to the public key certificate information of the AC possessor in the attribute certificate (AC) so as to verify the public key certificate issued by the root certification authority (CA). There may be some cases where this linkage verification must be performed.

(d7) After verifying the attribute certificate, if it is determined that the attribute certificate is not tampered with, the security chip controller sends an acknowledgement of the receipt of the upgraded attribute certificate to the service provider, and (d8) stores the upgraded attribute certificate in the memory.

If the upgraded attribute certificate indicates off-line number restrictions, the security chip controller performs the above-described import processing for the usage-number control data before the use of the content. Details of the import processing for the usage-number control data have been discussed with reference to FIGS. 37 through 41, in which there are two modes: one mode in which the possible usage number is stored in the security chip; and the other mode in which the possible usage number is stored in an external memory, and only the hash value is stored in the security chip.

According to the above-described processing, the user device obtains a new upgraded attribute certificate based on the stored attribute certificate, and is thus able to use the content according to the usage conditions indicated in the upgraded attribute certificate.

(C) Upgrade processing based on off-line usage-number restricted attribute certificate (AC)

Figure 47:
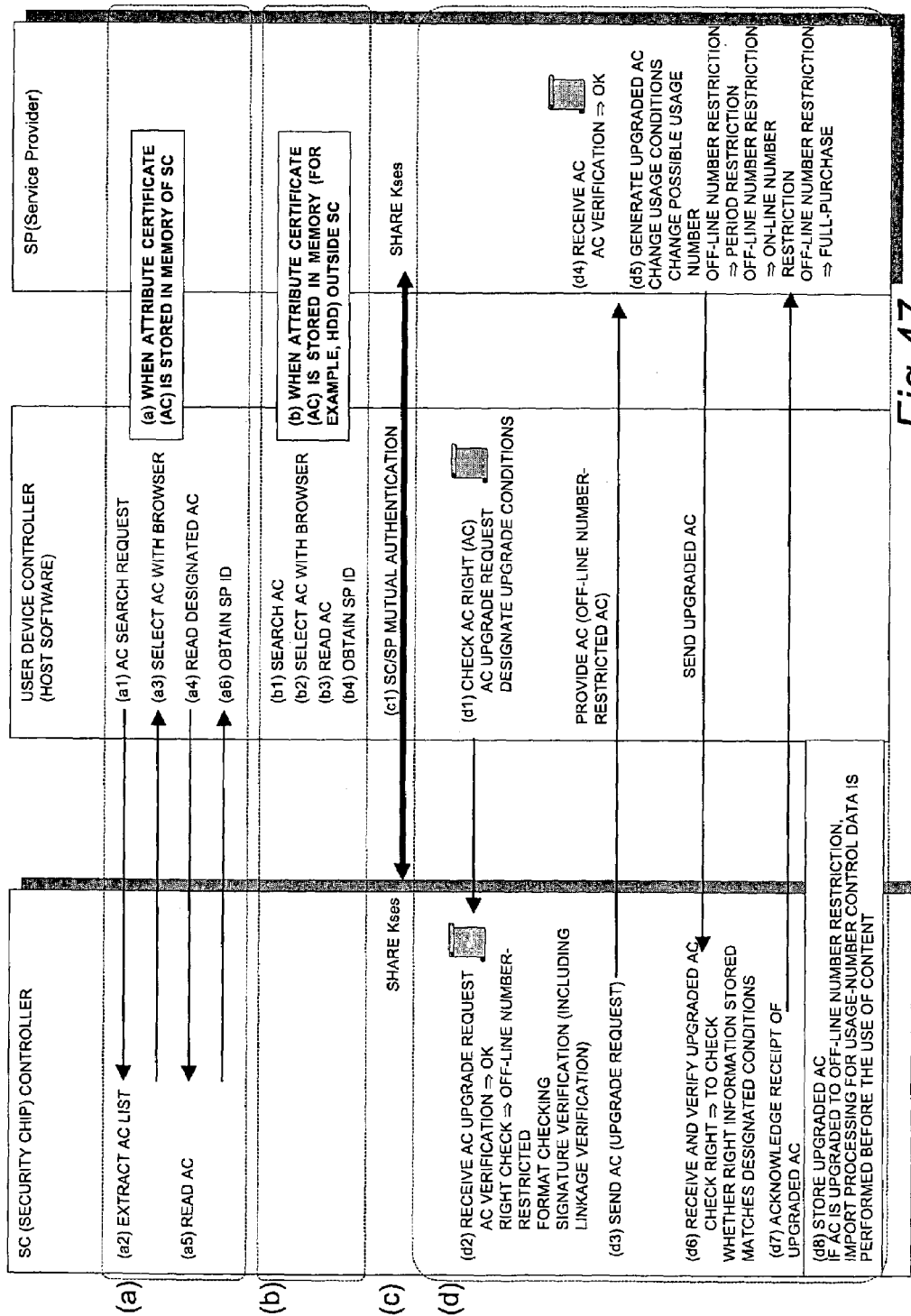
FIG. 47 illustrates upgrade processing using an off-line number-restricted attribute certificate.

Upgrade processing is now described with reference to the sequence diagram of FIG. 47 when the content usage conditions indicated in an attribute certificate designate off-line processing usage-number restrictions. FIG. 47 illustrates processing of the security chip controller of the user device, the user device controller (host software), and the service provider.

In FIG. 47, the uppermost section (a) indicates processing for obtaining a service provider ID from an attribute certificate when the attribute certificate is stored in the internal memory of the security chip, and (b) indicates processing for obtaining a service provider ID from an attribute certificate when the attribute certificate is stored in an external memory outside the security chip, i.e., in a memory that can be accessed by mere control of the user device controller. Processing (c) indicates mutual authentication processing between the security chip and the service provider. These processings are similar to those of FIG. 45, and an explanation thereof is thus omitted.

After mutual authentication has been successfully conducted, (d1) the user checks right information (content usage conditions) in the attribute certificate displayed by the attached browser, and sends a request to upgrade the attribute certificate together with upgrade conditions to the security chip. The content usage conditions recorded in the attribute certificate to be upgraded in this example are off-line number restrictions, and the upgrade conditions designated by the user are, for example:

changing of the possible usage number (increasing the number);

off-line number restrictions→period restrictions;

off-line number restrictions→on-line number restrictions; or off-line restrictions→full-purchase.

(d2) Upon receiving a request to upgrade the attribute certificate (AC) from the user device controller, the security chip controller verifies the attribute certificate. This verification processing includes the checking of the right information (content usage conditions), format checking, and signature verification. Signature verification is conducted by a sequence similar to the above-described processing flow of FIG. 20. If necessary, it is preferable that the security chip controller verify the public key certificate of the AC possessor in the attribute certificate (AC), and further perform linkage verification so as to verify the public key certificate issued by the root certification authority (CA). There may be some cases where this linkage verification must be performed.

(d3) After verifying the attribute certificate, if it is determined that the attribute certificate is not tampered with, the security chip controller sends the attribute certificate to be upgraded to the service provider together with the upgrade condition information designated by the user. In the attribute certificate to be upgraded, it is indicated as the usage conditions that the content is off-line number-restricted content, and the restricted usage number is also stored. The content key data, i.e., [SC.Stopub.SP.K(Kc)], encrypted with the public key corresponding to the SP storage private key: SC.Stopri.SP.K stored in the service provider management area of the security chip of the user device is also stored.

(d4) Upon receiving the attribute certificate from the security chip, the service provider verifies the signature of the attribute certificate. In this case, the public key certificate linked to the attribute certificate is preferably verified, and the higher public key certificates are also preferably verified. There are some cases where this linkage verification must be performed. After proving the integrity of the attribute certificate by this verification processing, (d5) an upgraded attribute certificate is generated based on the upgrade condition information designated by the user.

An upgraded attribute certificate is generated by issuing a new attribute certificate in which the content usage conditions designated by the user are recorded, i.e., an attribute certificate having a serial number different from that of the attribute certificate received from the security chip. In this case, in an upgraded attribute certificate to be issued, log data containing the serial of the attribute certificate before being updated is stored.

As stated above, the upgrade mode is:

changing of the possible usage number (increasing the number);

off-line number restrictions→period restrictions;

off-line number restrictions→on-line number restrictions; or off-line restrictions→full-purchase.

If the usage number is to be changed, an upgraded attribute certificate in which a new usage number is set is generated. If off-line number restrictions are to be changed to period restrictions, an upgraded attribute certificate in which restricted period information is stored is generated.

If the off-line restricted usage number is changed, or if off-line number restrictions are changed to full-purchase, the content key to be stored in an upgraded attribute certificate is [SC.Stopub.SP.K(Kc)] encrypted with the public key corresponding to the SP storage private key: SC.Stopri.SP.K stored in the service provider management area, as in the original attribute certificate. However, if off-line number restrictions are changed to period restrictions or to on-line number restrictions, the content key [SP.Sto.K(Kc)] encrypted with the service provider private key is stored in an upgraded attribute certificate, unlike the content key in the original attribute certificate, unlike in the original attribute certificate.

If off-line processing is performed according to a common key system rather than a public key system, a content key encrypted with the SP storage key (common key) stored in the service provider management area of the security chip of the user device is stored. If the service provider does not possess this common key, the SP storage key (common key) is sent together with the attribute certificate sent from the security chip to the service provider in step (d3) of FIG. 47. In this case, the common key is encrypted with the session key generated during mutual authentication before being sent.

After generating the upgraded attribute certificate, the service provider sends it to the security chip.

(d6) Upon receiving the upgraded attribute certificate (AC) from the service provider, the security chip controller verifies the attribute certificate. This verification processing includes checking whether the right information (content usage conditions) stored matches the designated conditions, format checking, and signature verification. Signature verification is conducted by a sequence similar to, for example, the above-described processing flow of FIG. 20. In this verification processing, the security chip controller preferably performs linkage verification by tracing the path from a lower CA to a higher CA from the public key certificate linked to the attribute certificate according to the public key certificate information of the AC possessor in the attribute certificate (AC) so as to verify the public key certificate issued by the root certification authority (CA). There may be some cases where this linkage verification must be performed.

(d7) After verifying the attribute certificate, if it is determined that the attribute certificate is not tampered with, the security chip controller sends an acknowledgement of the receipt of the upgraded attribute certificate to the service provider, and (d8) stores the upgraded attribute certificate in the memory.

If the upgraded attribute certificate indicates off-line number restrictions, the security chip controller performs the above-described import processing for the usage-number control data before the use of the content. Details of the import processing for the usage-number control data have been discussed with reference to FIGS. 37 through 41, in which there are two modes: one mode in which the possible usage number is stored in the security chip; and the other mode in which the possible usage number is stored in an external memory, and only the hash value is stored in the security chip.

According to the above-described processing, the user device obtains a new upgraded attribute certificate based on the stored attribute certificate, and is thus able to use the content according to the usage conditions indicated in the upgraded attribute certificate.

(D) Album-purchase upgrading

Content data formed into an album, such as a plurality (n) of items of content 1 through n stored in, for example, a CD or a DVD, or a series of items of content 1 through n, are provided. Some of the content items have been purchased, and a plurality of attribute certificates 1 through n for the purchased items of content are retained in a user device of the user. A description is now given, with reference to FIG. 48, of upgrade processing for purchasing the other items of content, such as content 2, 4, 6 to n, at a reduced price by providing these attribute certificates to the service provider so as to purchase the whole album.

Figure 48:
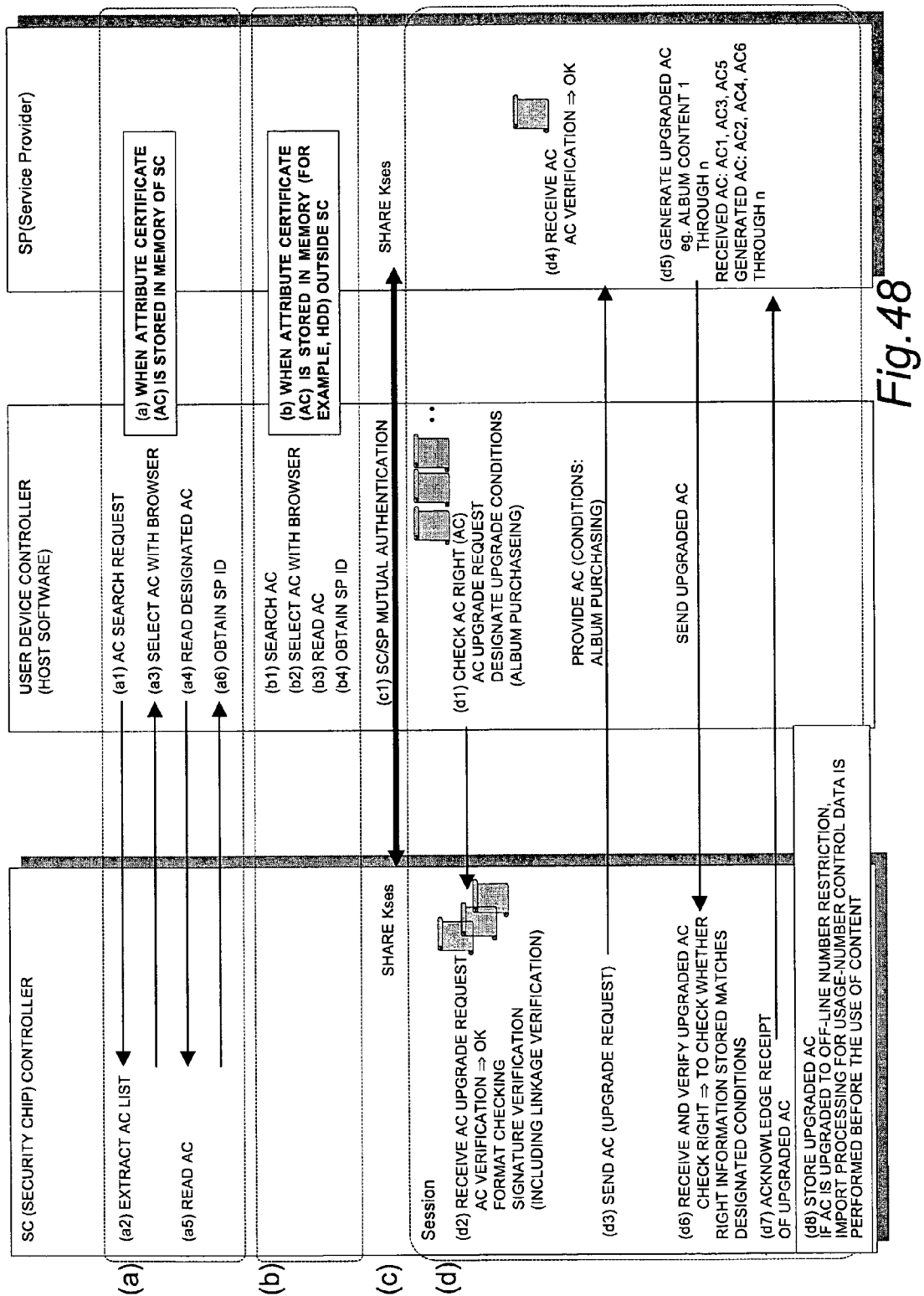
FIG. 48 illustrates upgrade processing for album purchasing.

FIG. 48 illustrates processing of the security chip controller of the user device, the user device controller (host software), and the service provider. In FIG. 48, the uppermost section (a) indicates processing for obtaining a service provider ID from an attribute certificate when the attribute certificate is stored in the internal memory of the security chip, and (b) indicates processing for obtaining a service provider ID from an attribute certificate when the attribute certificate is stored in an external memory outside the security chip, i.e., in a memory that can be accessed by mere control of the user device controller. Processing (c) indicates mutual authentication processing between the security chip and the service provider. These processings are similar to those of FIG. 45, and an explanation thereof is thus omitted.

After mutual authentication has been successfully conducted, (d1) the user checks right information (content usage conditions) in the attribute certificate displayed by the attached browser, and sends a request to upgrade the attribute certificate together with upgrade conditions to the security chip. There is one or more attribute certificates to be upgraded in this example for part of a plurality of items of content which forms an album. The upgrade condition designated by the user is, for example:

purchasing part of the remaining items of content which form an album; or purchasing all the remaining items of content which forms an album.

(d2) Upon receiving a request to upgrade the attribute certificate (AC) from the user device controller, the security chip controller verifies the attribute certificate. This verification processing includes the checking of the right information (content usage conditions), format checking, and signature verification. Signature verification is conducted by a sequence similar to the above-described processing flow of FIG. 20. If necessary, it is preferable that the security chip controller verify the public key certificate of the AC possessor in the attribute certificate (AC), and further perform linkage verification so as to verify the public key certificate issued by the root certification authority (CA). There may be some cases where this linkage verification must be performed.

(d3) After verifying the attribute certificate, if it is determined that the attribute certificate is not tampered with, the security chip controller sends the attribute certificate to be upgraded to the service provider together with the upgrade condition information designated by the user.

(d4) Upon receiving the attribute certificate from the security chip, the service provider verifies the signature of the attribute certificate. In this case, the public key certificate linked to the attribute certificate is preferably verified, and the higher public key certificates are also preferably verified. There are some cases where this linkage verification must be performed. After proving the integrity of the attribute certificate by this verification processing, (d5) an upgraded attribute certificate is generated based on the upgrade condition information designated by the user.

An upgraded attribute certificate is generated by issuing a new attribute certificate in which the content usage conditions designated by the user are recorded, i.e., an attribute certificate having a serial number different from that of the attribute certificate received from the security chip. In this case, in an upgraded attribute certificate to be issued, log data containing the serial of the attribute certificate before being updated is stored.

As stated above, the upgrade mode is:

purchasing part of the remaining items of content which form an album; or purchasing all the remaining items of content which forms an album.

If part of the remaining items of content which form an album is purchased, upgraded attribute certificates for the designated items of content to be purchased are generated. If all the remaining items of content which form an album are purchased, upgraded attribute certificates for all the remaining items of content are generated.

The usage conditions may be designated by the user in advance, or may be determined by the service provider. If the usage conditions are designated by the user, the user designates them in step (d1) of FIG. 48, and the usage conditions are sent together with the attribute certificate from the security chip to the service provider in (d3).

If an off-line usage upgraded attribute certificate is generated, the service provider stores the content key [SC.Stopub.SP.K(Kc)] encrypted with the public key corresponding to the SP storage private key: SC.Stopri.SP.K stored in the service provider management area. If an on-line usage upgraded attribute certificate is generated, the service provider stores the content key [SP.Sto.K(Kc)] encrypted with the private key of the service provider in the upgraded attribute certificate.

If off-line processing is performed according to a common key system rather than a public key system, a content key encrypted with the SP storage key (common key) stored in the service provider management area of the security chip of the user device is stored. If the service provider does not possess this common key, the SP storage key (common key) is sent together with the attribute certificate from the security chip to the service provider in step (d3) of FIG. 48. In this case, the common key is encrypted with the session key generated during mutual authentication before being sent.

After generating the upgraded attribute certificate, the service provider sends it to the security chip.

(d6) Upon receiving the upgraded attribute certificate (AC) from the service provider, the security chip controller verifies the attribute certificate. This verification processing includes checking whether the right information (content usage conditions) stored matches the designated conditions, format checking, and signature verification. Signature verification is conducted by a sequence similar to, for example, the above-described processing flow of FIG. 20. In this verification processing, the security chip controller preferably performs linkage verification by tracing the path from a lower CA to a higher CA from the public key certificate linked to the attribute certificate according to the public key certificate information of the AC possessor in the attribute certificate (AC) so as to verify the public key certificate issued by the root certification authority (CA). There may be some cases where this linkage verification must be performed.

(d7) After verifying the attribute certificate, if it is determined that the attribute certificate is not tampered with, the security chip controller sends an acknowledgement of the receipt of the upgraded attribute certificate to the service provider, and (d8) stores the upgraded attribute certificate in the memory.

If the upgraded attribute certificate indicates off-line number restrictions, the security chip controller performs the above-described import processing for the usage-number control data before the use of the content. Details of the import processing for the usage-number control data have been discussed with reference to FIGS. 37 through 41, in which there are two modes: one mode in which the possible usage number is stored in the security chip; and the other mode in which the possible usage number is stored in an external memory, and only the hash value is stored in the security chip.

According to the above-described processing, the user device obtains a new upgraded attribute certificate based on the stored attribute certificate, and is thus able to use the content according to the usage conditions indicated in the upgraded attribute certificate.

[Data Backup and Restore Processing]

Backup copies are preferably made for right information and certificate documents purchased by the user from the service provider and stored in the storage means of the user device provided with the security chip in case that such data is lost. Backup information includes information that can safely let the others see and information that has to be securely stored. Information that can safely let the others see is certificate documents, such as public key certificates and attribute certificates. Information that has to be securely stored is, for example, information concerning service subscription written into the service provider management area of the security chip.

Concerning certificate documents, such as public key certificates and attribute certificates, it is enough for the user to store copies of such documents into a hard disk or a memory card provided with a flash memory when required. Although a content key is stored in an attribute certificate, it is necessary to connect to the service provider when using the attribute certificate on-line, and the integrity of the device (security chip) is verified during mutual authentication. Accordingly, the illegal use of content can be prevented. Even if the attribute certificate is used off-line, the key for decrypting the content key is stored in the service provider management area of the security chip, and thus, only the user who possesses the security chip of an authorized user device and who is permitted to access the data by the above-described password input is able to decrypt the content key. Accordingly, even if a third party obtains the attribute certificate, the illegal use of content can be prevented.

On the other hand, private information in the security chip must be securely stored in a temporary storage. For example, in the service provider management area of the security chip, ID information, key information, and a password required for mutual authentication with a service provider are stored, and leakage of such information to a third party must be prevented. Accordingly, when a backup copy is made for the information in an external storage medium (temporary storage), such backup data is required to be encrypted.

When the user stores private information in a temporary storage, the encryption of the information such that leakage of the data occurs when the storage medium is stolen is meaningless. Also, if the data can be decrypted by a key which can be easily extracted from the user device, the security device can be copied by this key, and it is possible to generate a second security device having the same service provider management area data as the original security device at the user side. Moreover, by attaching a portable medium provided with a copy of the security chip to another user device, the same services can be enjoyed by a plurality of user devices. In the system of the present invention, therefore, even when backup data of private information is stored in a temporary storage, it cannot be decrypted by an unauthorized third party, and also, even the user himself/herself who possesses the user device is unable to restore, i.e., store the information in another security chip, without a permission of the system holder, and data can be decrypted and restored only in the support center.

That is, in view of difficulties in precisely controlling information and in reliably preventing the loss of data in a user device, in the system of the present invention, data backup services are provided in a support center, and data restoring is performed in the support center by using backup data when required. Data restoring is performed in the support center, and data is read from a temporary storage and is imported into the security device of the user device. Data backup processing and restore processing in the support center are described below.

Figure 49:
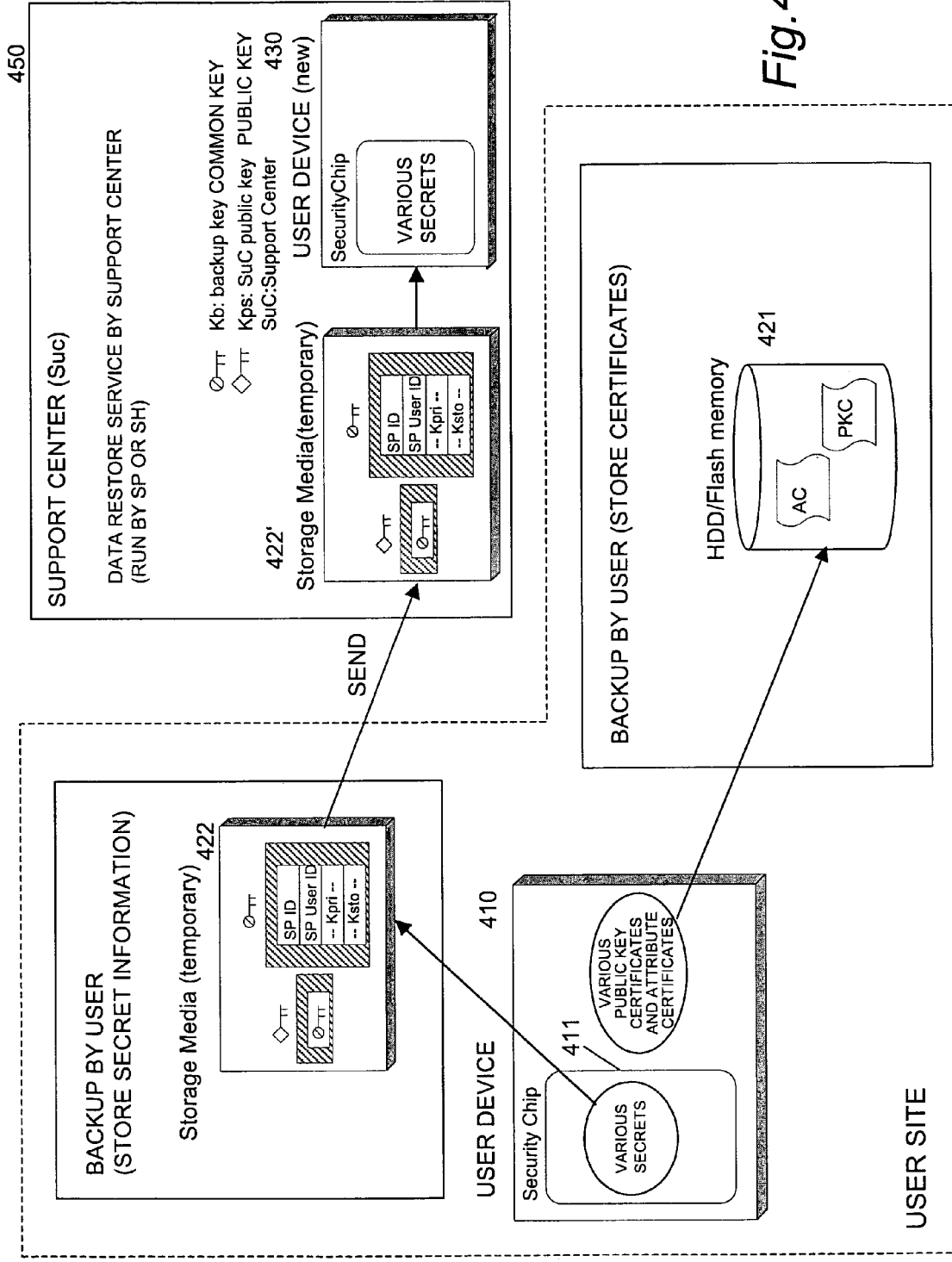
FIG. 49 illustrates an overview of data restore processing performed by a support center.

An overview of backup processing of private information in the user device and restoring processing in the support center is shown in FIG. 49.

In FIG. 49, a user device 410 has a security chip 411, in which various secrets, i.e., private information, is stored. The private information is, for example, information stored in a service provider management area of the security chip, such as, ID information, key information, and a password required for mutual authentication with a service provider. In a memory outside the security chip of the user device, public key certificates and attribute certificates are stored.

The user stores backup data of the above-described information in an external storage medium outside the user device in case that the user device is damaged or the data is lost. For example, public key certificates and attribute certificates are stored in a hard disk of an external PC or in an external storage medium 421, such as a card storage medium provided with a flash memory. As described above, the illegal use of content can be prevented even if leakage of the information occurs, and thus, these certificates are stored in the external storage medium 421 without being encrypted, and the user is able to restore them in the user device 410 from the storage medium 421 when necessary.

On the other hand, when storing private information of the security chip in the external storage medium 422 as backup data, a backup key: Kb (common key) is generated from a random number in the user device as a temporary key, and various private information (SecData) is encrypted with the backup key: Kb to generate encrypted data: [Kb(SecData)] and store it in the storage medium 422. Encrypted key data [Kps(Kb)] obtained by encrypting the backup key: Kb with the public key: Kps of the support center is also stored in the external storage medium 422. After storing the private information in the external storage medium 422, the backup key: Kb is erased without being stored in the user device.

Even if a third party obtains the storage medium 422, it is impossible to decrypt the encrypted data: [Kb(SecData)] stored in the storage medium 422 because the backup key: Kb, which is the key for decrypting the encrypted data: [Kb(SecData)], is encrypted with the public key: Kps of the support center, and the backup key: Kb has to be decrypted with the private key: Kss of the support center. Thus, the third party is unable to decrypt the backup key: Kb. It is also impossible for an authorized user possessing the user device to generate a second security device.

Restoring processing of data is performed by sending the storage medium 422 to a support center 450 from the user site. Restore processing is performed for a new user device 430 when the original user device is damaged. Alternatively, the original user device itself may be sent to the support center, in which case, restore processing is performed for the repaired original user device. When performing restore processing for the new user device, revoke processing is also performed on the original user device. This revoke processing is performed by, for example, registering public key certificates issued to the user device in a revocation list. The revocation list is formed as a list of public key certificates of unauthorized devices, revoked devices, and revoked users. The revocation list is checked when performing mutual authentication with a device, and if the device is found to be included in the list, it means that authentication has failed, and subsequent data communication is terminated.

Restore processing in the support center 450 is performed as follows. Encrypted key data [Kps(Kb)] encrypted with the public key: Kps of the support center and stored in a storage medium 422' sent from the user site is extracted, and is decrypted with the private key: Kss of the support center to extract the backup key: Kb. Subsequently, the encrypted private information data: [Kb(SecData)] is decrypted with the backup key: Kb obtained, and decrypted data: SecData is stored in the security chip of the user device 430. A specific restore processing sequence is described below.

As described above, backup data of the private information in the user device is restored only in the support center, thereby making it possible to prevent the use of copies of private information.

Figure 50:
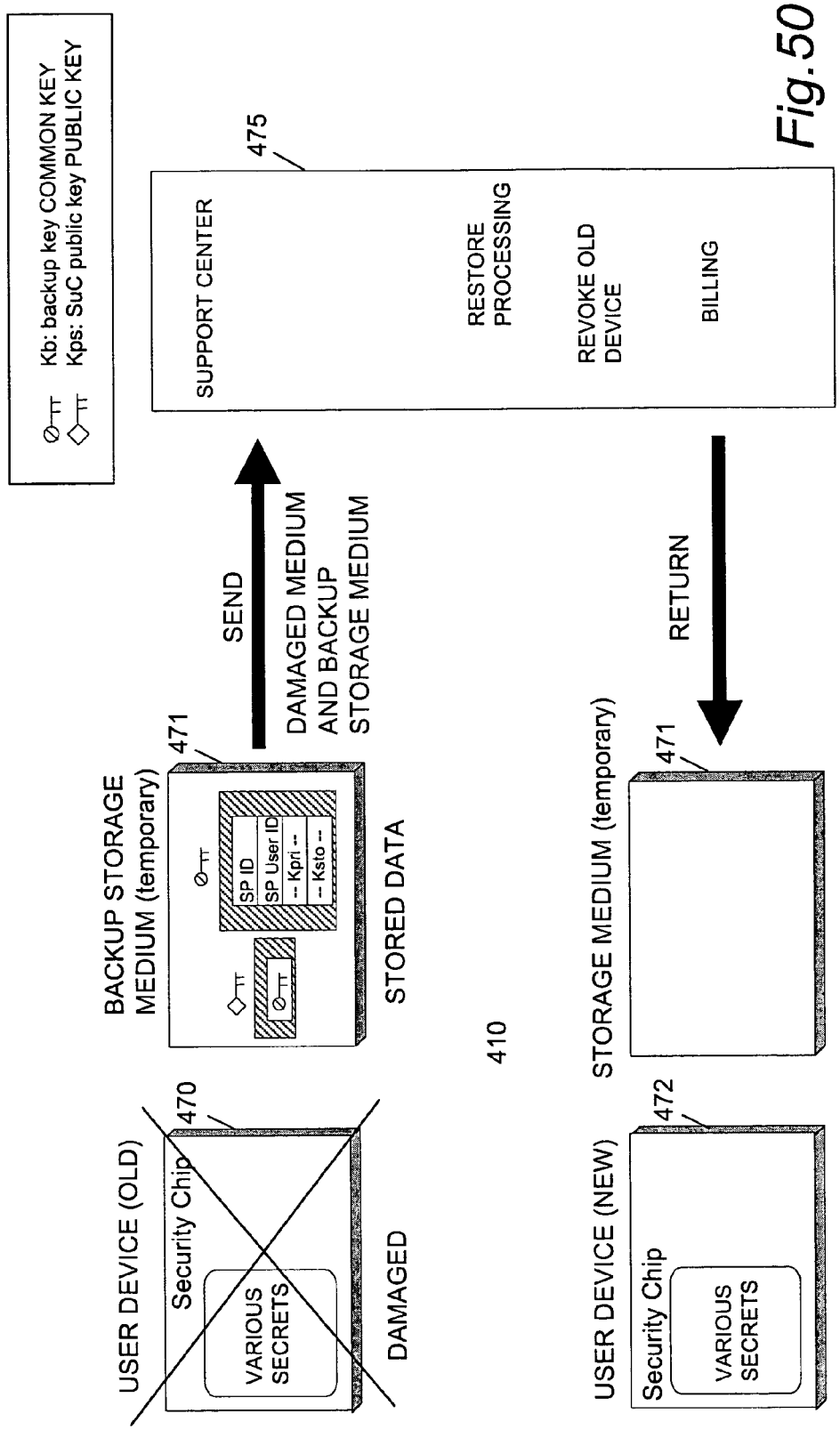
FIG. 50 illustrates an overview of a sequence of data restore processing performed by the support center.

FIG. 50 illustrates an overview of a restore processing sequence. In the user site, private information stored in the security chip of a user device 470 of the user is stored in a backup storage medium 471. As discussed above, the user device generates a backup key: Kb (common key), and stores encrypted data: [Kb(SecData)] obtained by encrypting the private information (SecData) with the backup key: Kb, and encrypted key data [Kps(Kb)] obtained by encrypting the backup key: Kb with the public key: Kps of the support center in the backup storage medium 471.

If the user device 470 cannot be used by, for example, being damaged, the user sends the backup storage medium 471 to the support center 475.

Figure 51:
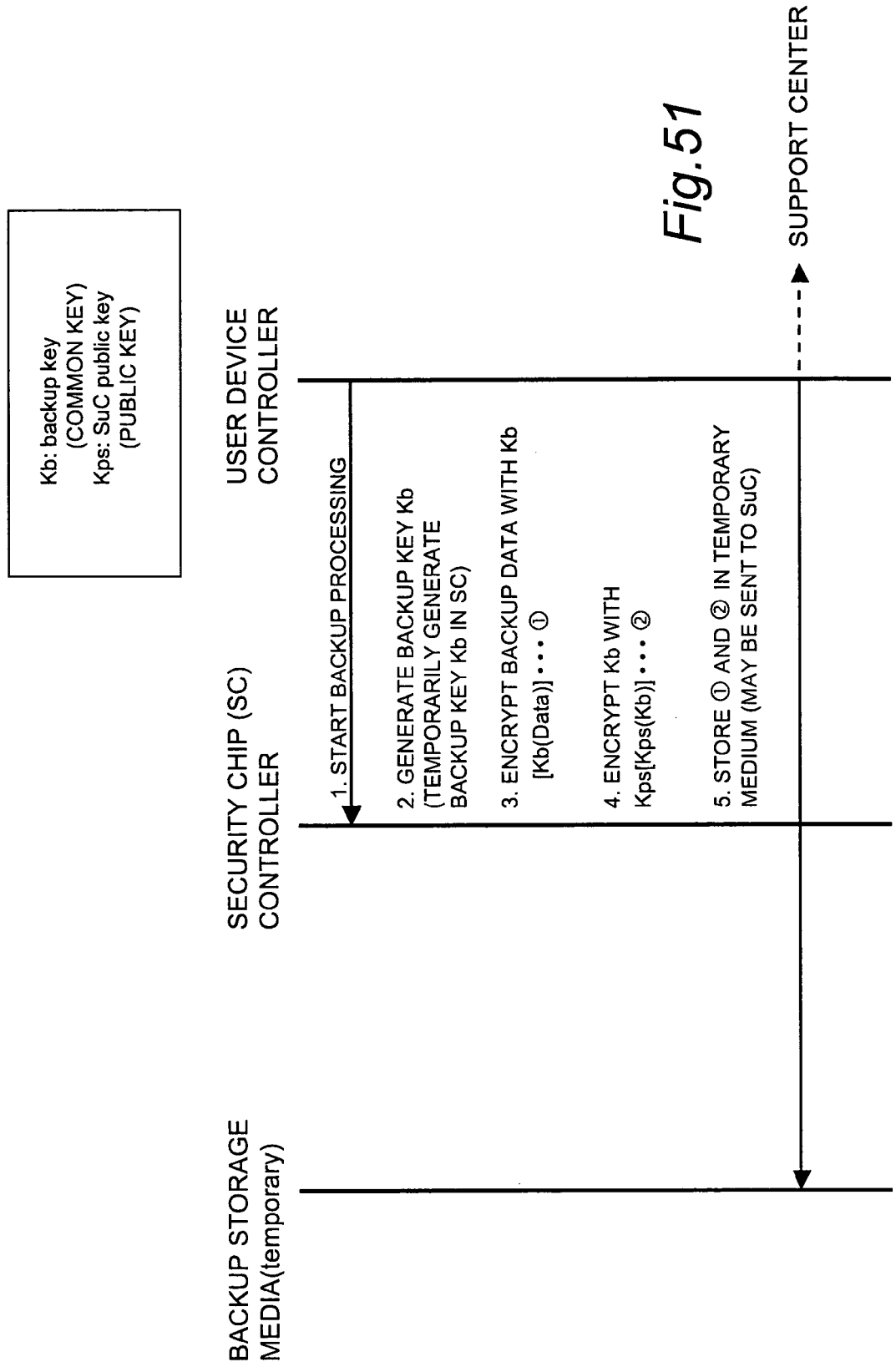
FIG. 51 illustrates a sequence of data backup processing performed by the user device.

The support center 475 decrypts the data of the backup storage medium 471 and restores it in a new user device or a repaired original user device, and then returns a user device 472 in which the private information is restored and the backup storage medium 471 used for restoring the data to the user. If restore processing is performed on the new device and the original device is no longer used, the support center 475 performs revoke processing by making registration into the above-described revocation list. The support center 475 may bill for restore processing. A description is now given, with reference to FIG. 51, of a sequence of data backup processing for a backup storage medium performed in the user site. FIG. 51 illustrates, from the left, processing of the backup storage medium, the security chip controller of the user device, and the user device controller (host software). First, (1) the user device controller sends a backup request to the security chip controller. This is performed by providing a backup processing execution instruction from the user to the input unit of the user device.

Upon receiving the backup request, (2) the security chip controller generates a backup key: Kb for encrypting backup data. The backup key: Kb is a temporal key specifically used for a backup operation and created based on, for example, a random number generated by random-number generating means. The backup key: Kb is erased without being stored in the security chip after storing the backup data in a backup storage medium.

After generating the backup key: Kb, (3) the security chip controller encrypts the backup data with the generated backup key: Kb so as to generate encrypted data: [Kb(SecData)]. After encrypting the data, (4) the security chip controller encrypts the backup key: Kb with the public key: Kps of the support center so as to generate encrypted key data: [Kps(Kb)].

After the above-described processing, (5) the security chip controller stores the encrypted data: [Kb(SecData)] and the encrypted key data: [Kps(Kb)] in the backup storage medium. Thereafter, the backup key: Kb is erased from the security chip.

Instead of storing the encrypted data: [Kb(SecData)] and the encrypted key data: [Kps(Kb)] in the backup storage medium, they may be directly sent to the support center and stored in the storage means of the support center in correspondence with the user device ID or the security chip ID. In this case, restore processing based on the backup data is executed in response to a request from the user device (security chip) to the support center via a communication network, and thus, restore processing can be executed without sending the backup storage medium.

Figure 52:
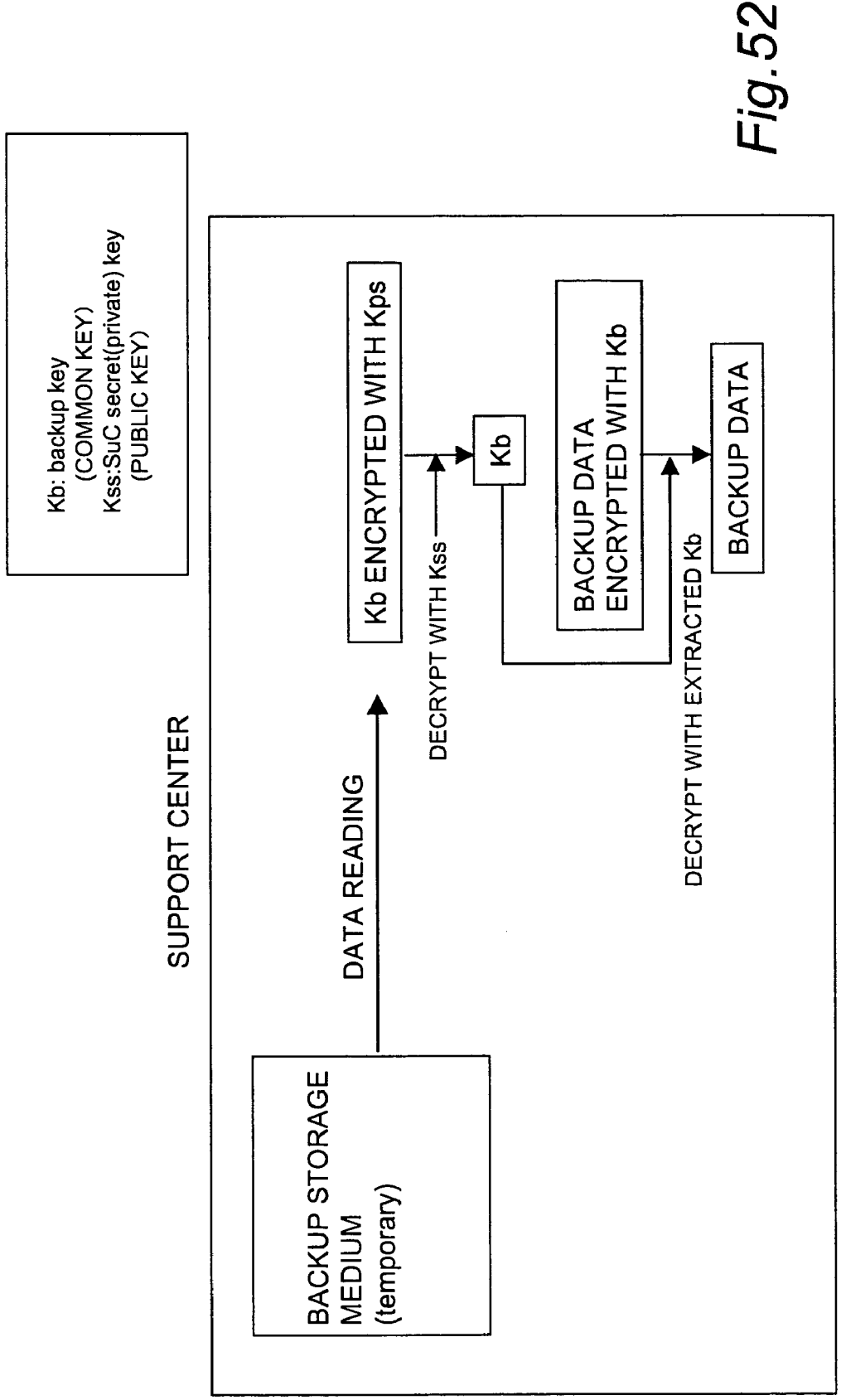
FIG. 52 illustrates an overview of backup-data reading processing performed by the support center.

A description is now given, with reference to FIG. 52, of processing for obtaining the backup data from the backup storage medium by the support center. In the support center, the data stored in the backup storage medium sent from the user site is read. The data read from the backup storage medium includes backup data: [Kb(SecData)] encrypted with the backup key: Kb, and encrypted key data: [Kps(Kb)] obtained by encrypting the backup key: Kb with the public key: Kps of the support center. If, as discussed above, the backup data is stored in the storage means of the support center in correspondence with the user device ID or the security chip ID, the support center reads the data from the storage means in response to a restore processing request from the user site.

After reading the data, the support center decrypts the backup key: Kb data: [Kps(Kb)], which has been encrypted with the public key: Kps of the support center, with the private key: Kss corresponding to the public key of the support center, thereby extracting the backup key: Kb. The support center then decrypts the backup data: [Kb(SecData)] encrypted with the backup key: Kb by using the extracted backup key: Kb, thereby extracting the backup data: SecData.

Figure 53:
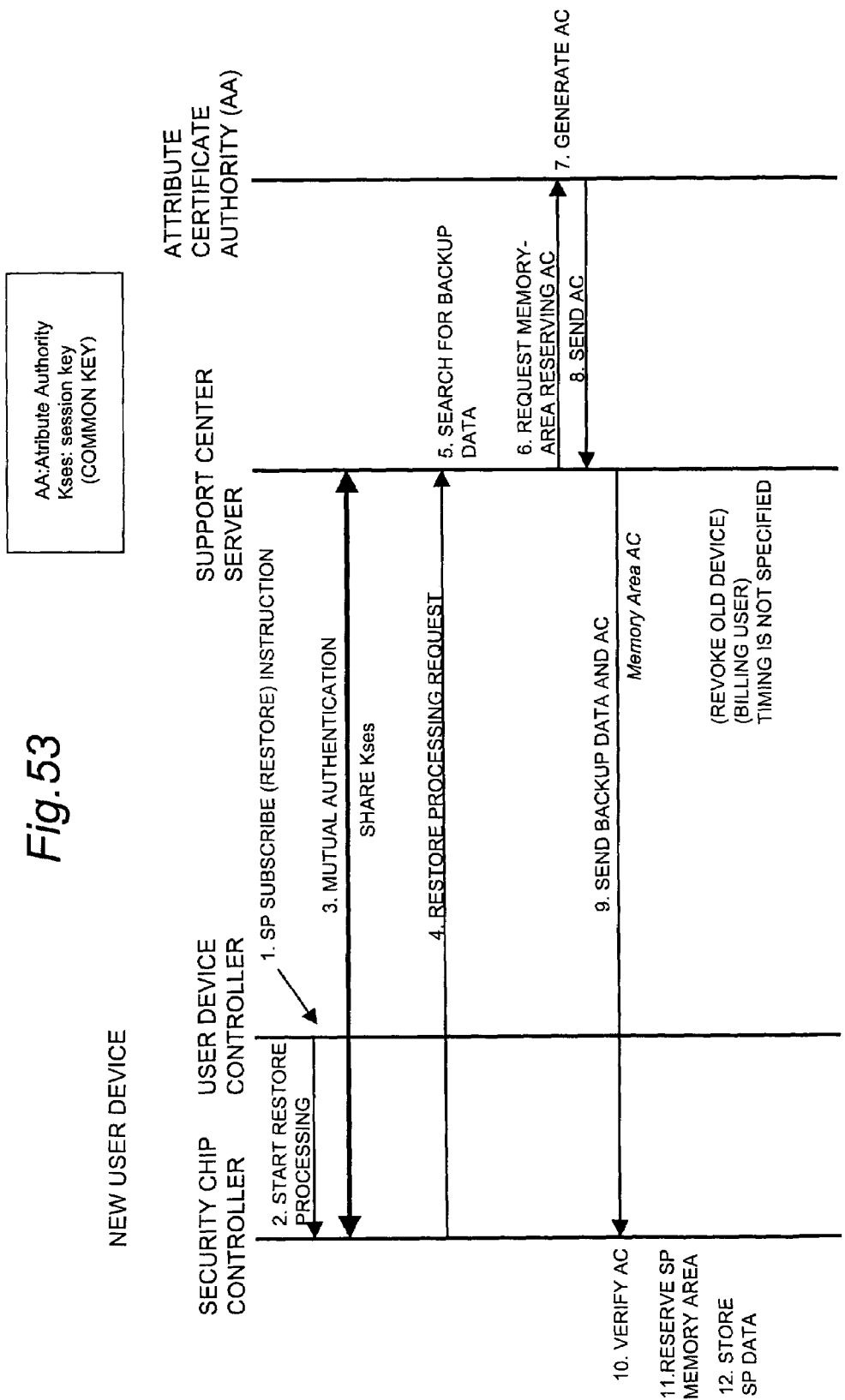
FIG. 53 is a sequence of data restore processing performed by the support center.

A sequence of restore processing performed in the support center is described below with reference to FIG. 53. FIG. 53 illustrates, from the left, processing of the security chip controller of a new user device in which data is to be stored by restore processing, processing of the user device controller of the new user device, a support center server, and an attribute certificate authority (AA), which is an attribute certificate issuer. The attribute certificate authority is an institute which issues attribute certificates, and is disposed in, for example, the service provider. The attribute certificate authority issues an attribute certificate for generating a service provider management area in the security chip of the user device.

As stated above, an attribute certificate for generating a service provider management area is issued for enabling each service provider to register and set a management area for the corresponding service provider in the memory of the security chip of the user device. In the attribute information fields, the service provider identifier (ID), the service provider name, the processing mode: memory area reserving, the area size: the size of the memory, etc. are recorded.

The processing sequence of FIG. 53 is discussed below. First, (1) the user device controller outputs a restore processing request to the security chip controller. This is performed based on a restore processing execution instruction given from the operator of the support center to the input unit of the user device.

(2) Upon receiving the restore processing request from the user device controller, (3) the security chip controller performs mutual authentication between the security chip and the service provider. This mutual authentication is conducted by, for example, the above-described TLS1.0 processing shown in FIG. 16 or another method using, for example, a public key system. In this mutual authentication, the public key certificates of both the security chip and the service provider are verified, and if necessary, the public key certificates up to the root certification authority (CA) are verified. In this authentication processing, the security chip and the support center share the session key (Kses). After mutual authentication has been successfully conducted, (4) the security chip controller sends a restore processing request to the support center.

Upon receiving the restore processing request from the security chip, (5) the support center searches for the backup data. This is performed for checking whether the support center has received the backup data from the user site.

Then, (6) the support center sends a request to issue a memory-area-reserving attribute certificate (AC) to the attribute certificate authority (issuer). (7) Upon receiving the attribute-certificate (AC) issuing request, the attribute certificate authority (AA), which is the attribute certificate issuer, generates a memory-area-reserving attribute certificate (AC). The support center may have received an attribute certificate (AC) issued by the attribute certificate authority (AA) in advance.

In the memory-area-reserving attribute certificate, the service provider identifier (ID), the service provider name, the processing mode: memory-area reserving, the area size: the size of the memory area, etc. are recorded in the attribute information fields. The memory-area-reserving attribute certificate is issued, for example, under the management of the corresponding service provider. Accordingly, when restore processing is performed on data only in a single service provider management area, a single service provider management area is set in the memory of the security chip controller by a single memory-area-reserving attribute certificate. When restore processing is performed on data in a plurality of service provider management areas, a plurality of memory-area-reserving attribute certificates are received, and then, a plurality of service provider management areas are set in the memory of the security chip controller, and data is stored in the corresponding areas.

(8) The attribute certificate authority (AA), which is the attribute certificate issuer, sends the generated memory-area-reserving attribute certificate (AC) to the support center server. Upon receiving the memory-area-reserving attribute certificate (AC) from the attribute certificate authority (AA), which is the attribute certificate issuer, (9) the support center sends the attribute certificate and the backup data to the security chip controller. The backup data is data to be stored in a service provider management area reserved in the memory of the security chip by the memory-area-reserving attribute certificate (AC). The backup data is, for example, a service provider (SP) private key, a service provider (SP) storage private key, the hash value of external management information, and usage-number control data, authentication information, or user information.

(10) Upon receiving the memory-area-reserving attribute certificate (AC) from the support center server, the security chip controller verifies the attribute certificate. Verification processing includes format checking, signature verification, etc. Signature verification is conducted according to a sequence similar to, for example, the above-described processing flow of FIG. 20.

If necessary, the security chip controller preferably obtains the public key certificate linked to the attribute certificate (AC) according to the public key certificate information of the AC possessor in the attribute certificate (AC) so as to verify the public key certificate. For example, if the reliability of the attribute certificate (AC) issuer is uncertain, it can be determined whether the AC issuer has a public key certificate authorized by the certification authority by verifying the public key certificate of the attribute certificate (AC) issuer. If the public key certificate forms a hierarchical structure, as described above, linkage verification is preferably performed to trace the path from a lower CA to a higher CA so as to verify the public key certificate issued by the root certification authority (CA). There may be some cases where this linkage verification must be performed.

(11) After verifying the attribute certificate, if it is determined that the attribute certificate is not tampered with, the security chip controller sets a service provider management area in the memory of the security chip according to the conditions recorded in the memory-area-reserving attribute certificate (AC). (12) The security chip controller then stores the backup data received from the support center server in the service provider management area set in the memory.

According to the above-described processing, the service provider management area is reserved in the memory of the security chip according to the conditions recorded in the memory-area-reserving attribute certificate, and the backup data is stored in the reserved service provider management area. If backup data is restored in a plurality of service provider management areas, processing similar to the above-described processing is repeated based on the issuance of a plurality of memory-area-reserving attribute certificates.

After or during the above-described processing sequence, the support center performs revoke processing on the original user device to be disposed of. The support center may bill the user who has made the restore processing request.

[Configuration of Each Entity]

A description is now given, with reference to the drawings, of an example of the configuration of each entity which forms the above-described content-usage management system. An example of the configuration of a user device, which serves as a service receiving device, for receiving content from a service provider is described below with reference to FIG. 54.

Figure 54:
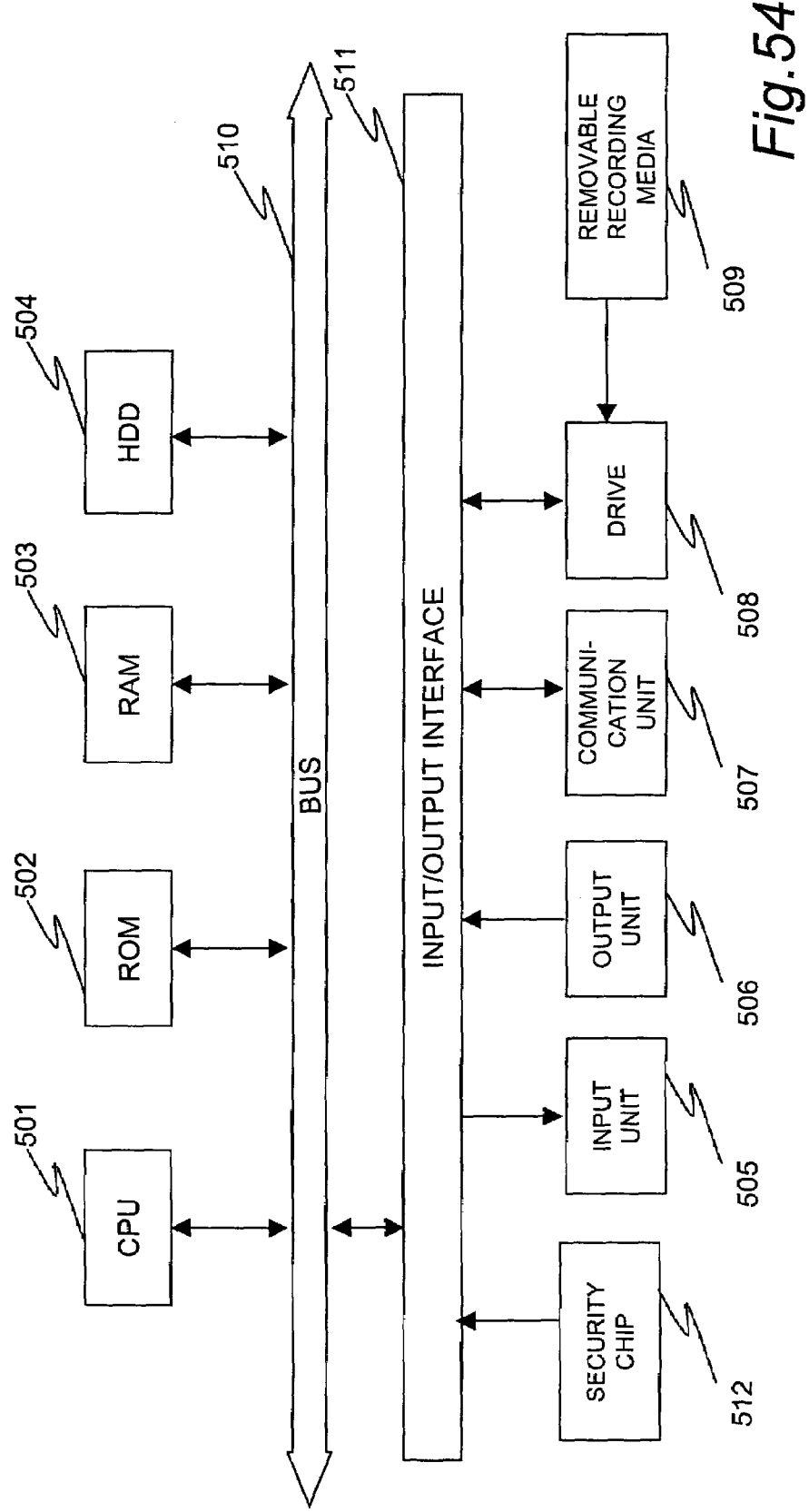
FIG. 54 illustrates an example of the configuration of the user device.

The user device is implemented by data processing means, such as a PC provided with a CPU for performing data processing and control and communication means that is able to communicate with, for example, a service provider. An example of the configuration of the device is shown in FIG. 54. The configuration shown in FIG. 54 is an example only, and it is not essential that the device have all the functions shown in FIG. 54. A CPU (Central processing Unit) 501 shown in FIG. 54 is a processor that executes various application programs and an OS (Operating System). A ROM (Read-Only-Memory) 502 stores fixed data, such as the programs executed by the CPU 501 or computation parameters. A RAM (Random Access Memory) 503 is used as a storage area or a work area for the programs executed in the processing of the CPU 501 and for variable parameters in the processing of the programs.

An HDD 504 controls a hard disk, and stores and reads various data and programs in and from the hard disk. A security chip 512 has a tamper-resistant structure, as discussed above, and is provided with a controller and a memory, which serves as a storage area for key data required for encryption processing and an access permission certificate.

A bus 510 is formed of, for example, a PCI (Peripheral Component Interface), through which data can be transferred to and from modules and input/output devices via an input/output interface 511.

An input unit 505 is formed of, for example, a keyboard, or pointing device, and is operated by the user for inputting various commands and data into the CPU 501. An output unit 506 is formed of, for example, a CRT or a liquid crystal display, and displays various items of information as text or images.

A communication unit 507 communicates with entities connected to the device, for example, with a service provider, and sends and receives data supplied from various storage units, data processed by the CPU 501, or encrypted data, to and from other entities under the control of the CPU 501.

A drive 508 performs a recording/playback operation on removable recording media 509, such as floppy disks, CD-ROM (Compact Disc Read Only Memory), MO (Magneto optical) disks, DVD (Digital Versatile Disc), magnetic disks, and semiconductor memory. The drive 508 plays back or stores programs or data from or in the removable recording media 509.

When executing or processing the program or the data recorded in the storage media by the CPU 501, the read program or data is supplied to the connected RAM 503 via the interface 511 and the bus 510.

The programs for executing the above-described processings in the user device are stored in, for example, the ROM 502 and are processed by the CPU 501. Alternatively, they may be stored in a hard disk, supplied to the CPU 501 via the HDD 504, and are executed.

A description is now given of an example of the configuration of a data processing apparatus which forms each entity of the system of the present invention, such as the service provider, the support center, the content creator, or the attribute certificate authority. These entities can be implemented by, for example, the configuration shown in FIG. 55. The configuration of the data processing apparatus shown in FIG. 55 is an example only, and it is not essential that each entity have all the functions shown in FIG. 55.

Figure 55:
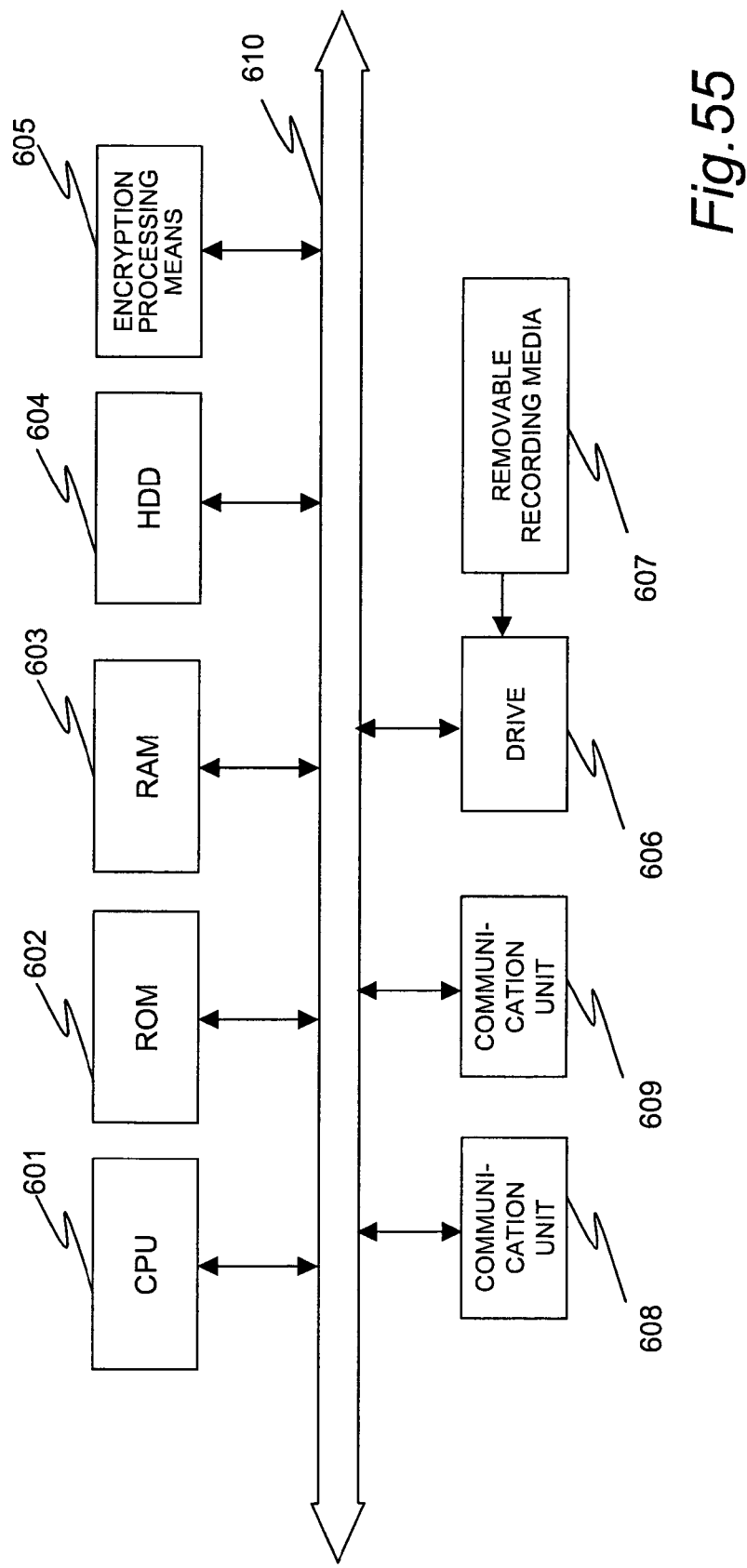
FIG. 55 illustrates an example of the configuration of each entity, such as a service provider, a support center, or a content creator.

A CPU (Central processing Unit) 601 shown in FIG. 55 executes various application programs and an OS (Operating System). A ROM (Read-Only-Memory) 602 stores fixed data, such as programs executed by the CPU 601 or computation parameters. A RAM (Random Access Memory) 603 is used as a storage area or a work area for the programs executed in the processing of the CPU 601 or for variable parameters in the processing of the programs. An HDD 604 controls a hard disk, and stores and reads various data and programs in and from the hard disk. Encryption processing means 605 encrypts and decrypts data to be sent. Although in this example the encryption processing means is an individual module, an encryption processing program may be stored in the ROM 602, and the CPU 601 may read the program stored in the ROM and executes it instead of providing an independent encryption processing module.

A drive 606 performs a recording/playback operation on removable recording media 607, such as floppy disks, CD-ROM (Compact Disc Read Only Memory), MO (Magneto optical) disks, DVD (Digital Versatile Disc), magnetic disks, and semiconductor memory. The drive 606 plays back or stores programs and data from and in the removable recording media 607. When executing or processing the programs or data recorded in the recording media in the CPU 601, the read programs or data is supplied to the RAM 603, a communication unit 608, or a communication unit 609 via a bus 610.

In this example, a plurality of communication units, such as the communication unit 608 and the communication unit 609, are provided, assuming that communication is made with different entities. If the entity shown in FIG. 55 is a service provider, one communication unit is used for communicating with the user device, and the other communication unit is used for communicating with the content creator. Mutual authentication or encrypted-data sending/receiving processing is performed with the communicating parties via the corresponding communication units.

The programs for executing the above-described processings in the data processing apparatus forming the service provider, the support center, the content creator, or the attribute certificate authority, are stored, for example, in the ROM 602, and are processed by the CPU 601. Alternatively, the programs may be stored in a hard disk, supplied via the HDD 604, and are executed by the CPU 601.

While the present invention has been described with reference to what is presently considered to be the preferred embodiment, it is apparent that those skilled in the art may modify or substitute the embodiment without departing from the spirit of the invention. That is, the present embodiment is therefore illustrative only and not restrictive. The scope of the present invention should be defined by the appended claims recited at the beginning of the specification.

A series of processings described in the specification can be executed by hardware, software or a combination thereof. If software is used, programs in which the processing sequences are recorded are installed into a memory of a computer built into dedicated hardware, and are executed. Alternatively, the programs may be installed into a general-purpose computer which can perform various processings, and are executed.

For example, the programs can be recorded in a hard disk or a ROM (Read Only Memory), which serves as a recording medium. Alternatively, the programs may be temporarily or permanently stored (recorded) in removable recording media, such as floppy disks, CD-ROM (Compact Disc Read Only Memory), MO (Magneto optical) disks, DVD (Digital Versatile Disc), magnetic disks, and semiconductor memory. Such removable recording media can be provided as so-called "package software".

As described above, the programs may be installed into a computer from the above-described removable recording media. Alternatively, they may be transferred into a computer wirelessly from a download site, or may be transferred into a computer by cable via a network, such as a LAN (Local Area Network) or the Internet. Then, the computer receives the programs transferred, and installs them in a recording medium, such as a built-in hard disk.

The various processings may be executed in a time-series manner in the order disclosed in the specification. Alternatively, they may be executed concurrently or individually as required or according to the performance of the device which executes the processings. In this specification, the system means a logical group of a plurality of devices, and it is not essential that the devices be stored in the same housing.

INDUSTRIAL APPLICABILITY

As described above, according to the content usage-right management system, the content usage-right management method, the information processing apparatus, and the computer program of the present invention, in a system in which encrypted content is distributed and is allowed to be utilized only by authorized users, a service provider receives a content usage-right certificate involving a request to change content-usage condition information from a user device, generates an upgraded content usage-right certificate by changing the content-usage condition information recorded in the received content usage-right certificate, and issues the upgraded content usage-right certificate to the user device. With this configuration, user information and user content purchase information can be obtained from the content usage-right certificate. Accordingly, it can be reliably checked whether the user has an authorized content-usage right. It is thus possible to change the content usage conditions for authorized users without the need for the service provider to possess control data for content-usage rights for each user.

According to the content usage-right management system, the content usage-right management method, the information processing apparatus, and the computer program of the present invention, an upgraded content usage-right certificate is generated by performing at least one of a change in content usage-period restrictions, a change in content usage-number restrictions, and a change among three modes: content usage-period restrictions, content usage-number restrictions, and content full-purchase. Accordingly, based on a content usage-right certificate having usage conditions according to the mode, a content usage-right certificate in which conditions totally different from the previous conditions are set can be issued, thereby improving the convenience in utilizing the content.

According to the content usage-right management system, the content usage-right management method, the information processing apparatus, and the computer program of the present invention, an upgraded content usage-right certificate is generated by changing usage condition information between on-line usage and off-line usage. Accordingly, based on a content usage-right certificate having usage conditions according to the mode, a content usage-right certificate in which conditions totally different from the previous conditions are set can be issued, thereby improving the convenience in utilizing the content.

According to the content usage-right management system, the content usage-right management method, the information processing apparatus, and the computer program of the present invention, based on content information stored in a content usage-right certificate, a content usage-right certificate corresponding to an item of content belonging to an album which consists of a set of items of content, which belong to the same group of content as the content information stored in the received content usage-right certificate, is generated as an upgraded content usage-right certificate, and is sent to the user device. With this configuration, user information and user content purchase information can be obtained from the content usage-right certificate. Accordingly, it can be reliably checked whether the user has an authorized content-usage right. It is thus possible to provide new content to authorized users without the need for the service provider to possess user content purchase information of the users.

According to the content usage-right management system, the content usage-right management method, the information processing apparatus, and the computer program of the present invention, a digital signature of an entity that has issued the content usage-right certificate is added to the content usage-right certificate, and the content usage-right certificate is upgraded on the condition that data is not tampered with by verifying the digital signature. With this configuration, it is possible to exclude the possibility of forging certificates for utilizing the content.

The invention claimed is:

1. A content usage-right management system comprising:
a user device that utilizes content; and
a service provider that distributes to said user device a content usage-right certificate in which content-usage condition information is stored, wherein:
said user device is configured to utilize the content according to the content-usage condition information stored in the content usage-right certificate received from said service provider and to make a request to change the content-usage condition information stored in the content usage-right certificate by sending the content usage-right certificate to said service provider, wherein
said service provider is configured to generate, upon receiving the content usage-right certificate involving the request to change the content-usage condition information from said user device, an upgraded content usage-right certificate by changing the content-usage condition information recorded in the received content usage-right certificate and to send the upgraded content usage-right certificate to said user device,
the content-usage condition information stored in the content usage-right certificate include usage condition information in which one of on-line usage that requires a determination of usage rights in said service provider and off-line usage that does not require a determination of usage rights in said service provider is set, and
said service provider is configured to generate, upon receiving the content usage-right certificate involving the request to change the content-usage condition information from said user device, an upgraded content usage-right certificate by changing the usage-condition information between on-line usage and off-line usage for changing the content-usage condition information recorded in the received content usage-right certificate and to send the upgraded content usage-right certificate to said user device.

2. The content usage-right management system according to claim 1, wherein:
the content usage-right certificate stores therein an encrypted content key encrypted with a content key used for decrypting encrypted content; and
said user device is configured to obtain the content key by decrypting the encrypted content key on the condition that the content is to be utilized according to the content-usage condition information stored in the content usage-right certificate received from said service provider.

3. The content usage-right management system according to claim 1, wherein:
the content usage-right certificate stores therein an encrypted content key encrypted with a content key used for decrypting encrypted content; and
said user device is configured to determine whether the content is to be utilized according to the content-usage condition information stored in the content usage-right certificate received from said service provider and, on the condition that the content is to be utilized according to the content usage conditions, said user device decrypts the encrypted content key stored in the content usage-right certificate based on a key stored in said user device.

4. The content usage-right management system according to claim 1, wherein:
the content usage-right certificate stores therein an encrypted content key encrypted with a content key used for decrypting encrypted content; and said service provider is configured to receive the content usage-right certificate sent from said user device and to determine whether the content is to be utilized according to the content-usage condition information stored in the received content usage-right certificate and, on the condition that the content is to be utilized according to the content usage conditions, said service provider decrypts the encrypted content key stored in the content usage-right certificate based on a unique key of said service provider.

5. The content usage-right management system according to claim 1, wherein:

the content-usage condition information stored in the content usage-right certificate is one of three modes: content usage-period restricted information, content usage-number restricted information, and content full-purchase without imposing any usage restriction;

the request to change the content-usage condition information from said user device includes at least one of a change in a content usage-period restriction, a change in a content usage-number restriction, and a change among the three modes: a usage period restriction, a usage number restriction, and content full-purchase; and said service provider is configured to generate, upon receiving the content usage-right certificate involving the request to change the content-usage condition information from said user device, the upgraded content usage-right certificate by performing at least one of a change in the content usage-period restriction, a change in the content usage-number restriction, and a change among the three modes: the usage-period restriction, the usage-number restriction, and the content full-purchase for changing the content-usage condition information recorded in the received content usage-right certificate, and to send the upgraded content usage-right certificate to said user device.

6. The content usage-right management system according to claim 1, wherein:

a digital signature of an entity that has issued the content usage-right certificate is attached to the content usage-right certificate; and said service provider is configured to generate the upgraded content usage-right certificate upon receiving the content usage-right certificate when it is determined that data is not tampered with by verifying the digital signature.

7. The content usage-right management system according to claim 1, wherein:

the content usage-right certificate stores therein link information concerning a public key certificate corresponding to the content usage-right certificate; and said service provider is configured to generate the upgraded content usage-right certificate upon receiving the content usage-right certificate on the condition that the integrity of the content usage-right certificate is determined by verifying the public key certificate obtained by the link information.

8. The content usage-right management system according to claim 1, wherein:

the content usage-right certificate is an attribute certificate issued by an attribute certificate authority; and an encrypted content key encrypted with a content key used for decrypting content is stored in an attribute information field of the attribute certificate.

9. The content usage-right management system according to claim 1, wherein:

the content usage-right certificate is an attribute certificate issued by an attribute certificate authority; and the content usage conditions are stored in an attribute information field of the attribute certificate.

10. A content usage-right management system comprising:

a user device that utilizes content; and a service provider that distributes a content usage-right certificate in which purchased content information is stored to said user device, the content usage-right certificate having content-usage condition information including usage condition information in which one of on-line usage that requires a determination of usage rights in said service provider and off-line usage that does not require a determination of usage rights in said service provider is set, wherein:

said user device is configured to send the content usage-right certificate to said service provider, and wherein said service provider is configured to generate, based on the content information stored in the content usage-right certificate received from said user device, an upgraded content usage-right certificate by changing the usage-condition information between on-line usage and off-line usage, the upgraded content usage-right certificate corresponding to an item of content belonging to an album that comprises of a set of items of content, which belong to the same group of content as the content information stored in the received content usage-right certificate, and to send the upgraded content usage-right certificate to said user device.

11. The content usage-right management system according to claim 10, wherein:

a digital signature of an entity that has issued the content usage-right certificate is attached to the content usage-right certificate; and said service provider is configured to generate the upgraded content usage-right certificate upon receiving the content usage-right certificate when it is determined that data is not tampered with by verifying the digital signature.

12. The content usage-right management system according to claim 10, wherein:

the content usage-right certificate stores therein link information concerning a public key certificate corresponding to the content usage-right certificate; and said service provider is configured to generate the upgraded content usage-right certificate upon receiving the content usage-right certificate on the condition that the integrity of the content usage-right certificate is determined by verifying the public key certificate obtained by the link information.

13. A content usage-right management method for use in a system that comprises a user device that utilizes content, and a service provider which distributes a content usage-right certificate in which content-usage condition information is stored to said user device, comprising the steps of:

configuring said user device to make a request to change the content-usage condition information stored in the content usage-right certificate by sending the content usage-right certificate to said service provider; and configuring said service provider to generate, upon receiving the content usage-right certificate involving the request to change the content-usage condition information from said user device, an upgraded content usage-right certificate by changing the content-usage condition information recorded in the received content usage-right certificate and to send the upgraded content usage-right certificate to said user device;

wherein the content-usage condition information stored in the content usage-right certificate include one of usage condition information in which on-line usage that requires a determination of usage rights in said service provider off-line usage that does not require a determination of usage rights in said service provider is set; and said service provider generates, upon receiving the content usage-right certificate involving the request to change the content-usage condition information from said user device, an upgraded content usage-right certificate by changing the usage-condition information between on-line usage and off-line usage for changing the content-usage condition information recorded in the received content usage-right certificate, and sends the upgraded content usage-right certificate to said user device.

14. The content usage-right management method according to claim 13, wherein:
the content usage-right certificate stores therein an encrypted content key encrypted with a content key used for decrypting encrypted content; and
said user device is configured to obtain the content key by decrypting the encrypted content key on the condition that the content is to be utilized according to the content-usage usage condition information stored in the content usage-right certificate received from said service provider.

15. The content usage-right management method according to claim 13, wherein:
the content usage-right certificate stores therein an encrypted content key encrypted with a content key used for decrypting encrypted content; and
said user device is configured to determine whether the content is to be utilized according to the content-usage condition information stored in the content usage-right certificate received from said service provider and, on the condition that the content is to be utilized according to the content usage conditions, said user device decrypts the encrypted content key stored in the content usage-right certificate based on a key stored in said user device.

16. The content usage-right management method according to claim 13, wherein:
the content usage-right certificate stores therein an encrypted content key encrypted with a content key used for decrypting encrypted content; and
said service provider receives the content usage-right certificate sent from said user device and determines whether the content is to be utilized according to the content-usage condition information stored in the received content usage-right certificate and, on the condition that the content is to be utilized according to the content usage conditions, said service provider decrypts the encrypted content key stored in the content usage-right certificate based on a unique key of said service provider.

17. The content usage-right management method according to claim 13, wherein:
the content-usage condition information stored in the content usage-right certificate is one of three modes: content usage-period restricted information, content usage-number restricted information, and content full-purchase without imposing any usage restriction;
the request to change the content-usage condition information from said user device includes at least one of a change in a content usage-period restriction, a change in a content usage-number restriction, and a change among the three modes: a usage period restriction, a usage number restriction, and content full-purchase; and said service provider generates, upon receiving the content usage-right certificate involving the request to change the content-usage condition information from said user device, the upgraded content usage-right certificate by performing at least one of a change in the content usage-period restriction, a change in the content usage-number restriction, and a change among the three modes: the usage-period restriction, the usage-number restriction, and the content full-purchase for changing the content-usage condition information recorded in the received content usage-right certificate, and sends the upgraded content usage-right certificate to said user device.

18. The content usage-right management method according to claim 13, wherein:
a digital signature of an entity that has issued the content usage-right certificate is attached to the content usage-right certificate; and
said service provider generates the upgraded content usage-right certificate upon receiving the content usage-right certificate when it is determined that data is not tampered with by verifying the digital signature.

19. The content usage-right management method according to claim 13, wherein:
the content usage-right certificate stores therein link information concerning a public key certificate corresponding to the content usage-right certificate; and
said service provider generates the upgraded content usage-right certificate upon receiving the content usage-right certificate on the condition that the integrity of the content usage-right certificate is determined by verifying the public key certificate obtained by the link information.

20. A content usage-right management method used in a system that comprises a user device that utilizes content, and a service provider that distributes a content usage-right certificate in which purchased content information is stored to said user device, the content usage-right certificate having content-usage condition information including usage condition information in which one of on-line usage that requires a determination of usage rights in said service provider and off-line usage that does not require a determination of usage rights in said service provider is set, the method comprising:
sending the content usage-right certificate from said user device to said service provider; and
causing said service provider to generate, based on the content information stored in the content usage-right certificate received from said user device, an upgraded content usage-right certificate by changing the usage-condition information between on-line usage and off-line usage, the upgraded content usage-right certificate corresponding to an item of content belonging to an album which comprises of a set of items of content, that belong to the same group of content as the content information stored in the received content usage-right right certificate, and to send the upgraded content usage-right certificate to said user device.

21. The content usage-right management method according to claim 20, wherein:
a digital signature of an entity that has issued the content usage-right certificate is attached to the content usage-right certificate; and
said service provider generates the upgraded content usage-right certificate upon receiving the content usage-right certificate when it is determined that data is not tampered with by verifying the digital signature.

22. The content usage-right management method according to claim 20, wherein:
the content usage-right certificate stores therein link information concerning a public key certificate corresponding to the content usage-right certificate; and
said service provider generates the upgraded content usage-right certificate upon receiving the content usage-right certificate on a condition that an integrity of the content usage-right certificate is determined by verifying the public key certificate obtained by the link information.

23. An information processing apparatus for use in a system that comprises a user device that utilizes content, and a service provider that distributes to said user device a content usage-right certificate in which purchased content information is stored, said information processing apparatus issuing the content usage-right certificate, wherein said information processing apparatus is configured to receive a request to change content-usage conditions of the issued content-usage condition information from said user device, verify the received content usage-right certificate, and generate an upgraded content usage-right certificate by changing the content-usage condition information recorded in the received content usage-right certificate on a condition that an integrity of the content usage-right certificate is determined by verifying the received content usage-right certificate and to send the upgraded content usage-right certificate to said user device;
wherein the content-usage conditions stored in the content usage-right certificate include one of usage condition information in which on-line usage that requires a determination of usage rights in said service provider and off-line usage that does not require a determination of usage rights in said service provider is set; and
said information processing apparatus is configured to generate, upon receiving the content usage-right certificate involving the request to change the content-usage condition information from said user device, an upgraded content usage-right certificate by changing the usage-condition information between on-line usage and off-line usage for changing the content-usage condition information recorded in the received content usage-right certificate and to send the upgraded content usage-right certificate to said user device.

24. The information processing apparatus according to claim 23, wherein said information processing apparatus is configured to generate, upon receiving the content usage-right certificate involving the request to change the content-usage condition information from said user device, the upgraded content usage-right certificate by performing at least one of a change in a content usage-period restriction, a change in a content usage-number restriction, and a change among three modes: the usage-period restriction, the usage-number restriction, and the content full-purchase for changing the content-usage condition information recorded in the received content usage-right certificate, and to send the upgraded content usage-right certificate to said user device.

25. The information processing apparatus according to claim 23, wherein:

a digital signature of an entity that has issued the content usage-right certificate is attached to the content usage-right certificate; and
said information processing apparatus is configured to generate the upgraded content usage-right certificate upon receiving the content usage-right certificate when it is determined that data is not tampered with by verifying the digital signature.

26. The information processing apparatus according to claim 23, wherein:
the content usage-right certificate stores therein link information concerning a public key certificate corresponding to the content usage-right certificate; and
said information processing apparatus is configured to generate the upgraded content usage-right certificate upon receiving the content usage-right certificate on a condition that an integrity of the content usage-right certificate is determined by verifying the public key certificate obtained by the link information.

27. A computer-readable recording medium recorded with a computer program allowing, in a system that comprises a user device that utilizes content, and a service provider that distributes to said user device a content usage-right certificate in which purchased content information is stored, the content usage-right certificate having content-usage condition information including usage condition information in which one of on-line usage that requires a determination of usage rights in said service provider and off-line usage that does not require a determination of usage rights in said service provider is set, processing for issuing a content usage-right certificate to be executed on a computer system, said computer program comprising:
receiving a request to change content-usage conditions of the issued content-usage condition information;
verifying the received content usage-right certificate; and
generating an upgraded content usage-right certificate by changing the content-usage condition information recorded in the received content usage-right certificate between on-line usage and off-line usage on a condition that an integrity of the content usage-right certificate is determined by verifying the received content usage-right certificate and sending the upgraded content usage-right certificate to said user device.

28. The system of claim 1, wherein if the content is to be used on-line, the content includes at least one of a period restriction and a usage-number restriction.

29. The method of claim 13, wherein if the content is to be used off-line, the method further comprises:
determining whether the content has a restricted number of usages;
determining whether the content can be used based on the number of usages remaining; and
if it is determined the content can be used based on the number of usages remaining, updating content-usage-number control data that is controlled in the user device.

* * * * *